US010502357B2

(12) United States Patent
Truda

(10) Patent No.: US 10,502,357 B2
(45) Date of Patent: Dec. 10, 2019

(54) KIT FOR ATTACHING INTERCHANGEABLE ACCESSORIES TO AN INSTRUMENT

(71) Applicant: HEAD ON INNOVATIONS, LLC., Mechanicsville, VA (US)

(72) Inventor: Jason Michael Truda, Mechanicsville, VA (US)

(*) Notice: Subject to any disclaimer, the term of this patent is extended or adjusted under 35 U.S.C. 154(b) by 0 days.

(21) Appl. No.: 15/490,265

(22) Filed: Apr. 18, 2017

(65) Prior Publication Data
US 2017/0301326 A1 Oct. 19, 2017

Related U.S. Application Data

(60) Provisional application No. 62/324,334, filed on Apr. 18, 2016.

(51) Int. Cl.
*G10D 3/00* (2006.01)
*F16M 11/04* (2006.01)
*F16M 13/02* (2006.01)
*F16B 2/08* (2006.01)
*F16B 2/06* (2006.01)
*G01G 5/00* (2006.01)
*F16M 11/14* (2006.01)
*G10G 7/00* (2006.01)
*G10D 13/00* (2006.01)
*G10D 13/08* (2006.01)

(52) U.S. Cl.
CPC ............ *F16M 11/041* (2013.01); *F16B 2/065* (2013.01); *F16B 2/08* (2013.01); *F16M 11/14* (2013.01); *F16M 13/022* (2013.01); *G01G 5/00* (2013.01); *G10G 7/00* (2013.01); *G10D 3/00* (2013.01); *G10D 13/00* (2013.01); *G10D 13/08* (2013.01)

(58) Field of Classification Search
CPC ...... G01G 5/00; F16M 11/041; F16M 13/022; F16B 2/065; G10D 3/00
USPC .......................... 248/230.8, 443; 84/327, 329
See application file for complete search history.

(56) References Cited

U.S. PATENT DOCUMENTS 7,557,284 B2 * 7/2009 Mori ..................... G10D 13/026
84/421
9,016,640 B2 * 4/2015 Sawhney ............... F16M 11/20
206/314
2012/0279378 A1 * 11/2012 Stamper ............... G10D 13/003
84/422.4

* cited by examiner

*Primary Examiner* — Todd M Epps
(74) *Attorney, Agent, or Firm* — Ashok Tankha

(57) ABSTRACT

A kit for attaching one or more interchangeable accessories, for example, sound makers, fashion accessories, utility accessories, instrument accessories, etc., to an instrument, for example, a drum stick, a drum head, a post of a bass drum pedal or a hihat, a cajón, a microphone, a guitar, a stand, etc., to enhance sound, functionality, and visual elements of the instrument is provided. The kit includes one or more interchangeable accessories and at least one attachment system. The attachment system includes an attachment member and a connector element. The attachment member, for example, a clamp assembly with an accessory housing and a release assembly, or a generally cylindrical attachment member, or a cap member is removably attachable to a predetermined location of the instrument. The connector element is a female connector or a male connector for engageably connecting the attachment member to an opposing connector of one of the interchangeable accessories.

16 Claims, 71 Drawing Sheets

KIT FOR ATTACHING INTERCHANGEABLE ACCESSORIES TO AN INSTRUMENT

CROSS-REFERENCE TO RELATED APPLICATIONS

This application claims priority to and the benefit of the provisional patent application No. 62/324,334 titled "Drum Stick Attachment System For Attaching Interchangeable Accessories", filed in the United States Patent and Trademark Office on Apr. 18, 2016. The specification of the above referenced patent application is incorporated herein by reference in its entirety.

BACKGROUND

Musicians may need to enhance sound texture, and/or functionality, and/or visual texture of a musical instrument by using accessories, for example, jingle bells, cymbals, tambourine jingles, shakers, fashion accessories, etc. The accessories are attached to the musical instrument using a fastener, for example, a clamp. Typically, the fastener is designed based on a structure of an accessory and the musical instrument to which the accessory is to be connected. Therefore, each particular accessory requires an individually designed fastener for connecting that particular accessory to a particular musical instrument. The individually designed fasteners have limited functionality and can accommodate only a single accessory or a limited number of accessories. Moreover, conventional fasteners used to attach an accessory to a musical instrument are heavy and have large surface areas which affect playability of the musical instrument. Furthermore, the conventional fasteners are susceptible to mechanical stress exerted by the musical instrument, thereby further affecting the playability of the musical instrument.

Hence, there is a long felt need for a kit comprising an attachment system with a connector element for attaching one or more of multiple interchangeable accessories to an instrument, for example, a musical instrument to enhance sound, functionality, and visual elements of the instrument, without affecting playability of the musical instrument.

SUMMARY OF THE INVENTION

This summary is provided to introduce a selection of concepts in a simplified form that are further disclosed in the detailed description of the invention. This summary is not intended to determine the scope of the claimed subject matter.

The kit disclosed herein addresses the above recited need for attaching one or more of multiple interchangeable accessories, for example, sound makers, fashion accessories, utility accessories, instrument accessories, etc., to an instrument, for example, a drum stick, a drum head, a post of a bass drum pedal, a cajón, a post of a hihat, a piece of drum kit hardware, a microphone, a guitar, a stand, a piece of musical hardware, etc., to enhance sound, functionality, and visual elements of the instrument, without affecting playability of the instrument. The kit disclosed herein comprises multiple interchangeable accessories and at least one attachment system. The attachment system is removably attachable to a predetermined location of the instrument for allowing connection of at least one of the interchangeable accessories that enhance the sound, the functionality, and the visual elements of the instrument, to the instrument.

Also, disclosed herein is a method for attaching one or more of multiple interchangeable accessories to an instrument to enhance sound, functionality, and visual elements of the instrument. In the method disclosed herein, the kit comprising multiple interchangeable accessories and at least one attachment system is provided. The attachment system comprises an attachment member and a connector element. The attachment member is, for example, one of a clamp assembly with an accessory housing and a release assembly, a generally cylindrical attachment member, a cap member, etc. The connector element is a female connector or a male connector for engageably connecting the attachment member to an opposing connector of at least one of the interchangeable accessories. The attachment member of the attachment system is removably attached to a predetermined location on the instrument. At least one of the interchangeable accessories that enhance the sound, the functionality, and the visual elements of the instrument is connected to the attachment member using the connector element of the attachment system.

The kit disclosed herein comprising at least one attachment system and quick release interchangeable accessories provides versatility to users, for example, musicians, and allows the musicians to add sound texture, functionality, and visual accessories to any instrument instantly without sacrificing playability of the instrument. While the attachment systems in the kit attach to an instrument differently for specific applications, these attachment systems comprise a common connector element, for example, a male connector or a female connector that matches with an opposing connector of any interchangeable accessory. The attachment systems are designed to remain fixed to an instrument, but can be removed and moved to another instrument if desired. The interchangeable accessories can be installed or removed instantly from the attachment systems disclosed herein. For example, a musician may attach a tambourine accessory to a drum stick via a drum stick attachment system and within seconds take the tambourine accessory off the drum stick attachment system and attach the tambourine accessory to a post of a bass drum pedal for a different application and sound use for a tambourine jingle.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 2A:
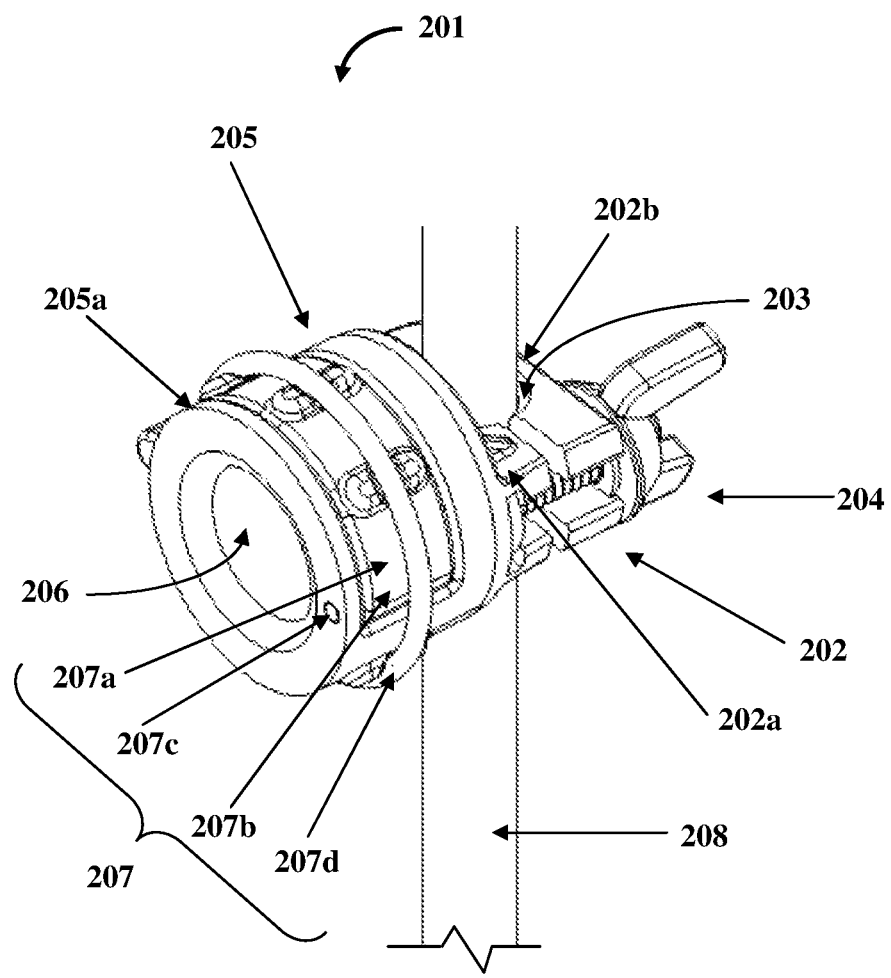
FIG. 2A exemplarily illustrates an embodiment of the attachment system for attaching an interchangeable accessory to an instrument.
Figure 3A:
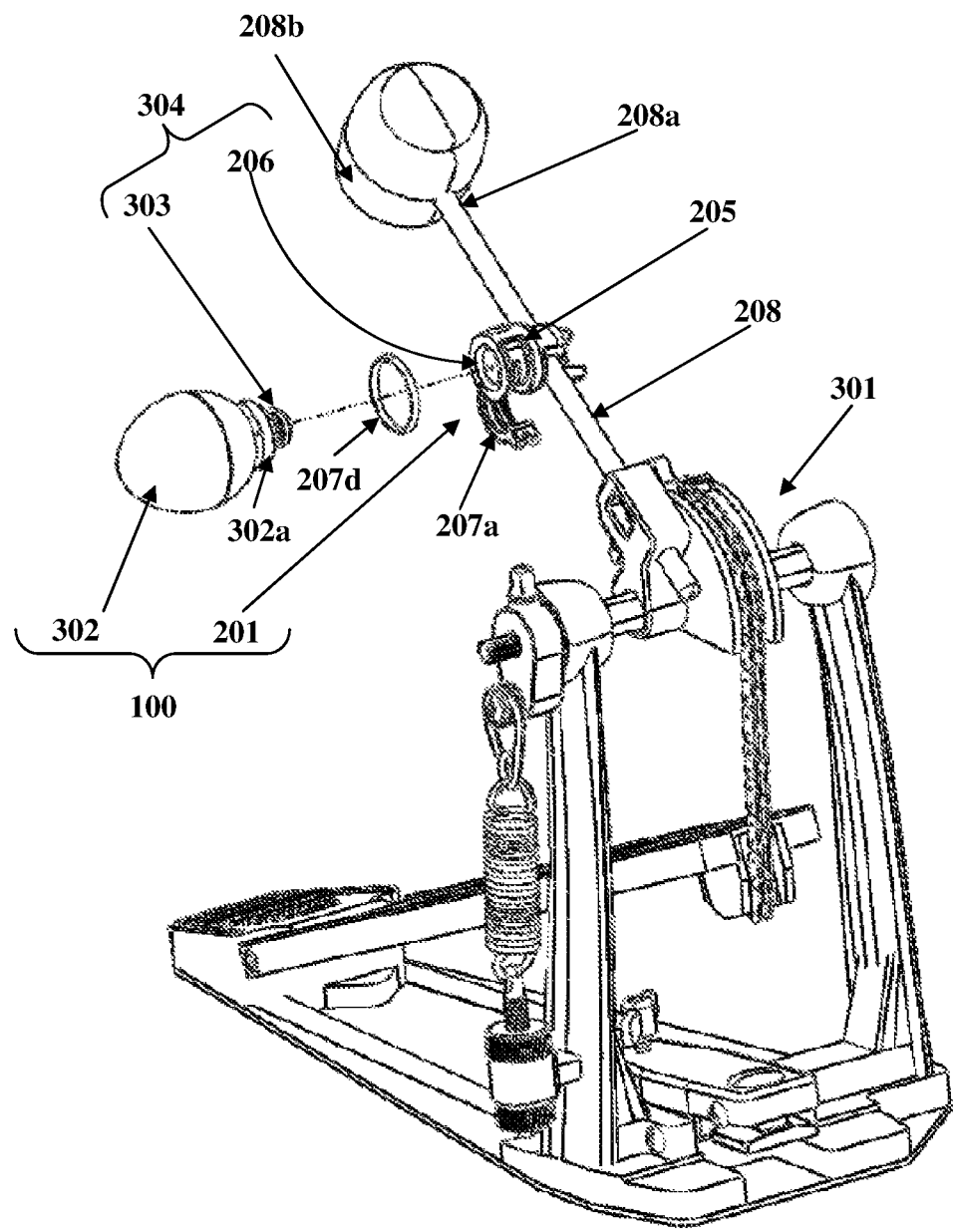
FIGS. 3A-3B exemplarily illustrate disassembled views showing the embodiment of the attachment system of FIGS. 2A-2C, attached to an instrument, for attaching an interchangeable accessory to the instrument.
Figure 3B:
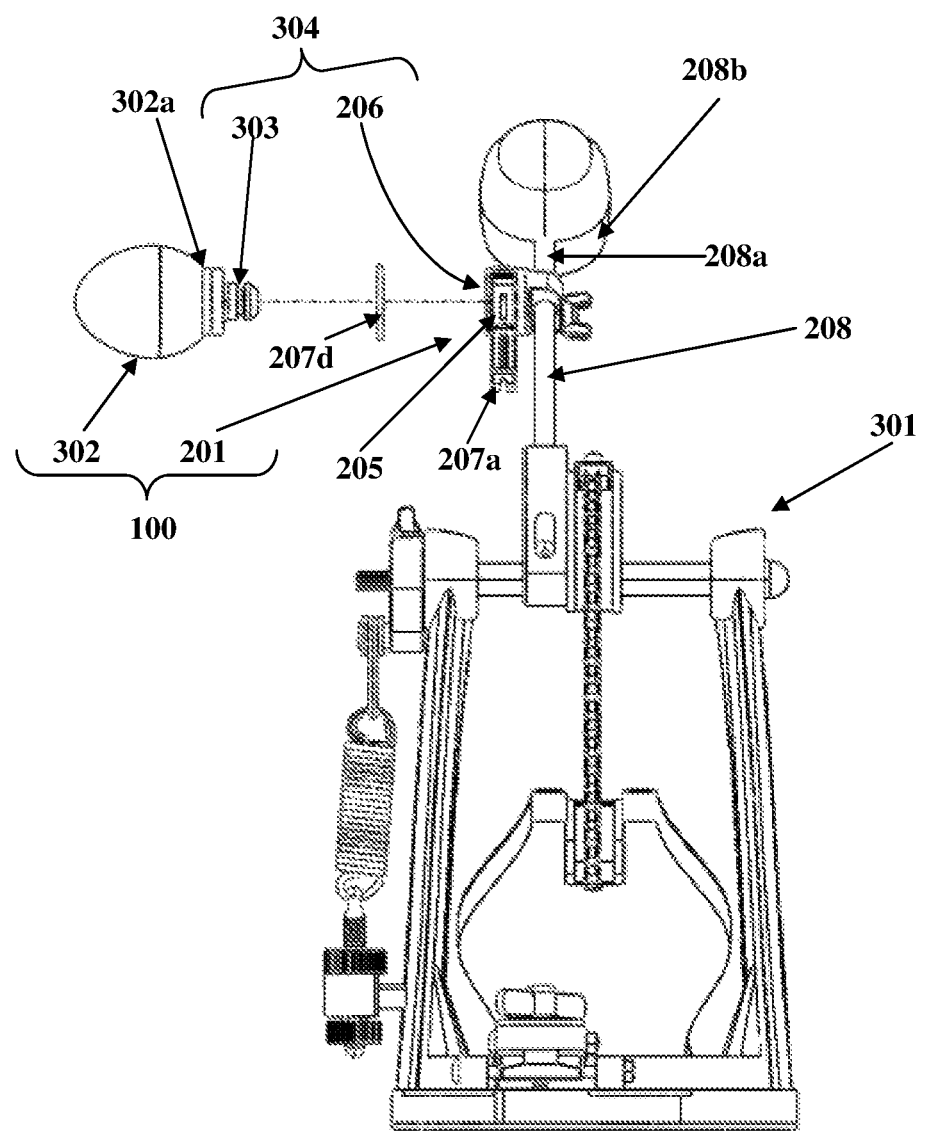
Figure 3C:
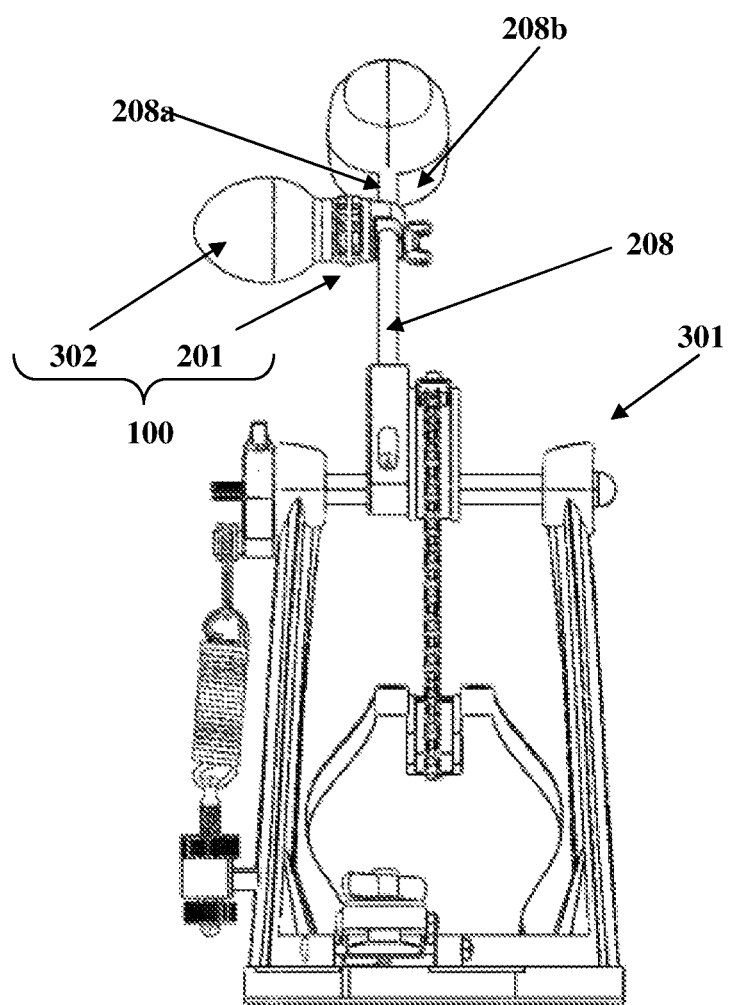
FIGS. 3C-3E exemplarily illustrate assembled views showing the embodiment of the attachment system of FIGS. 2A-2C, attached to the instrument, and the interchangeable accessory connected to the instrument via the embodiment of the attachment system.
Figure 3D:
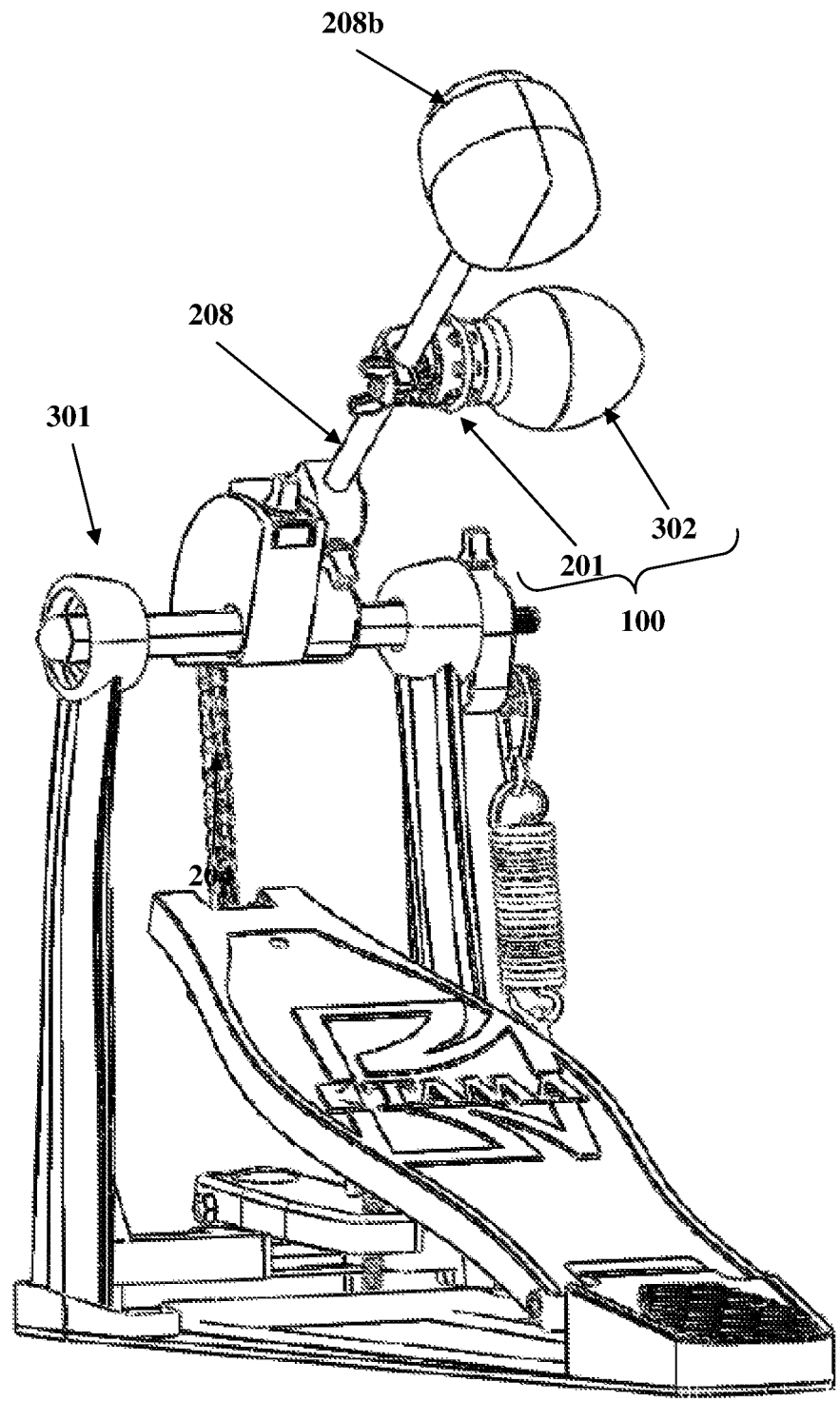
Figure 3E:
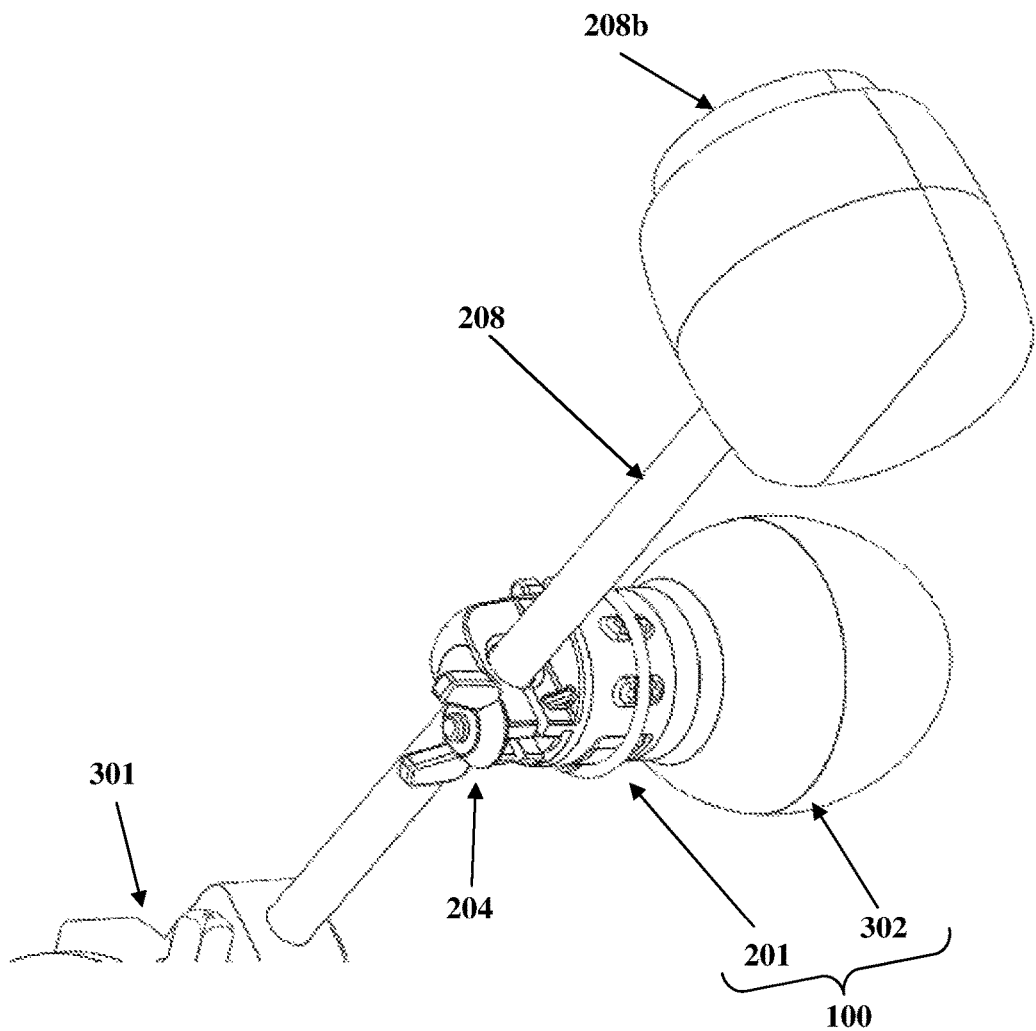
Figure 4A:
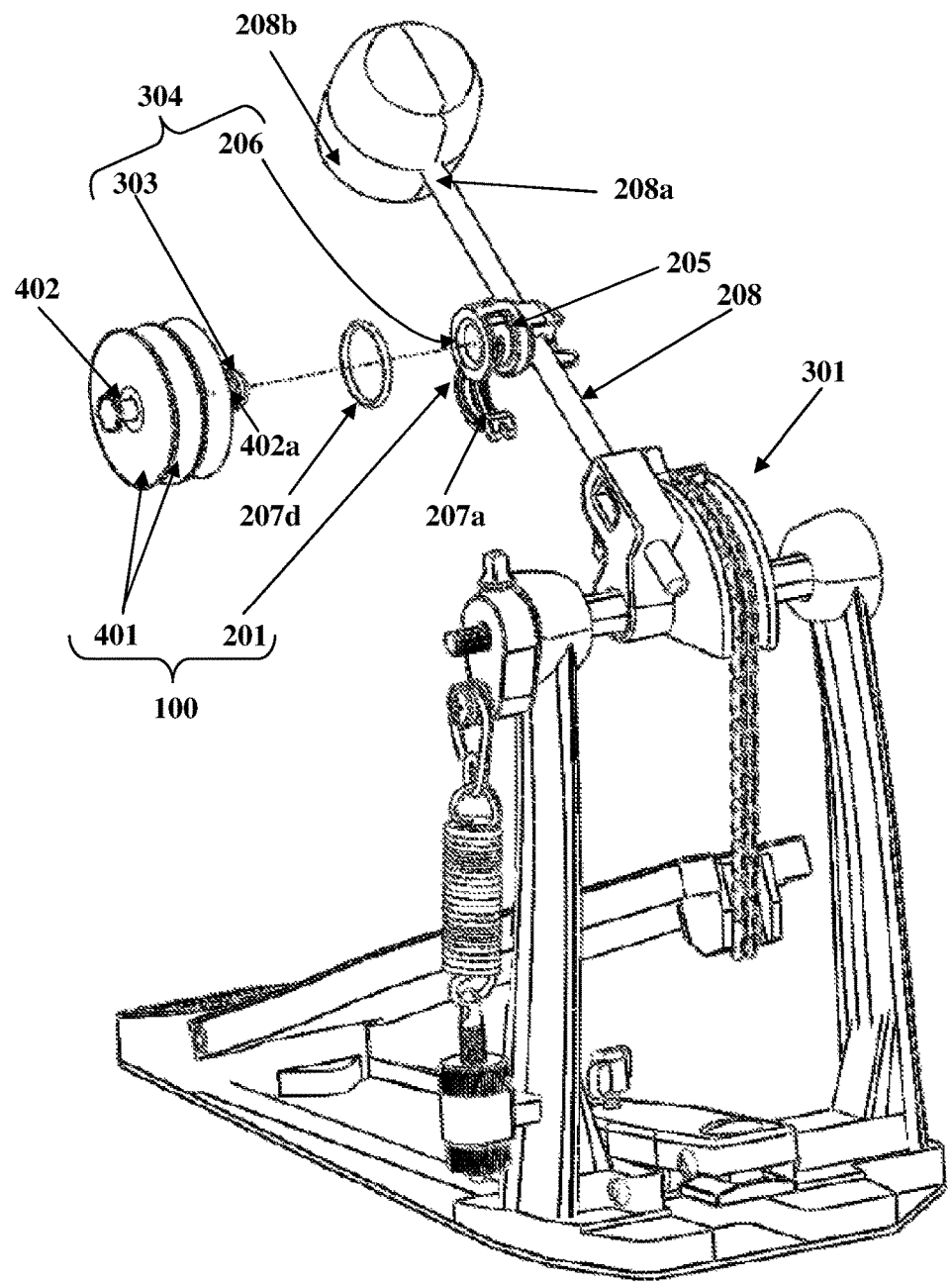
FIGS. 4A-4B exemplarily illustrate disassembled views showing the embodiment of the attachment system of FIGS. 2A-2C, attached to an instrument, for attaching another interchangeable accessory to the instrument.
Figure 4B:
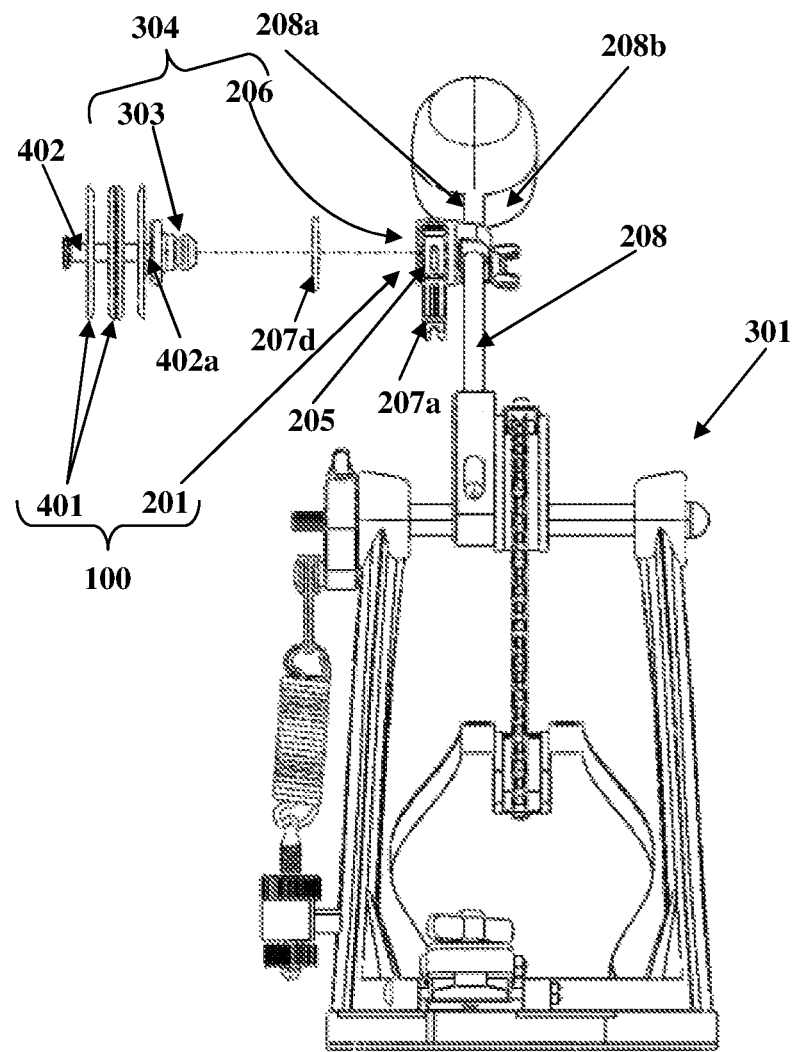
Figure 4C:
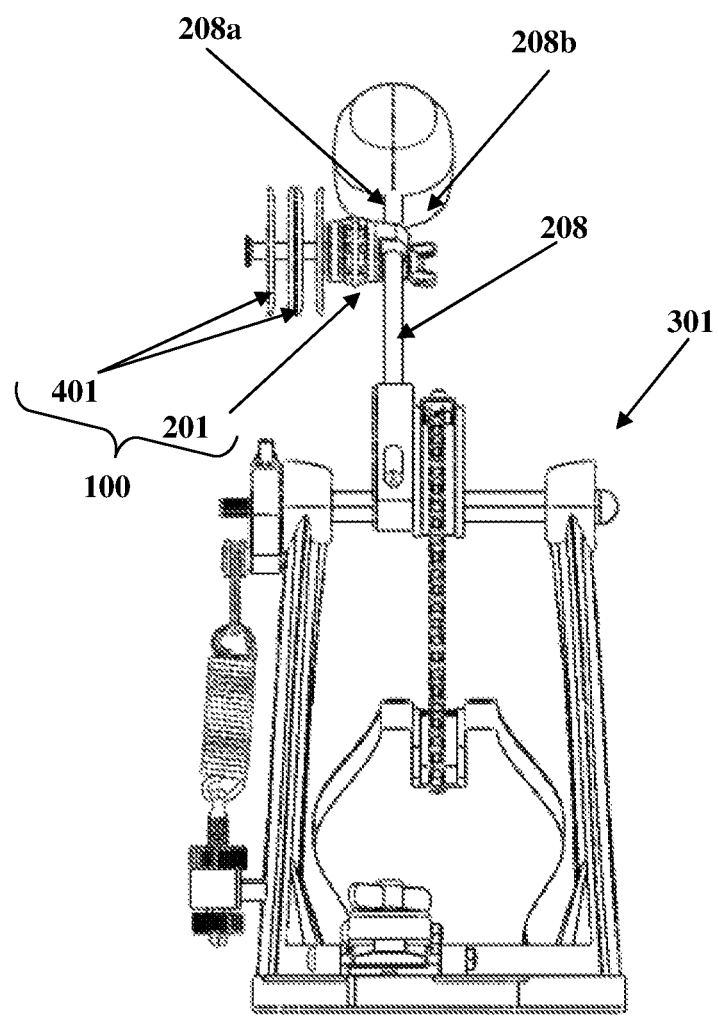
FIGS. 4C-4E exemplarily illustrate assembled views showing the embodiment of the attachment system of FIGS. 2A-2C, attached to the instrument, and the other interchangeable accessory connected to the instrument via the embodiment of the attachment system.
Figure 4D:
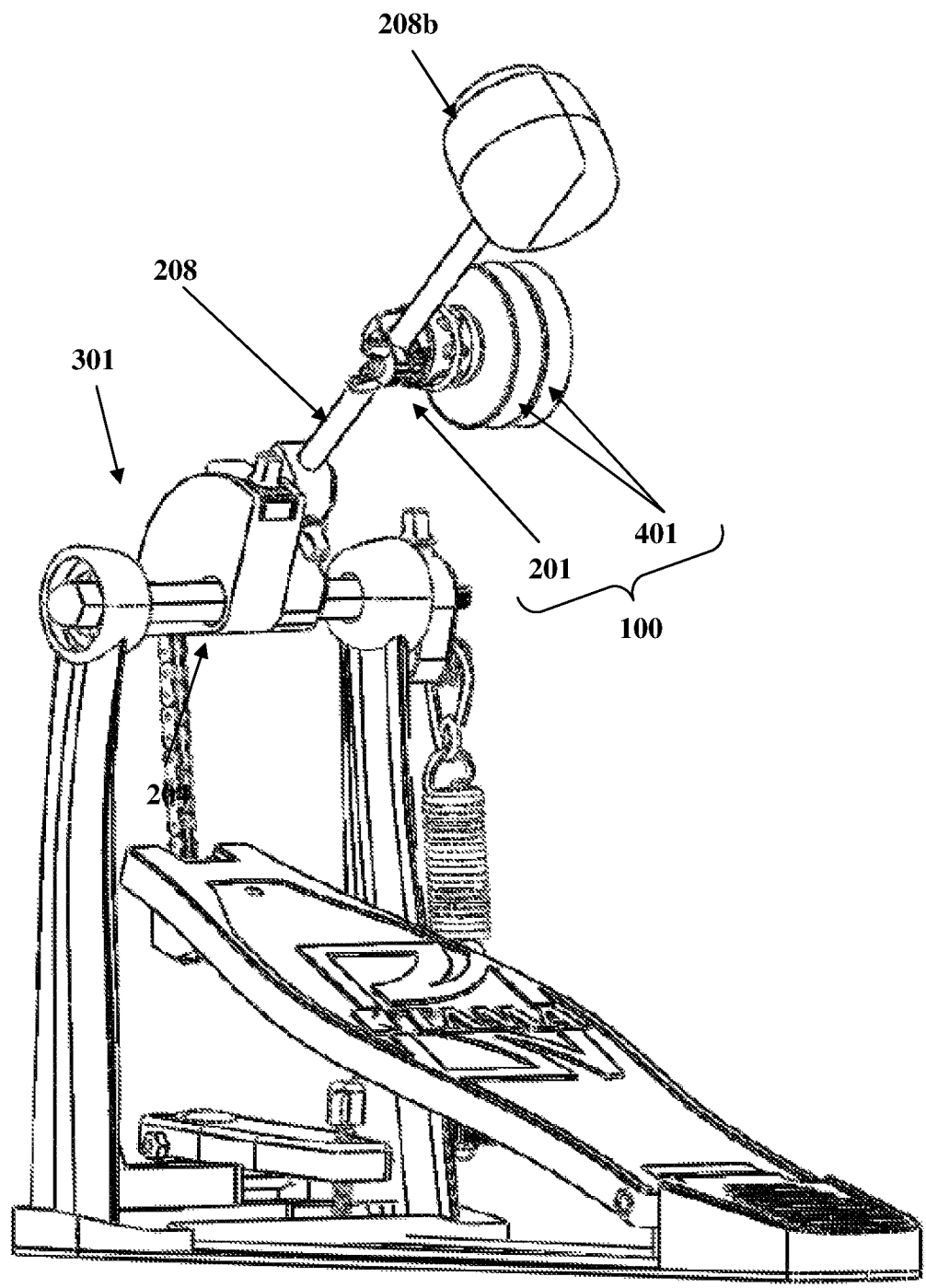
Figure 4E:
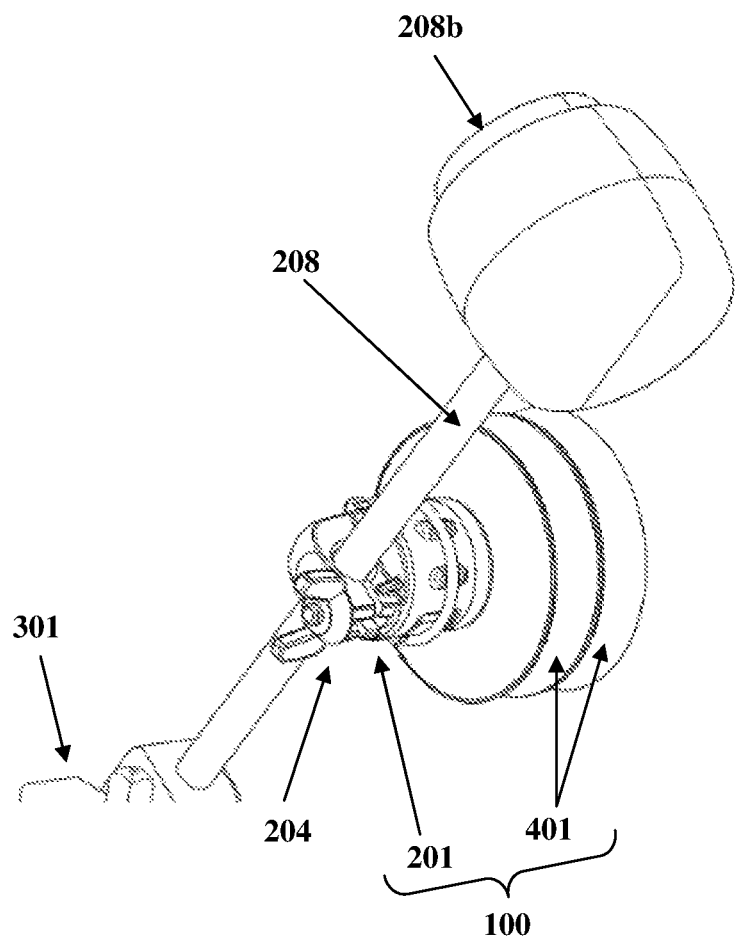
Figure 5A:
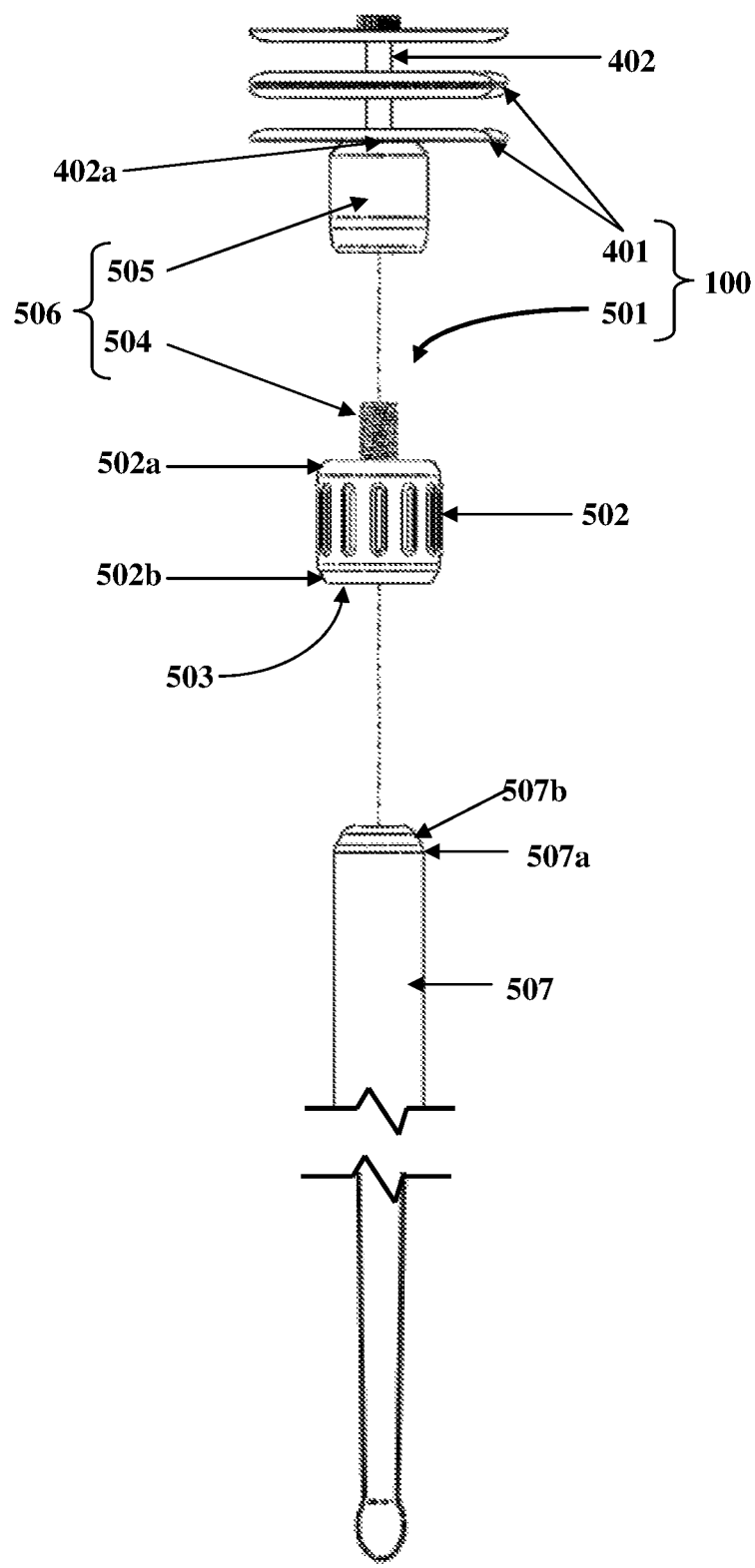
FIGS. 5A-5B exemplarily illustrate disassembled views of a kit comprising a drum stick attachment system for attaching an interchangeable accessory to a drum stick.
Figure 11:
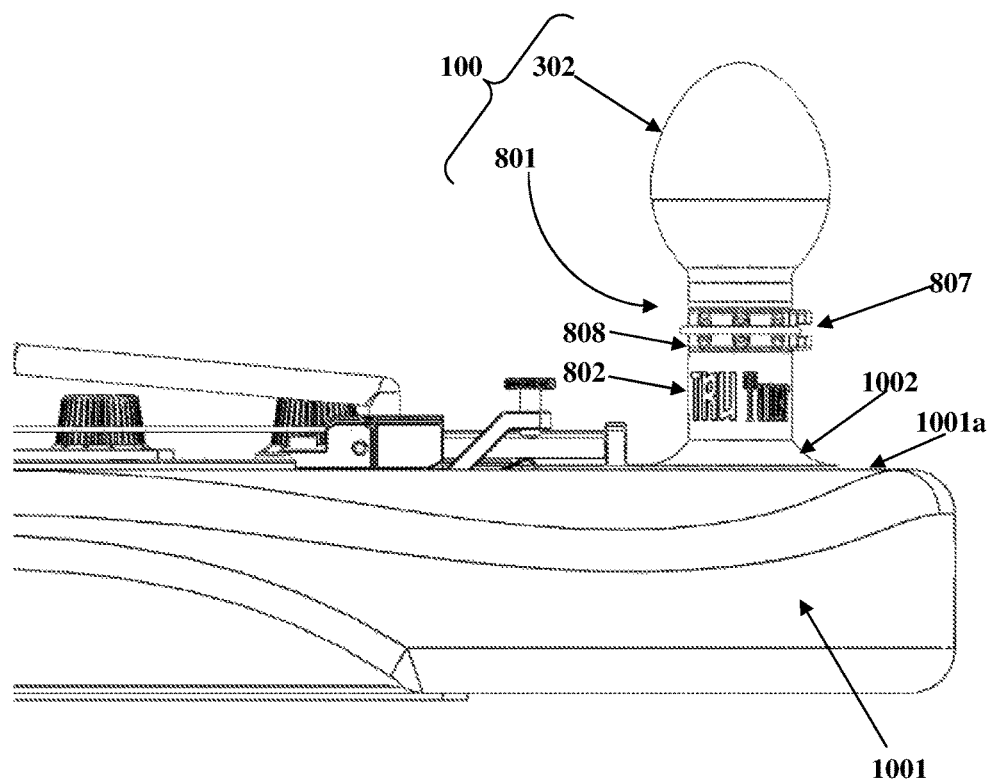
FIG. 11 exemplarily illustrates an assembled view of the kit, showing an interchangeable accessory connected to the guitar via the embodiment of the attachment system shown in FIGS. 10A-10B.
Figure 12A:
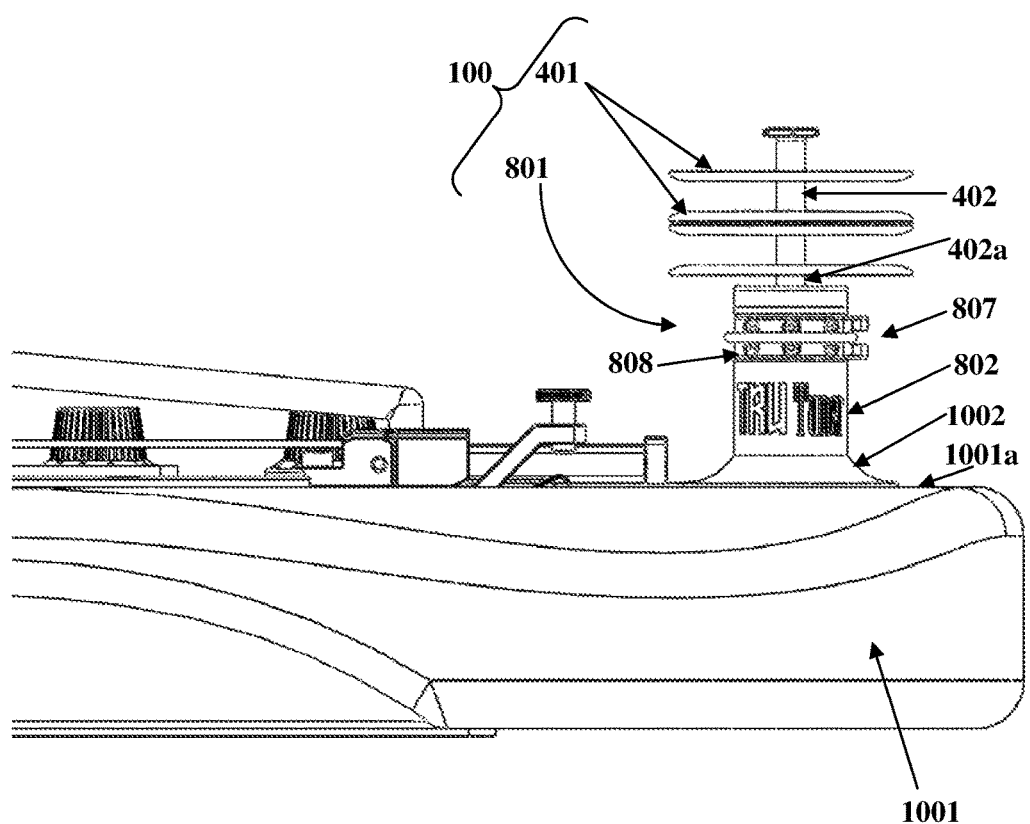
FIGS. 12A-12B exemplarily illustrate assembled views of the kit, showing another interchangeable accessory connected to the guitar via the embodiment of the attachment system shown in FIGS. 10A-10B.
Figure 12B:
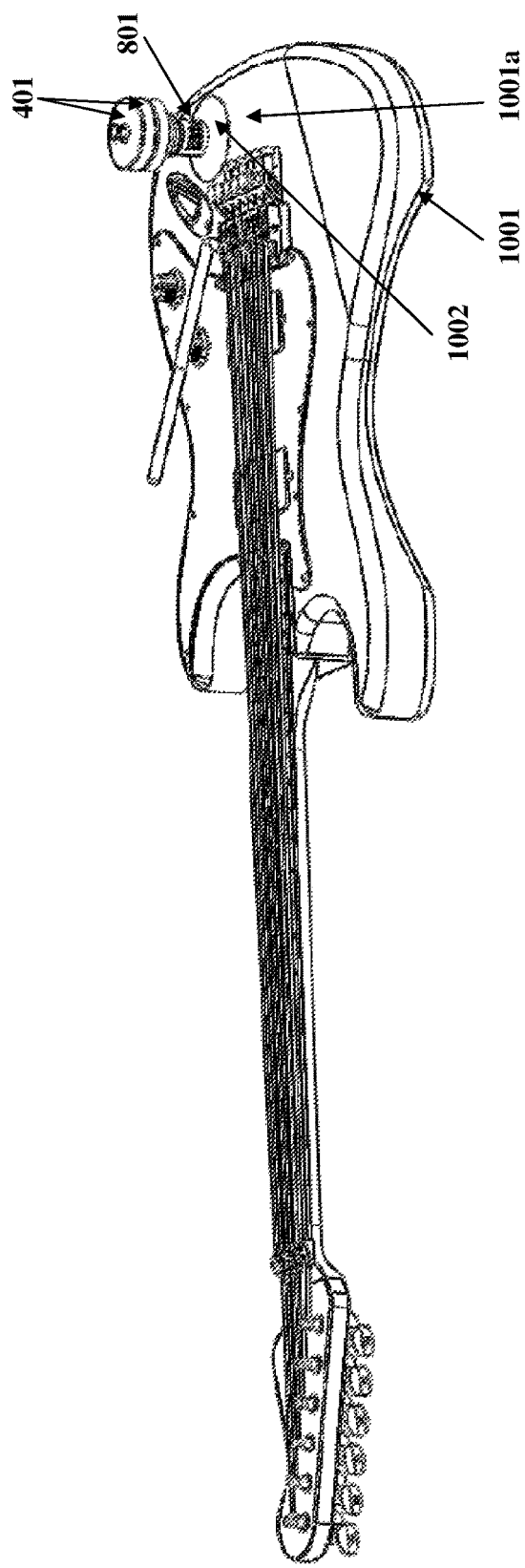

Disclosed herein is a kit 100 exemplarily illustrated in FIGS. 3A-3E, FIGS. 4A-4E, FIGS. 5A-5C, FIGS. 6A-6C, FIGS. 7A-7D, FIGS. 8A-8C, FIGS. 9A-9C, FIG. 11, FIG. 12A, FIGS. 14A-14B, FIGS. 16A-16B, FIGS. 18A-18B, FIG. 20B, FIG. 21B, FIGS. 23A-23C, FIGS. 24A-24C, FIGS. 25A-25C, and FIGS. 26A-26C, for attaching one or more of multiple interchangeable accessories comprising sound makers, for example, an egg shaker 302 exemplarily illustrated in FIG. 3A, cymbals 401 exemplarily illustrated in FIG. 4A, fashion accessories, utility accessories, instrument accessories, etc., to an instrument, for example, a post 208 of a bass drum pedal 301 exemplarily illustrated in FIG. 3A, a drum stick 507 exemplarily illustrated in FIG. 5A, a guitar 1001 exemplarily illustrated in FIG. 12B, a cajón (not shown), a drum head (not shown), etc., to enhance sound, functionality, and visual elements of the instrument, for example, the post 208 of the bass drum pedal 301, the drum stick 507, or the guitar 1001. The kit 100 disclosed herein comprises multiple interchangeable accessories, for example, sound makers such as the egg shaker 302, cymbals 401, etc., fashion accessories, utility accessories, instrument accessories, etc., and at least one attachment system 101, or 201, or 501, or 701, or 801, or 2201, or 2301 exemplarily illustrated in FIG. 1A, FIG. 2A, FIG. 5A, FIG. 7A, FIG. 8A, FIG. 22A, and FIG. 23A respectively. The attachment system 101, or 201, or 501, or 701, or 801, or 2201, or 2301 is removably attachable to a predetermined location of the instrument, for example, the post 208 of the bass drum pedal 301, the drum stick 507, or the guitar 1001 for allowing connection of at least one of the interchangeable accessories, for example, the egg shaker 302 or the cymbals 401 that enhance sound, functionality, and visual elements of the instrument, for example, the post 208 of the bass drum pedal 301, the drum stick 507, or the guitar 1001, to the instrument, for example, the post 208 of the bass drum pedal 301, the drum stick 507, or the guitar 1001. The attachment system 101, or 201, or 501, or 701, or 801, or 2201, or 2301 is made of a durable material, for example, plastic, metal, rubber, wood, nylon, etc.

For purposes of illustration, the detailed description refers to the attachment systems 101, 201, 501, 701, 801, 2201, and 2301 exemplarily illustrated in FIG. 1A, FIG. 2A, FIG. 5A, FIG. 7A, FIG. 8A, FIG. 22A, and FIG. 23A respectively, being used for attaching interchangeable accessories, for example, the egg shaker 302 exemplarily illustrated in FIG. 3A, or the cymbals 401 exemplarily illustrated in FIG. 4A, to an instrument, for example, the post 208 of the bass drum pedal 301 exemplarily illustrated in FIG. 3A, the drum stick 507 exemplarily illustrated in FIG. 5A, and the guitar 1001 exemplarily illustrated in FIG. 12B; however the scope of the attachment systems 101, 201, 501, 701, 801, 2201, and 2301 disclosed herein may be extended to be used for attaching other interchangeable accessories comprising, for example, fashion accessories, utility accessories, drum accessories such as noise makers, mallet striking tips, drum striking tips, etc., to any instrument, for example, a cajón (not shown), a drum head (not shown), any piece of drum kit hardware or musical hardware, etc., to enhance sound, functionality, and visual elements of the instrument.

Figure 1A:
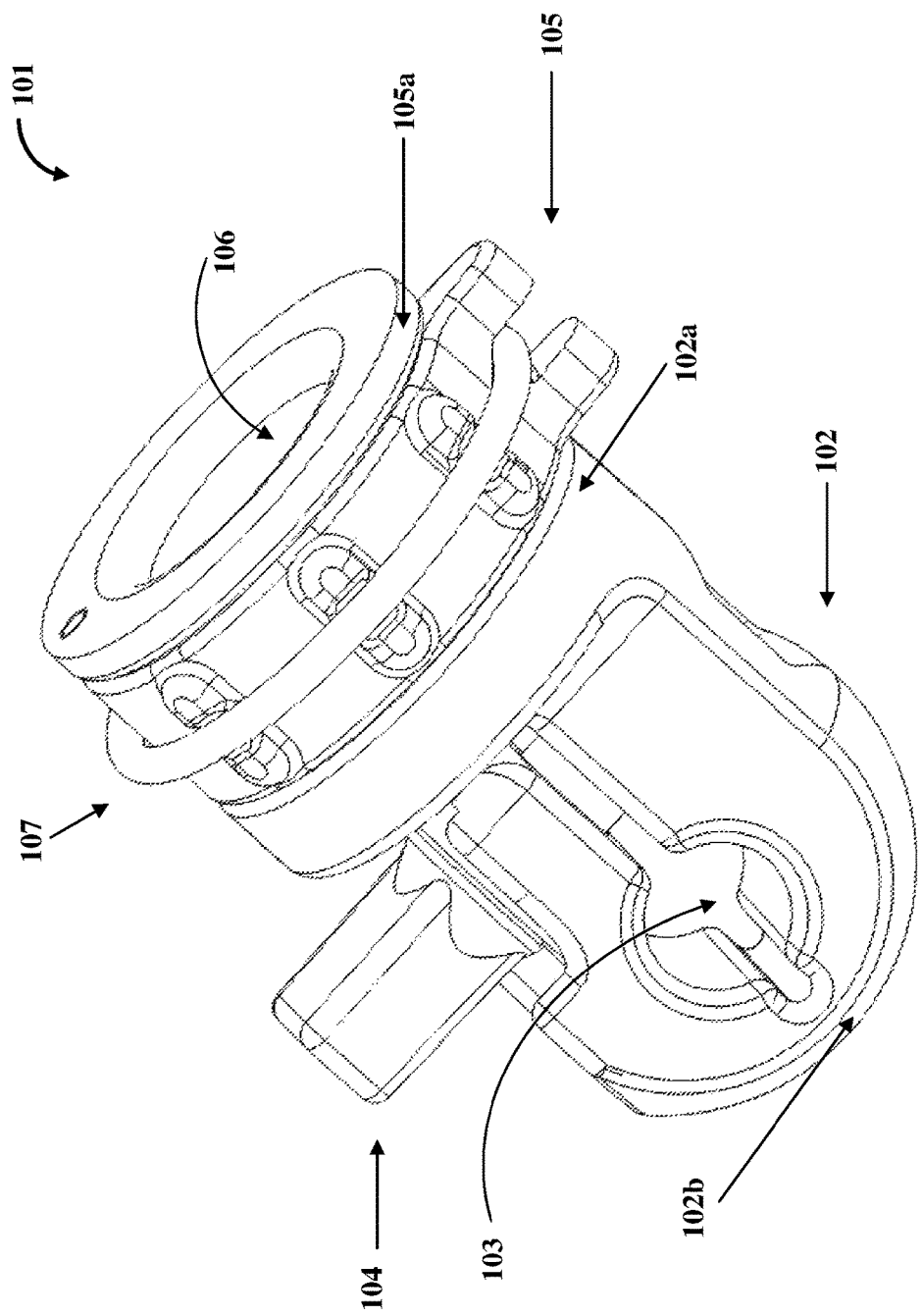
FIG. 1A exemplarily illustrates an embodiment of an attachment system for attaching an interchangeable accessory to an instrument.

FIG. 1A exemplarily illustrates an embodiment of an attachment system 101 for attaching an interchangeable accessory, for example, an egg shaker 302 exemplarily illustrated in FIG. 3A, cymbals 401 exemplarily illustrated in FIG. 4A, etc., to an instrument, for example, a post 208 of a bass drum pedal 301 exemplarily illustrated in FIG. 3A. The instrument is herein exemplarily referred to as the post 208 of the bass drum pedal 301. The attachment system 101 comprises a clamp assembly 102, for example, a ring clamp assembly, an accessory housing 105, and a release assembly 107. The ring clamp assembly 102 comprises a receptacle 103 and a fastening assembly 104. The receptacle 103 is positioned at a lower end 102b of the ring clamp assembly 102 for receiving the post 208 of the bass drum pedal 301. For example, the receptacle 103 having a circular circumference receives the post 208 of the bass drum pedal 301. The fastening assembly 104 is positioned in a generally perpendicular direction with respect to the receptacle 103 for fastening the receptacle 103 around the post 208 of the bass drum pedal 301. In the above example, the diameter of the receptacle 103 is adjusted using the fastening assembly 104 for tightly securing the receptacle 103 around the post 208 of the bass drum pedal 301.

The accessory housing 105 of the attachment system 101 is positioned on an upper end 102a of the ring clamp assembly 102 for accommodating at least one of the interchangeable accessories, for example, the egg shaker 302 or the cymbals 401. The accessory housing 105 comprises a connector element 106 defined at an upper end 105a of the accessory housing 105 for connecting the attachment system 101 to at least one of the interchangeable accessories 302 and 401. In the embodiment exemplarily illustrated in FIG. 1A, the connector element 106 is a female connector for engageably connecting the attachment system 101 to an opposing connector, that is, to a male connector of an interchangeable accessory, for example, the egg shaker 302 or the cymbals 401.

The release assembly 107 of the attachment system 101 is positioned proximal to the upper end 105a of the accessory housing 105 for securing the attached interchangeable accessory, for example, the egg shaker 302 or the cymbals 401 in the accessory housing 105 in a closed position and for releasing the attached interchangeable accessory, for example, the egg shaker 302 or the cymbals 401 from the accessory housing 105 in an open position.

Figure 1B:
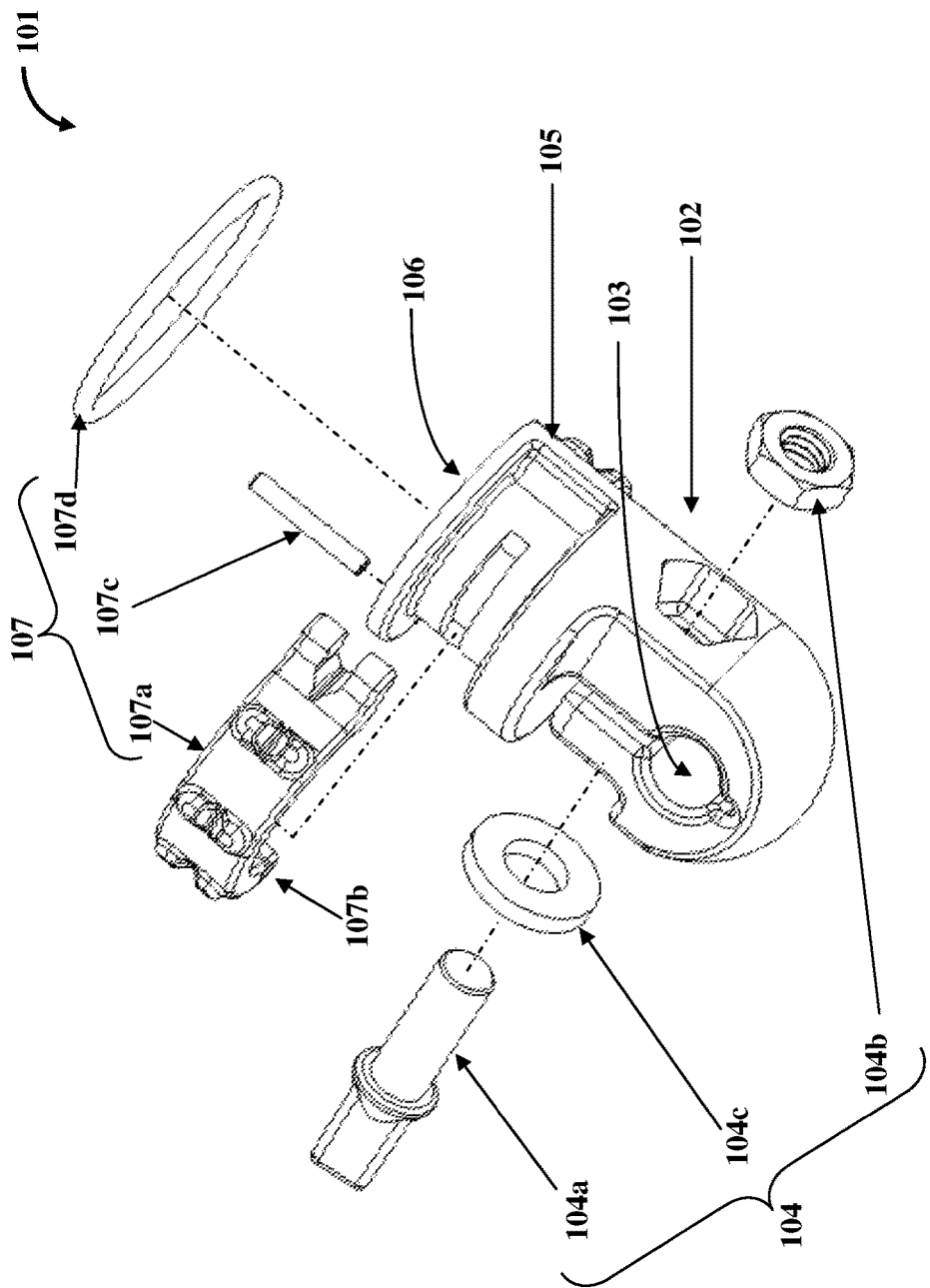
FIG. 1B exemplarily illustrates an exploded view of the embodiment of the attachment system shown in FIG. 1A.

FIG. 1B exemplarily illustrates an exploded view of the embodiment of the attachment system 101 comprising the ring clamp assembly 102, the accessory housing 105, and the release assembly 107 shown in FIG. 1A. As exemplarily illustrated in FIG. 1B, the fastening assembly 104 of the ring clamp assembly 102 comprises a bolt 104a, a nut 104b, and a washer 104c. The diameter of the receptacle 103 is adjusted around the instrument, for example, a post 208 of a bass drum pedal 301 exemplarily illustrated in FIG. 3A, using the bolt 104a and the nut 104b of the fastening assembly 104 for tightly securing the receptacle 103 around the post 208. The instrument is herein exemplarily referred to as the post 208 of the bass drum pedal 301. The release assembly 107 comprises a quick release latch 107a, a stretchable compression ring 107d, and a pin 107c for tightly securing or releasing an opposing connector of an interchangeable accessory, for example, an egg shaker 302 exemplarily illustrated in FIG. 3A, cymbals 401 exemplarily illustrated in FIG. 4A, etc. The pin 107c, for example, a metal dowel operably connects one end 107b of the quick release latch 107a into the accessory housing 105 of the attachment system 101. The quick release latch 107a is closed and the stretchable compression ring 107d is wrapped around the quick release latch 107a on the accessory housing 105 to firmly secure the quick release latch 107a to the accessory housing 105. In an example, an interchangeable accessory, for example, an egg shaker 302 or cymbals 401 with a connector piece 303 configured as a male connector exemplarily illustrated in FIGS. 3A-3B and FIGS. 4A-4B, is inserted into the connector element 106 configured as a female connector defined at the upper end 105a of the accessory housing 105 of the attachment system 101. The quick release latch 107a locks the egg shaker 302 or the cymbals 401 in place. Once locked, the egg shaker 302 or the set of cymbals 401 provides a sound texture, functionality, or look that the user prefers, to the instrument, for example, the post 208 of the bass drum pedal 301. The sound texture is provided by movement of the post 208 of the bass drum pedal 301 with the egg shaker 302 or the set of cymbals 401. To detach the connector piece 303 of the egg shaker 302 or the cymbals 401, the quick release latch 107a is opened and lifted and the connector piece 303 of the egg shaker 302 or the cymbals 401 is pulled out of the connector element 106 of the attachment system 101. The release assembly 107 is in the closed position when the quick release latch 107a is closed over the accessory housing 105 for securing the connector piece 303 of the egg shaker 302 or the cymbals 401 in the accessory housing 105. The release assembly 107 is in an open position when the quick release latch 107a is opened outwardly away from the accessory housing 105 for releasing the connector piece 303 of the egg shaker 302 or the cymbals 401 in the accessory housing 105.

Figure 1C:
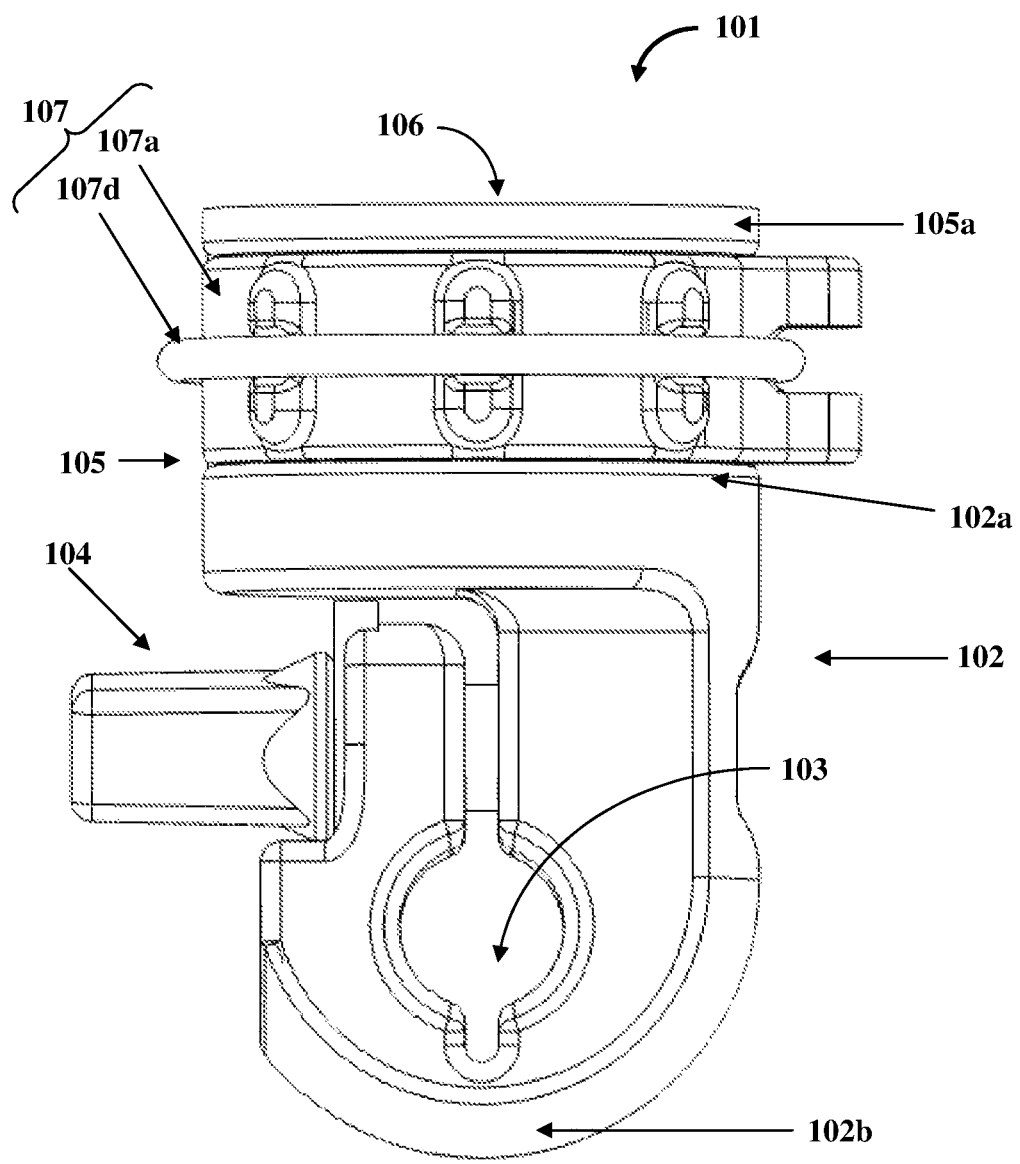
FIG. 1C exemplarily illustrates a front elevation view of the embodiment of the attachment system shown in FIG. 1A.

FIG. 1C exemplarily illustrates a front elevation view of the embodiment of the attachment system 101 shown in FIG. 1A. The receptacle 103 positioned at the lower end 102b of the ring clamp assembly 102 can be shaped to accommodate instruments with cross-sections of different shapes, for example, a square shape, a rectangular shape, a circular shape, an oval shape, a pentagon shape, etc.

Figure 1D:
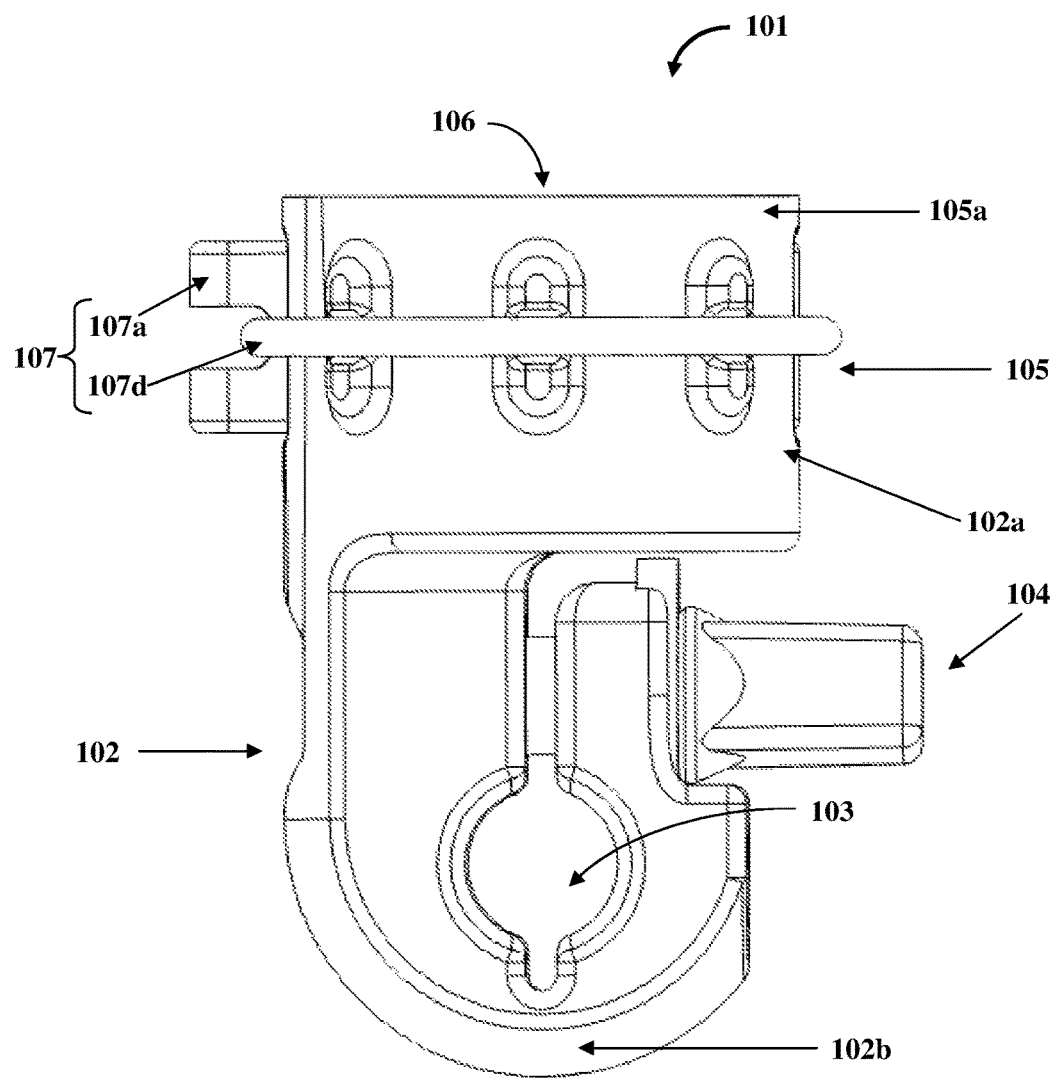
FIG. 1D exemplarily illustrates a rear elevation view of the embodiment of the attachment system shown in FIG. 1A.
Figure 1E:
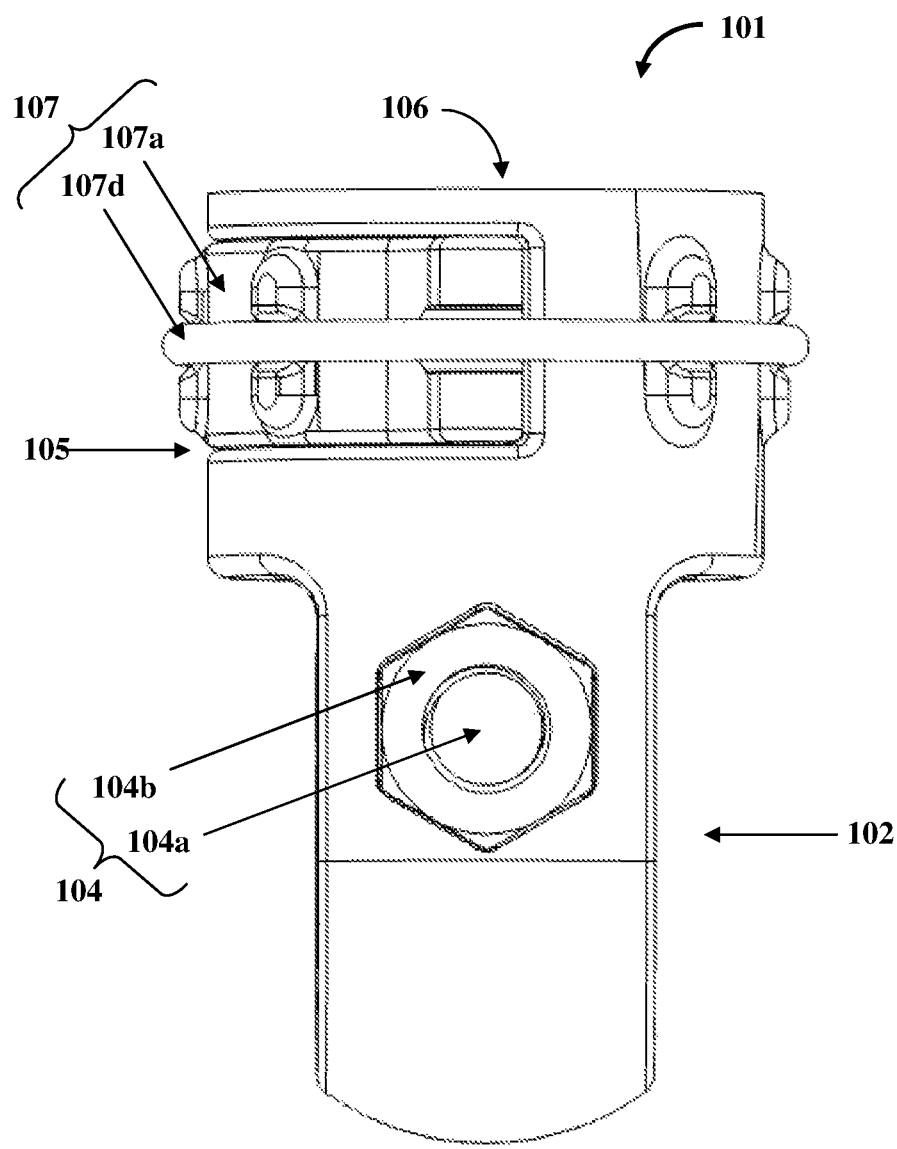
FIGS. 1E-1F exemplarily illustrate side elevation views of the embodiment of the attachment system shown in FIG. 1A.
Figure 1F:
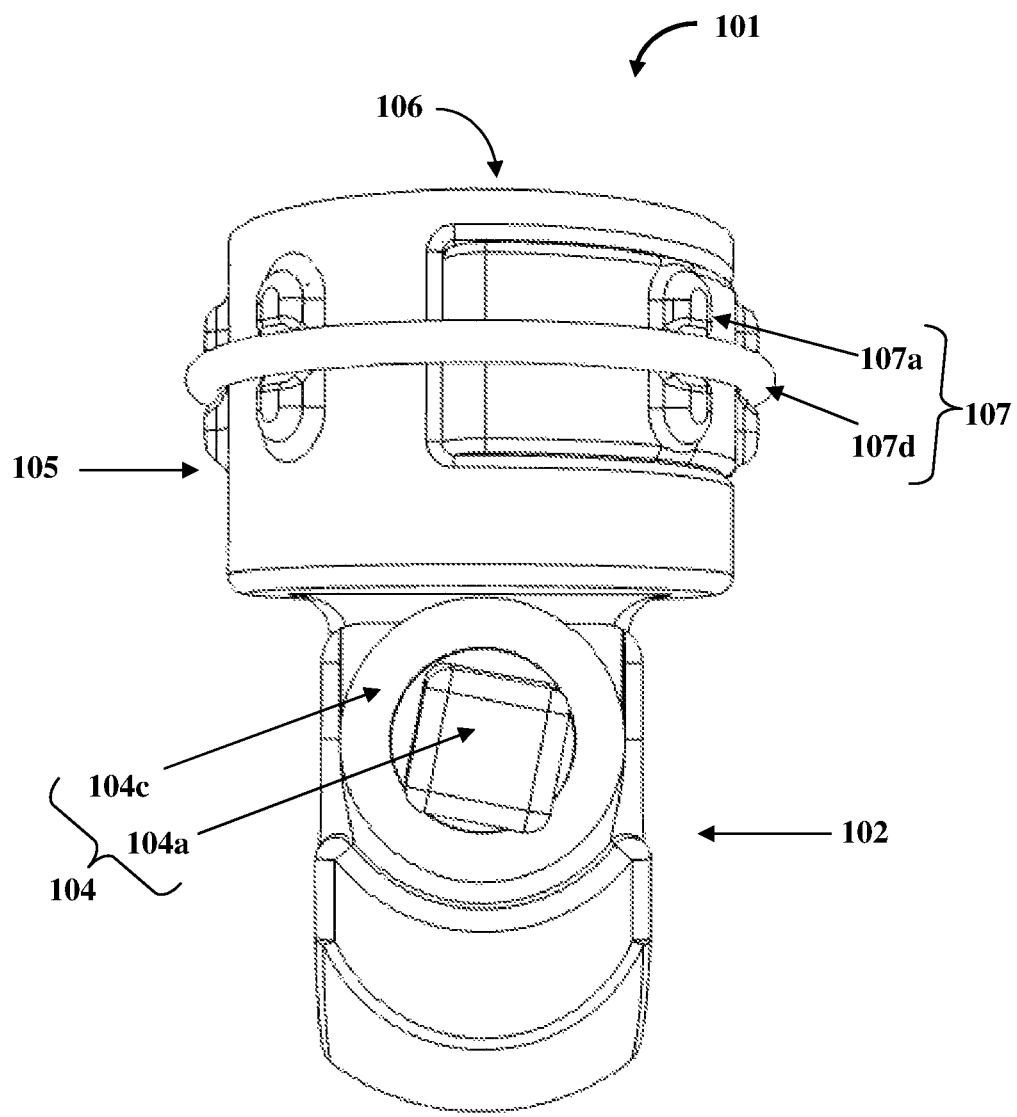
Figure 1G:
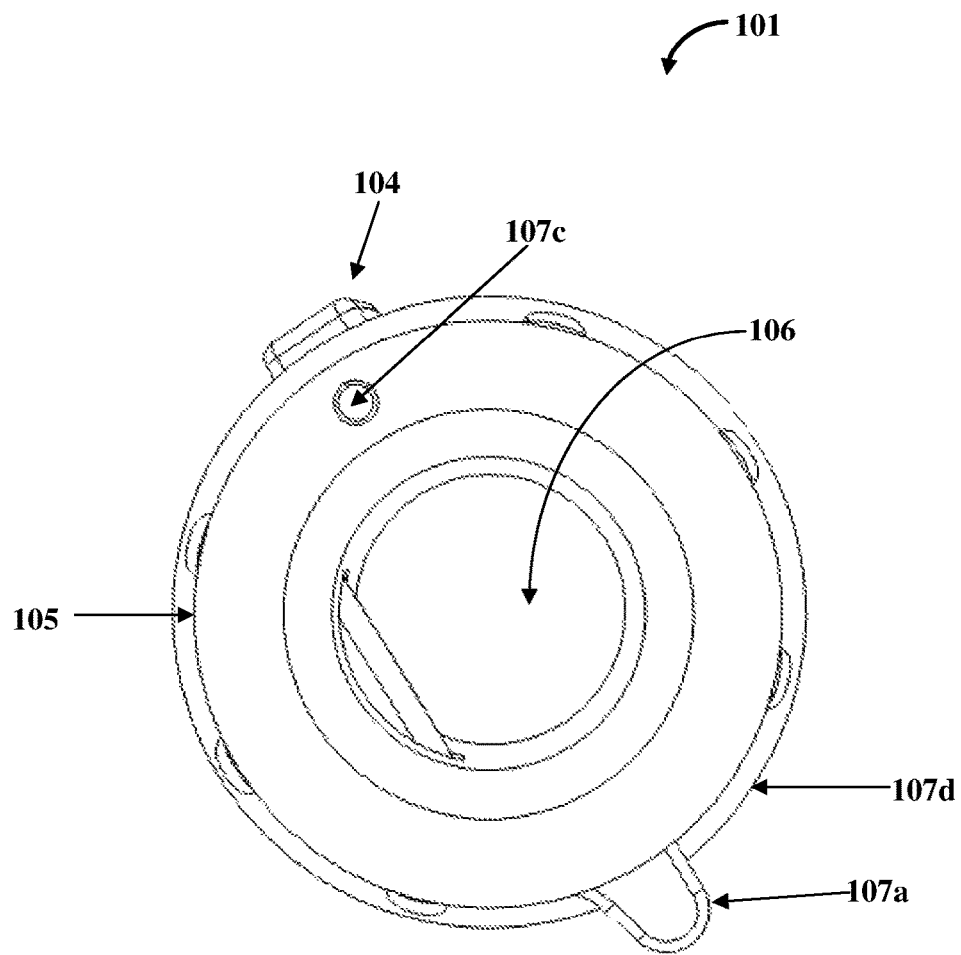
FIG. 1G exemplarily illustrates a top plan view of the embodiment of the attachment system shown in FIG. 1A.
Figure 1H:
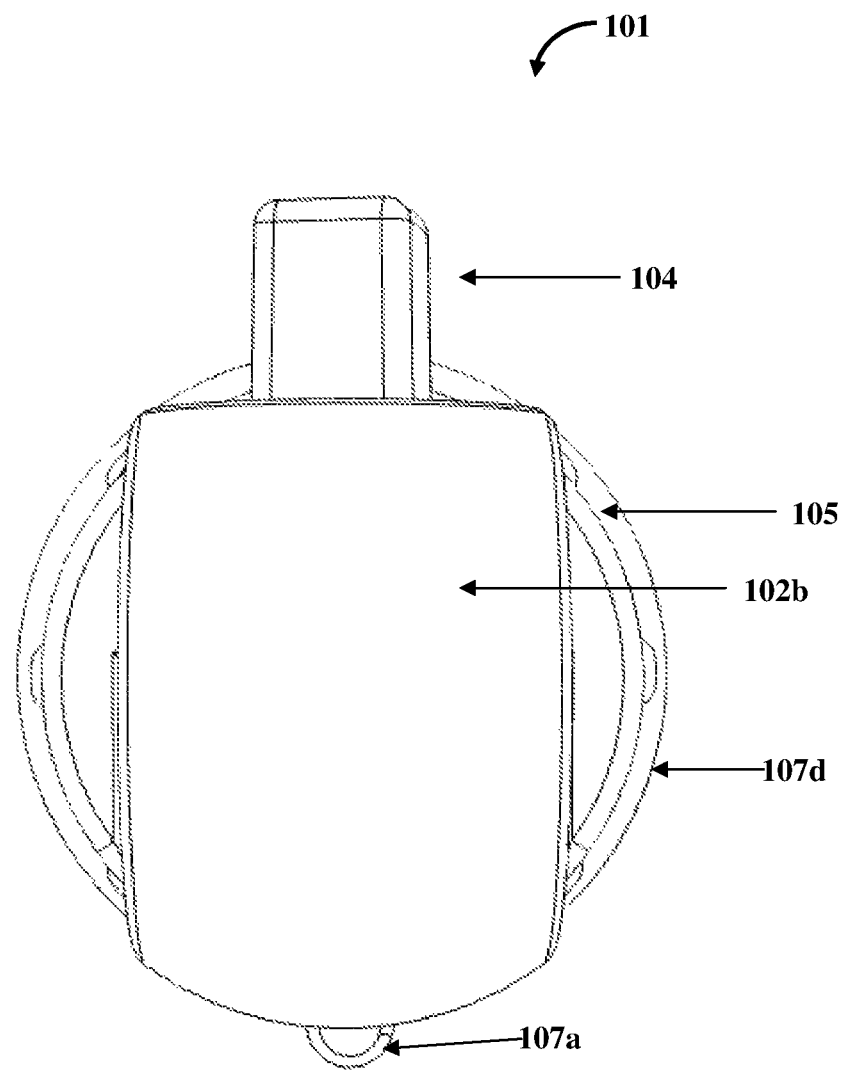
FIG. 1H exemplarily illustrates a bottom view of the embodiment of the attachment system shown in FIG. 1A.

FIGS. 1D-1H exemplarily illustrate different views of the embodiment of the attachment system 101 shown in FIG. 1A. FIG. 1D exemplarily illustrates a rear elevation view of the embodiment of the attachment system 101 shown in FIG. 1A. The attachment system 101 with the connector element 106 attaches to an instrument, for example, a post 208 of a bass drum pedal 301 exemplarily illustrated in FIG. 3A, and allows different accessories, for example, an egg shaker 302 exemplarily illustrated in FIG. 3A, cymbals 401 exemplarily illustrated in FIG. 4A, etc., to interchange and attach to the attachment system 101 on the instrument via the connector element 106. FIGS. 1E-1F exemplarily illustrate side elevation views of the embodiment of the attachment system 101 shown in FIG. 1A. As exemplarily illustrated in FIG. 1F, the washer 104c of the fastening assembly 104 is a thin plate with a hole, for example, a disc with a hole at the center. The washer 104c reduces vibration and distributes load of the bolt 104a and the nut 104b of the fastening assembly 104. The washer 104c is made, for example, of a metal or a plastic. FIG. 1G exemplarily illustrates a top plan view of the embodiment of the attachment system 101 shown in FIG. 1A. As exemplarily illustrated in FIG. 1G, the connector element 106 is a female connector, for example, a socket, for engageably connecting to an opposing connector, that is, to a male connector of an interchangeable accessory, for example, the egg shaker 302 or the cymbals 401 as disclosed in the detailed description of FIG. 1A. FIG. 1H exemplarily illustrates a bottom view of the embodiment of the attachment system 101 shown in FIG. 1A. The attachment system 101 exemplarily illustrated in FIGS. 1A-1H, can be attached to any instrument, for example, the post 208 of the bass drum pedal 301, a drum stick 507 exemplarily illustrated in FIG. 5A, a post of a hihat (not shown), a microphone (not shown), a stand, or any piece of drum kit hardware or musical hardware.

FIG. 2A exemplarily illustrates an embodiment of the attachment system 201 for attaching an interchangeable accessory, for example, an egg shaker 302 exemplarily illustrated in FIG. 3A, cymbals 401 exemplarily illustrated in FIG. 4A, etc., to an instrument, for example, to a post 208 of a bass drum pedal 301 exemplarily illustrated in FIG. 3A. In this embodiment, the attachment system 201 comprises a clamp assembly 202, for example, a wire clamp assembly, an accessory housing 205, and a release assembly 207. The wire clamp assembly 202 comprises a receptacle 203 and a fastening assembly 204. The receptacle 203 is positioned at a lower end 202b of the wire clamp assembly 202 for receiving a post 208 of an instrument. The fastening assembly 204 is positioned in a generally perpendicular direction with respect to the receptacle 203 for fastening the receptacle 203 around the post 208 of the instrument. In the above example, the diameter of the receptacle 203 around the post 208 of the instrument is adjusted using the fastening assembly 204 for tightly securing the receptacle 203 around the post 208 of the instrument.

The accessory housing 205 of the attachment system 201 is positioned on an upper end 202a of the wire clamp assembly 202 for accommodating at least one of the interchangeable accessories, for example, the egg shaker 302 or the cymbals 401. The accessory housing 205 comprises a connector element 206 defined at an upper end 205a of the accessory housing 205 for connecting the attachment system 201 to at least one of the interchangeable accessories, for example, the egg shaker 302 or the cymbals 401. In this embodiment, the connector element 206 is a female connector for engageably connecting to an opposing connector, that is, to a male connector of an interchangeable accessory, for example, the egg shaker 302 or the cymbals 401.

The release assembly 207 of the attachment system 201 is positioned proximal to the upper end 205a of the accessory housing 205 for securing the attached interchangeable accessory, for example, the egg shaker 302 or the cymbals 401 in the accessory housing 205 in a closed position and for releasing the attached interchangeable accessory, for example, the egg shaker 302 or the cymbals 401 from the accessory housing 205 in an open position. The release assembly 207 comprises a quick release latch 207a, a stretchable compression ring 207d, and a pin 207c for tightly securing or releasing an opposing connector of an interchangeable accessory, for example, the egg shaker 302 exemplarily illustrated in FIGS. 3A-3E, or the cymbals 401 exemplarily illustrated in FIGS. 4A-4E, to the instrument, for example, a post 208 of a bass drum pedal 301 exemplarily illustrated in FIGS. 3A-3E. The pin 207c, for example, a metal dowel operably connects one end 207b of the quick release latch 207a into the accessory housing 205 of the attachment system 201. The quick release latch 107a is closed and the stretchable compression ring 207d is wrapped around the quick release latch 207a on the accessory housing 205 to firmly secure the quick release latch 207a to the accessory housing 205 as disclosed in the detailed description of FIG. 1B.

Figure 2B:
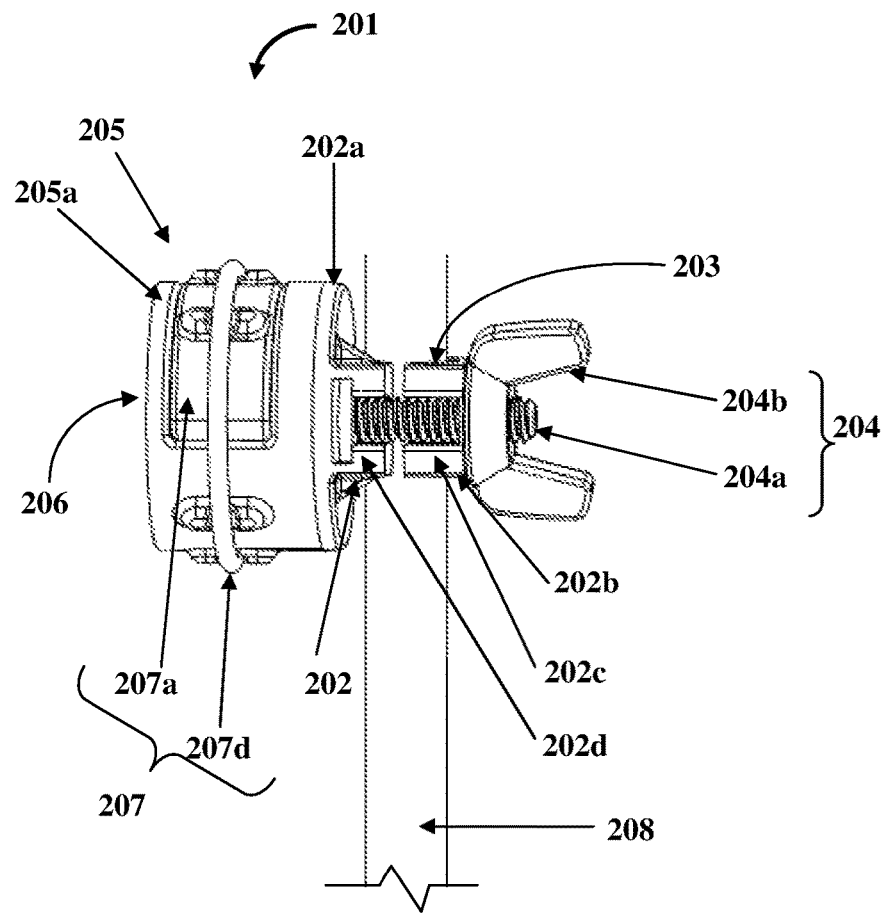
FIGS. 2B-2C exemplarily illustrate side elevation views of the embodiment of the attachment system shown in FIG. 2A.
Figure 2C:
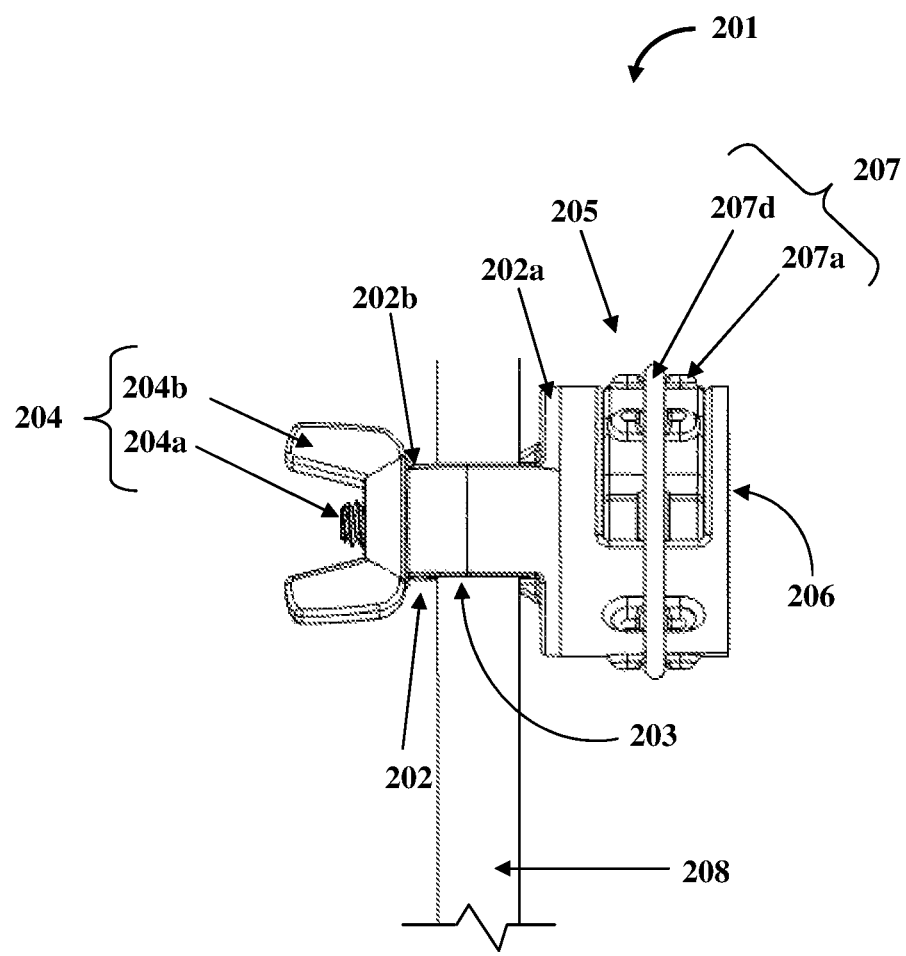

FIGS. 2B-2C exemplarily illustrate side elevation views of the embodiment of the attachment system 201 shown in FIG. 2A. As exemplarily illustrated in FIGS. 2B-2C, the fastening assembly 204 comprises a screw 204a and a wing nut 204b. The diameter of the receptacle 203 is adjusted, for example, around a cylindrical rod or the post 208 of the instrument using the screw 204a and the wing nut 204b of the fastening assembly 204. The fastening assembly 204 tightly secures the arms 202c and 202d of the wire clamp assembly 202 that define the receptacle 203 around a cylindrical rod or the post 208 of the instrument.

FIGS. 3A-3E exemplarily illustrates the embodiment of the attachment system 201 shown in FIGS. 2A-2C, for attaching an interchangeable accessory, for example, an egg shaker 302 to an instrument, for example, a post 208 of a bass drum pedal 301. The egg shaker 302 is a hand percussion instrument that makes a sound when shaken. An outer casing of the egg shaker 302 is ovoid or shaped like an egg. The egg shaker 302 comprises small, loose objects, for example, seeds or beads, which create percussive sounds as the small, loose objects collide, both with each other and with the inside surface of the egg shaker 302. The attachment system 201 is removably attached to a predetermined location of the post 208 of the bass drum pedal 301 as exemplarily illustrated in FIGS. 3A-3B. FIGS. 3A-3B exemplarily illustrate disassembled views showing the embodiment of the attachment system 201 of FIGS. 2A-2C, attached to the post 208 of the bass drum pedal 301, for attaching the egg shaker 302 to the post 208 of the bass drum pedal 301, where the stretchable compression ring 207d of the release assembly 207 exemplarily illustrated in FIG. 2A, is removed from the attachment system 201 and the quick release latch 207a of the release assembly 207 is in an open position.

The egg shaker 302 is attached to the attachment system 201 via the connector element 206 of the attachment system 201. In this embodiment, the connector element 206 is a female connector, for example, a socket that connects the egg shaker 302 to the post 208 of the bass drum pedal 301. A connector piece 303 is attached to and extends from a lower end 302a of the egg shaker 302 as exemplarily illustrated in FIGS. 3A-3B. This connector piece 303 of the egg shaker 302 is a male connector, for example, a stud that engageably connects the egg shaker 302 to the connector element 206, that is, to the female connector defined on the accessory housing 205 of the attachment system 201 to form a connection assembly 304. This connection assembly 304 connects the egg shaker 302 to the post 208 of the bass drum pedal 301. When a musician activates a beater 208b positioned on an upper end 208a of the post 208 via the bass drum pedal 301, the egg shaker 302 adds to the sound made by the beater 208b against a bass drum (not shown), thereby enhancing the sound and the functionality of the bass drum. For example, when a musician triggers the bass drum pedal 301 to play the bass drum, the egg shaker 302 attached to the post 208 of the bass drum pedal 301 shakes up and down resulting in collision of the small, loose objects inside the egg shaker 302 with each other and with an inside surface of the egg shaker 302, to create a fast percussion line that generates an enhanced sound. The generated sound comprises a combination of a drum beat and sound of the egg shaker 302. The egg shaker 302 also adds a decorative visual element to the assembly of the beater 208b and the post 208 of the bass drum pedal 301.

FIGS. 3C-3E exemplarily illustrate assembled views showing the embodiment of the attachment system 201 of FIGS. 2A-2C, attached to the instrument, for example, the post 208 of the bass drum pedal 301, and the interchangeable accessory, for example, the egg shaker 302 connected to the post 208 of the bass drum pedal 301 via this embodiment of the attachment system 201. The egg shaker 302 is connected to the connector element 206 of the attachment system 201 via the connector piece 303 of the egg shaker 302 and attached to the post 208 of the bass drum pedal 301 through the attachment system 201 to generate sounds while the bass drum pedal 301 is activated. In an example, if the connector element of the attachment system 201 is a male connector (not shown), a female connector (not shown) is used for connecting the egg shaker 302 to the attachment system 201. The attachment system 201 with the connector element 206 attaches to the post 208 of the bass drum pedal 301 and allows different accessories to be attached to the attachment system 201 on the post 208 of the bass drum pedal 301 via the connector element 206. In an embodiment, the connector element 206 that attaches or connects to the attachment system 201 on the post 208 of the bass drum pedal 301 comprises, for example, one or more sound makers that generate sounds while using the bass drum pedal 301, fashion accessories, tips to be used for striking a drum (not shown) and for creating different sounds, or any type of accessory. After the egg shaker 302 is connected to the attachment system 201, the quick release latch 207*a* is closed and the stretchable compression ring 207*d* is wrapped around the quick release latch 207*a* on the accessory housing 205 exemplarily illustrated in FIGS. 3A-3B, to firmly secure the quick release latch 207*a* to the accessory housing 205. The release assembly 207 constituted by the quick release latch 207*a* and the stretchable compression ring 207*d* locks the egg shaker 302 in place as exemplarily illustrated in FIGS. 3C-3E. To detach the connector piece 303 of the egg shaker 302, the quick release latch 207*a* is lifted and the connector piece 303 is pulled out of the connector element 206 of the attachment system 201. The attachment system 201 disclosed herein allows a user to quickly add or change accessories on the bass drum pedal 301, for example, for fashion, to create additional sounds, etc.

FIGS. 4A-4E exemplarily illustrate the embodiment of the attachment system 201 shown in FIGS. 2A-2C, for attaching an interchangeable accessory, for example, cymbals 401 to an instrument, for example, a post 208 of a bass drum pedal 301. A cymbal 401 is a percussion instrument made, for example, of a generally concave round brass plate that can be struck to produce a ringing or clashing sound. The attachment system 201 is removably attached to a predetermined location of the post 208 of the bass drum pedal 301 as exemplarily illustrated in FIGS. 4A-4B. FIGS. 4A-4B exemplarily illustrate disassembled views showing the embodiment of the attachment system 201 of FIGS. 2A-2C, attached to the post 208 of the bass drum pedal 301, for attaching the cymbals 401 to the post 208 of the bass drum pedal 301. In FIGS. 4A-4B, the stretchable compression ring 207*d* is removed from the attachment system 201 and the quick release latch 207*a* is in an open position. The cymbals 401 are attached to the attachment system 201 via the connector element 206 of the attachment system 201. A connector piece 303 is attached to and extends from a lower end 402*a* of a rod 402 that connects the cymbals 401 as exemplarily illustrated in FIGS. 4A-4B. This connector piece 303 of the cymbals 401 is a male connector, for example, a stud, that engageably connects the cymbals 401 to the connector element 206, that is, to a female connector defined on the accessory housing 205 of the attachment system 201, to form a connection assembly 304. This connection assembly 304 connects the cymbals 401 to the post 208 of the bass drum pedal 301.

FIGS. 4C-4E exemplarily illustrate assembled views showing the embodiment of the attachment system 201 of FIGS. 2A-2C, attached to the instrument, and the cymbals 401 connected to the post 208 of the bass drum pedal 301 via this embodiment of the attachment system 201. The cymbals 401 are connected to the connector element 206 of the attachment system 201 via the connector piece 303 of the cymbals 401 and attached to the post 208 of the bass drum pedal 301 through the attachment system 201 to generate sounds while the bass drum pedal 301 is activated. After the cymbals 401 are connected to the attachment system 201, the quick release latch 207*a* is closed and the stretchable compression ring 207*d* is wrapped around the quick release latch 207*a* on the accessory housing 205 exemplarily illustrated in FIGS. 4A-4B, to firmly secure the quick release latch 207*a* to the accessory housing 205. The release assembly 207 constituted by the quick release latch 207*a* and the stretchable compression ring 207*d* locks the cymbals 401 in place as exemplarily illustrated in FIGS. 4C-4E. To detach the connector piece 303 of the cymbals 401, the quick release latch 207*a* is lifted and the connector piece 303 is pulled out of the connector element 206 of the attachment system 201. In an example, when a musician triggers the bass drum pedal 301 to play the bass drum (not shown), the cymbals 401 attached to the post 208 of the bass drum pedal 301 shake up and down to create a fast percussion line that generates an enhanced sound. The generated sound comprises a combination of a drum beat and the sound of the cymbals 401. The cymbals 401 also add a decorative visual element to the assembly of the beater 208*b* and the post 208 of the bass drum pedal 301.

Figure 5B:
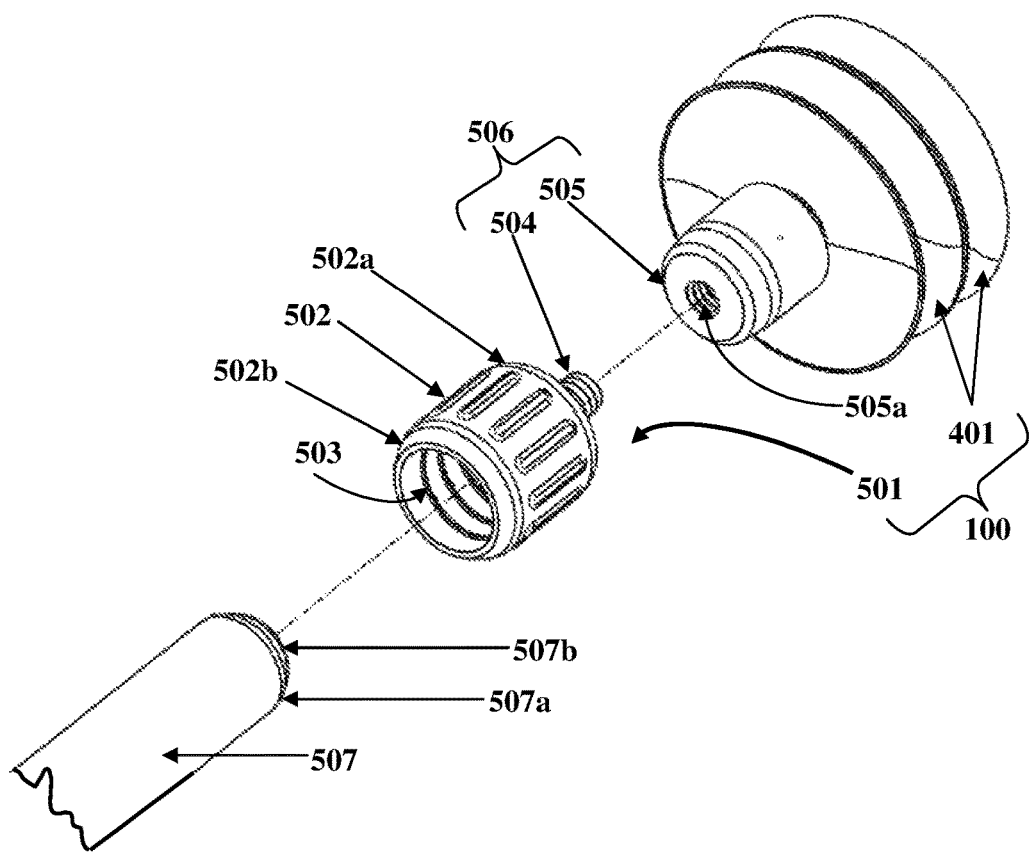
Figure 5C:
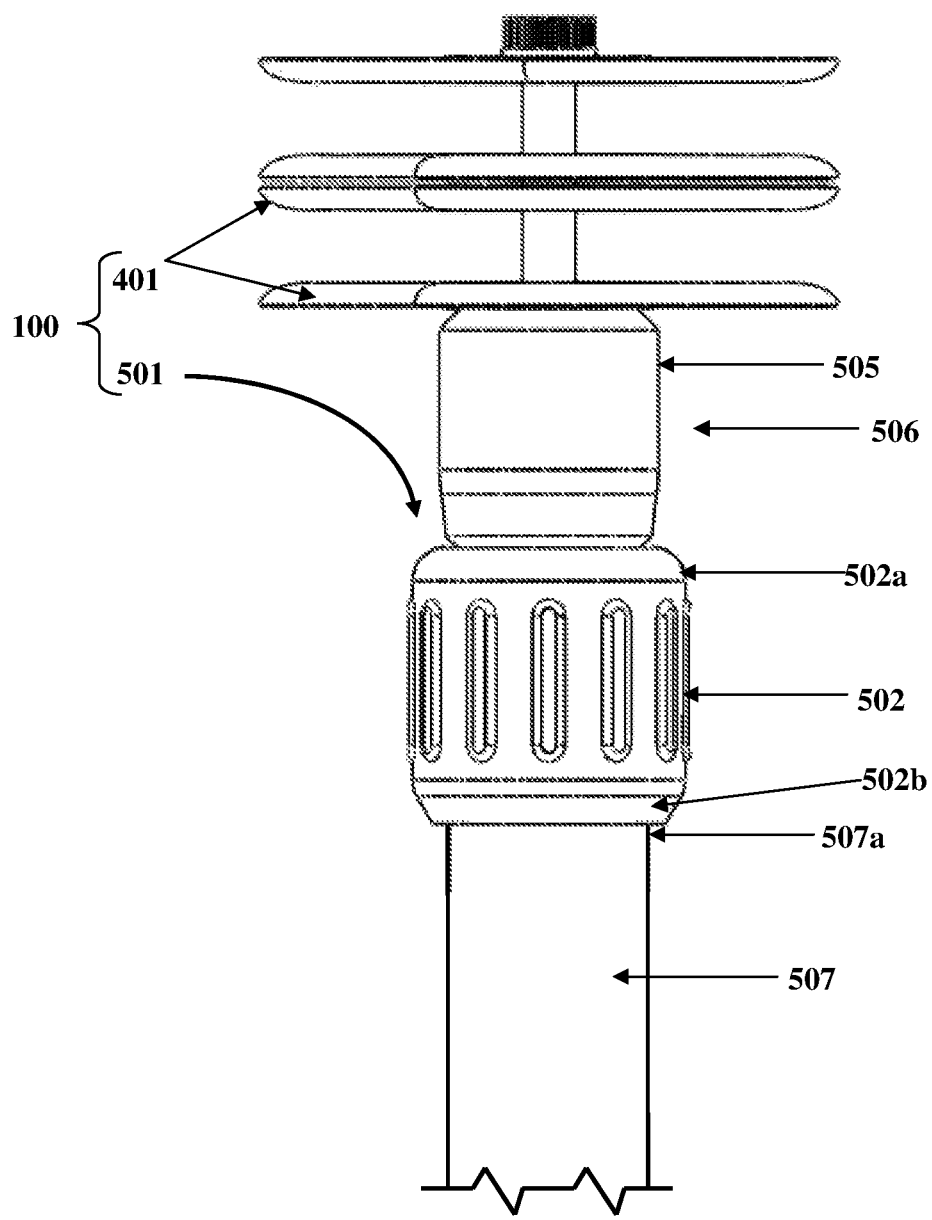
FIG. 5C exemplarily illustrates an assembled view of the kit, showing the interchangeable accessory connected to the drum stick via the drum stick attachment system.

FIGS. 5A-5C illustrates an embodiment of a drum stick attachment system 501 for attaching an interchangeable accessory, for example, cymbals 401 to a drum stick 507 to enhance sound, functionality, and visual elements of the drum stick 507. The drum stick 507 is a percussion mallet used, for example, for playing a snare drum, a drum kit, and other percussion instruments. FIGS. 5A-5B exemplarily illustrate disassembled views of the kit 100 comprising the drum stick attachment system 501 for attaching the cymbals 401 to a drum stick 507. The drum stick attachment system 501 comprises an attachment member 502 and a connector element 504. In an embodiment, the attachment member 502 is a generally cylindrical attachment member removably attachable to one end 507*a* of a drum stick 507 of one of multiple sizes. The attachment member 502 comprises inner surface grooves 503 defined at a lower end 502*b* of the attachment member 502 to grip threading 507*b* positioned on one end 507*a* of the drum stick 507 as exemplarily illustrated in FIGS. 5A-5B. The connector element 504 of the drum stick attachment system 501 is operably connected to a distal end 502*a* of the attachment member 502 for connecting the attachment member 502 to the cymbals 401. The connector element 504, for example, a threaded screw engages with the inner surface grooves 505*a* defined in the connector piece 505 connected to the cymbals 401. The attachment member 502 and the connector element 504 are made of different types of materials, for example, plastic, metal, rubber, wood, etc.

The cymbals 401 exemplarily illustrated in FIGS. 5A-5C, are attached to the attachment member 502 through the connector element 504. In this embodiment, a connector piece 505 of the cymbals 401 is attached to and extends from a lower end 402*a* of a rod 402 that connects the cymbals 401 as exemplarily illustrated in FIG. 5A. This connector piece 505 of the cymbals 401 connects the cymbals 401 to the connector element 504 of the drum stick attachment system 501 to form a connection assembly 506. For example, if the connector element 504 is a male connector, a female connector piece 505 is used for connecting the cymbals 401 to the attachment member 502 of the drum stick attachment system 501 as exemplarily illustrated in FIGS. 5A-5C. In this example, the connector piece 505 of the cymbals 401 comprises internal threading to engageably connect to the threading of the connector element 504 attached to the distal end 502*a* of the attachment member 502. FIG. 5C exemplarily illustrates an assembled view of the kit 100, showing the cymbals 401 connected to the drum stick 507 via the drum stick attachment system 501. The cymbals 401 are threadably engaged to the connector element 504 of the drum stick attachment system 501 via the connector piece 505 and attached to the drum stick 507 through the attachment member 502 of the drum stick attachment system 501 to generate sounds while using the drum stick 507. In another example, if the connector element is a female connector (not shown), a male connector piece (not shown) is used for connecting the cymbals 401 to the attachment member 502. The drum stick attachment system 501 attaches to the drum stick 507 and allows different accessories to interchange and attach to the attachment member 502 of the drum stick attachment system 501 on the drum stick 507 via the connector element 504 of the drum stick attachment system 501. In an embodiment, the connector element 504 that attaches or connects to the attachment member 502 on the drum stick 507 comprises, for example, one or more sound makers to generate sounds while using the drum stick 507, fashion accessories, tips to be used for striking a drum and for creating different sounds, or any type of accessory. The drum stick attachment system 501 disclosed herein allows a user to quickly add or change accessories on the drum stick 507, for example, for fashion, to create additional sounds, etc. When a musician shakes the drum stick 507, the cymbals 401 attached to the drum stick 507 strike against each other to generate percussive sounds. Similarly, when the musician plays a drum (not shown) using the drum stick 507, a drum beat is mixed with the percussive sounds generated by the cymbals 401, thereby producing an enhanced sound.

Figure 6A:
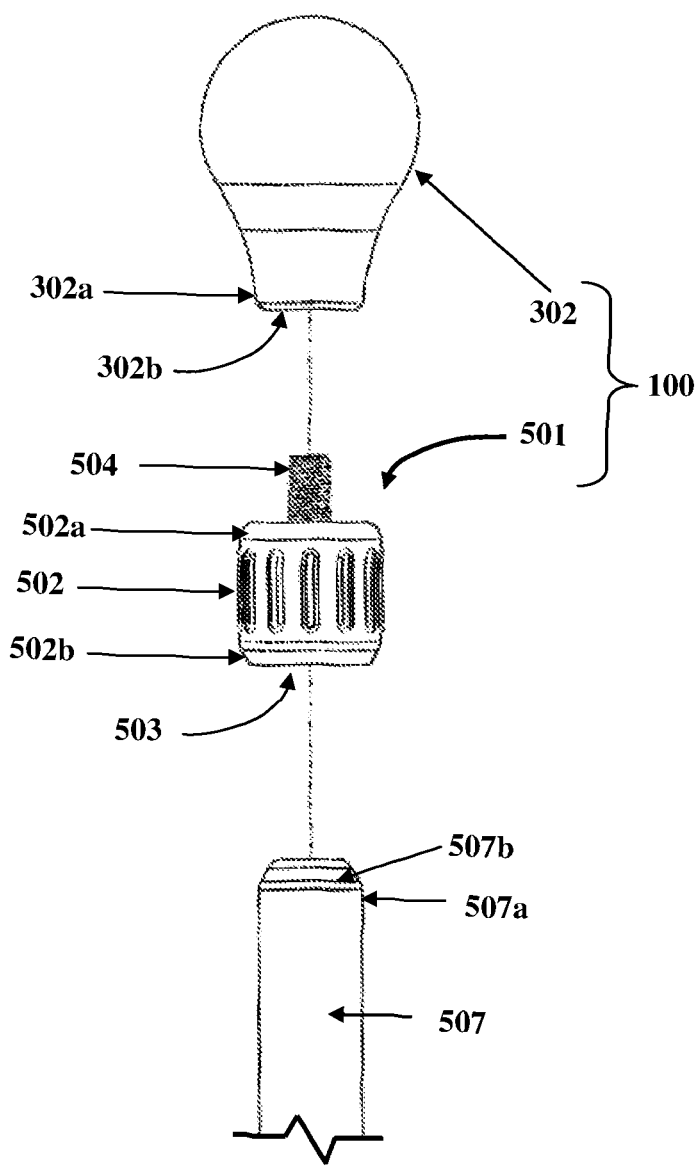
FIGS. 6A-6B exemplarily illustrate disassembled views of a kit comprising the drum stick attachment system for attaching another interchangeable accessory to a drum stick.
Figure 6B:
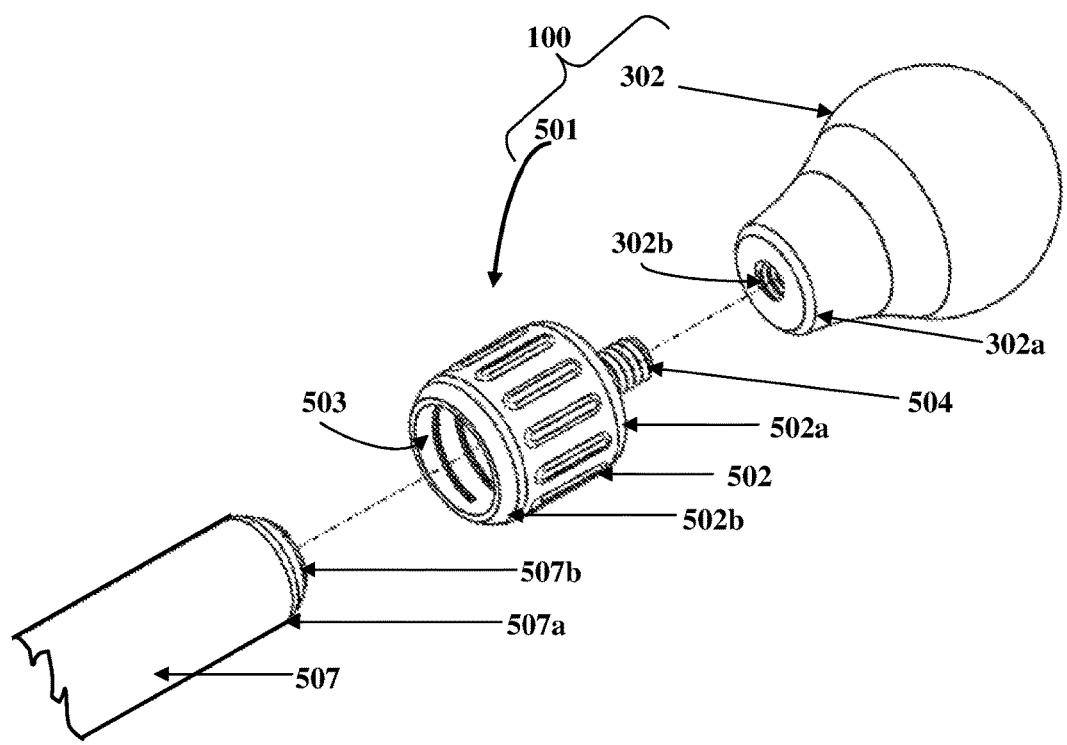
Figure 6C:
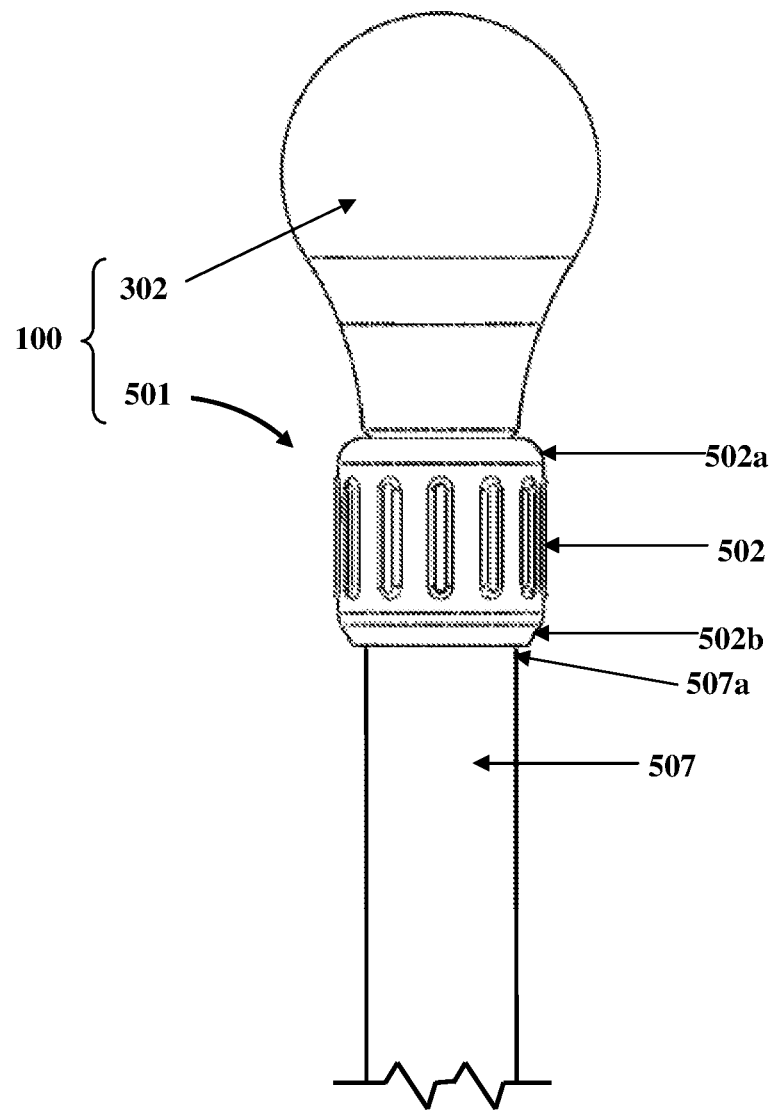
FIG. 6C exemplarily illustrates an assembled view of the kit, showing the other interchangeable accessory connected to the drum stick via the drum stick attachment system.

FIGS. 6A-6C exemplarily illustrate the embodiment of the drum stick attachment system 501 for attaching an interchangeable accessory, for example, an egg shaker 302 to a drum stick 507. FIGS. 6A-6B exemplarily illustrates disassembled views of the kit 100 comprising the drum stick attachment system 501 for attaching the egg shaker 302 to the drum stick 507. The egg shaker 302 is attached to the generally cylindrical attachment member 502 of the drum stick attachment system 501 via the connector element 504 of the drum stick attachment system 501. The lower end 302a of the egg shaker 302 is a female connector comprising internal threading 302b that engageably connects to the connector element 504, that is, a male connector, for example, a threaded screw attached to the distal end 502a of the generally cylindrical attachment member 502. FIG. 6C exemplarily illustrates an assembled view of the kit 100, showing the egg shaker 302, connected to the drum stick 507 via the drum stick attachment system 501. The inner surface grooves 503 defined at a lower end 502b of the generally cylindrical attachment member 502 are threadably engaged with the threading 507b positioned at one end 507a of the drum stick 507 to engageably connect the drum stick attachment system 501 to the end 507a of the drum stick 507. The egg shaker 302 is threadably engaged to the connector element 504 and is attached to the drum stick 507 through the generally cylindrical attachment member 502 of the drum stick attachment system 501 to generate sounds while using the drum stick 507. The sounds generated by the egg shaker 302 enhance the sound created when the drum stick 507 beats a drum (not shown). For example, when a musician shakes the drum stick 507, the egg shaker 302 attached to the drum stick 507 via the drum stick attachment system 501 shakes up and down resulting in collision of the small, loose objects inside the egg shaker 302 with each other and with an inside surface of the egg shaker 302, to create a fast percussion line that generates an enhanced sound. Similarly, when the musician plays a drum (not shown) using the drum stick 507, a drum beat is mixed with the sounds generated by the egg shaker 302, thereby producing an enhanced sound.

Figure 7A:
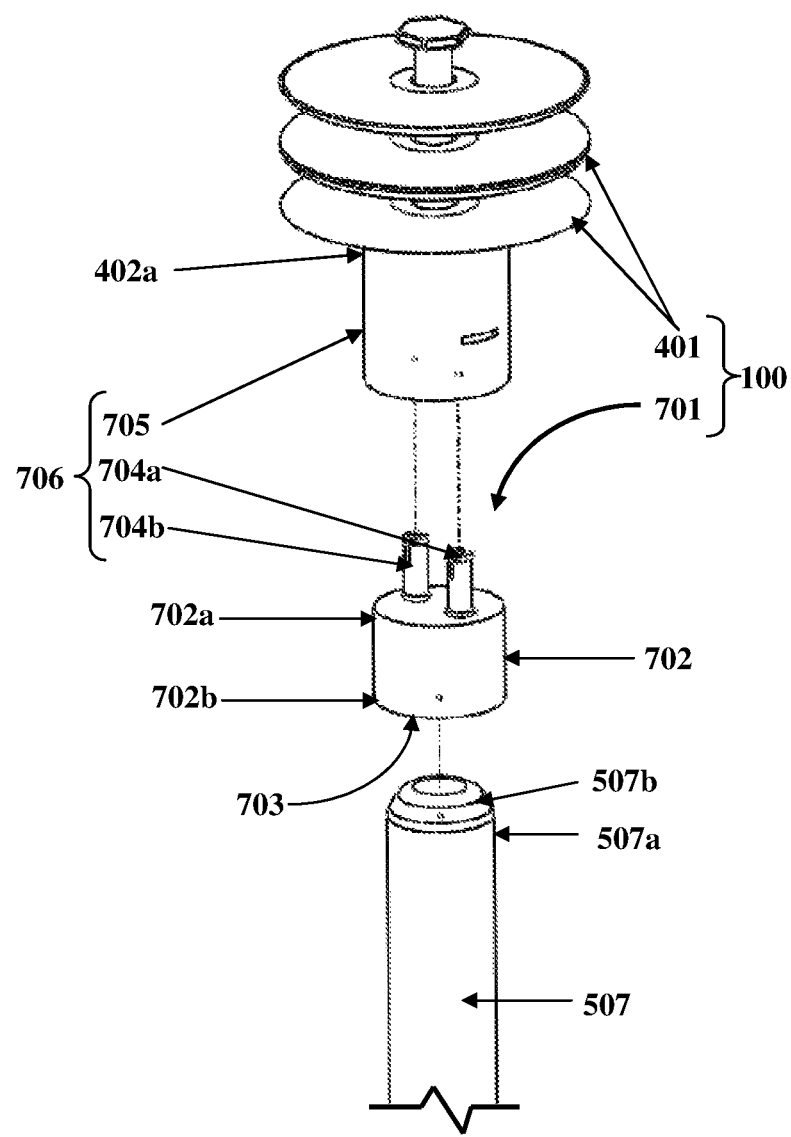
FIGS. 7A-7B exemplarily illustrate disassembled views of a kit comprising an embodiment of the drum stick attachment system for attaching an interchangeable accessory to a drum stick.
Figure 7B:
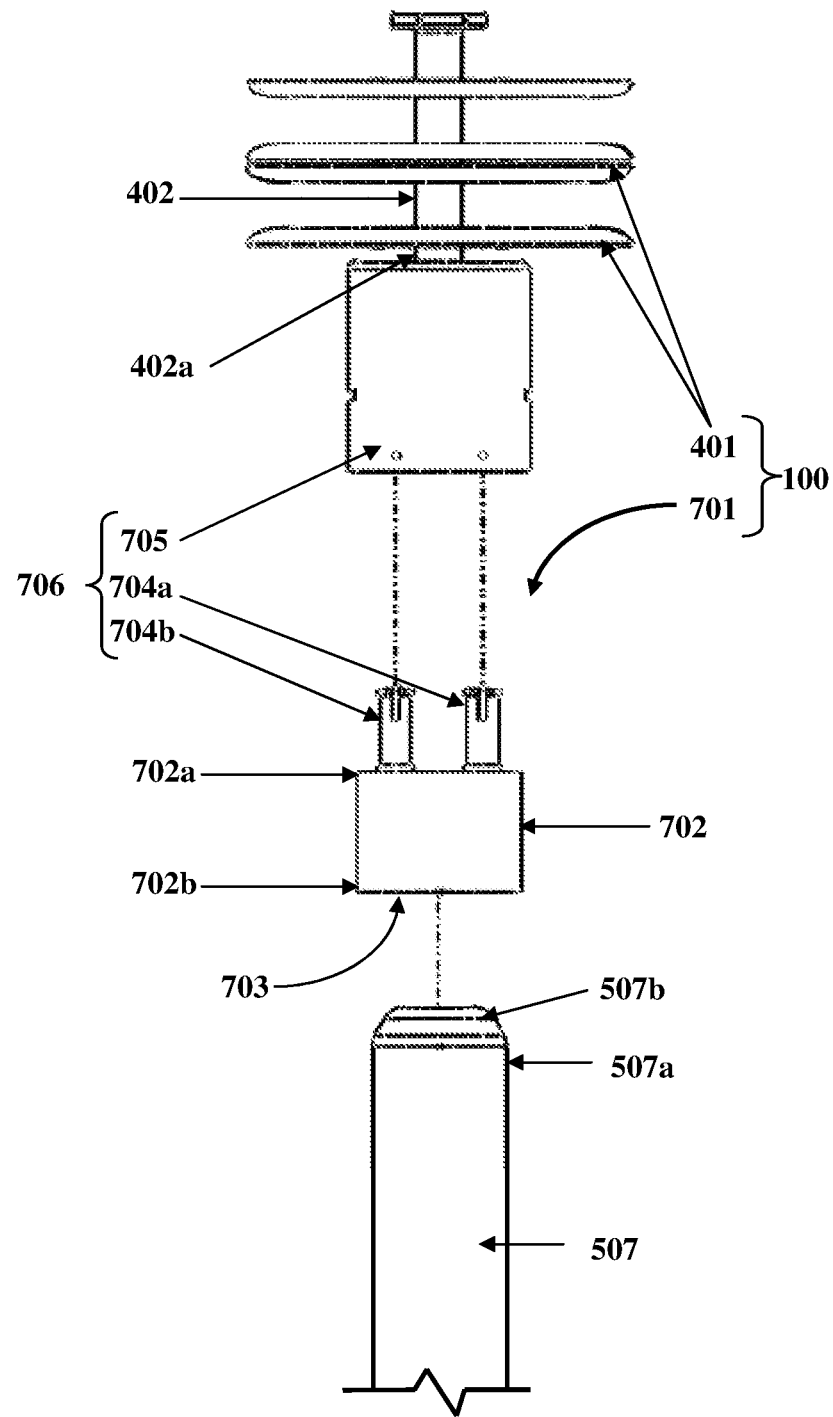
Figure 7C:
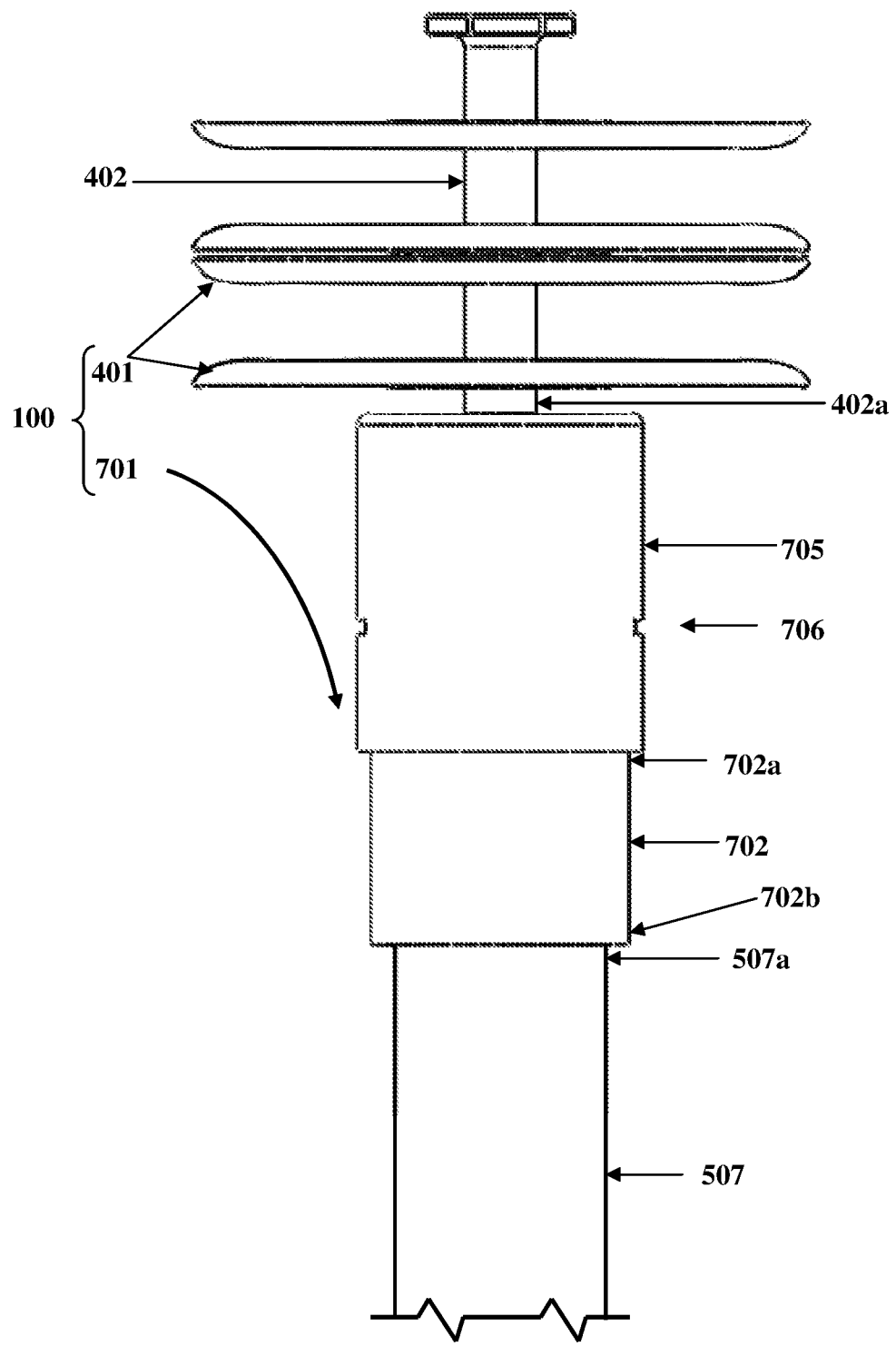
FIG. 7C exemplarily illustrates an assembled view of the kit, showing the interchangeable accessory connected to the drum stick via the embodiment of the drum stick attachment system shown in FIGS. 7A-7B.

FIGS. 7A-7C illustrates another embodiment of the drum stick attachment system 701 for attaching an interchangeable accessory, for example, cymbals 401 to the drum stick 507. FIGS. 7A-7B exemplarily illustrate disassembled views of the kit 100 comprising the embodiment of the drum stick attachment system 701 for attaching the cymbals 401 to the drum stick 507. In this embodiment, the drum stick attachment system 701 disclosed herein comprises a generally cylindrical attachment member 702 and connector elements 704a and 704b. The generally cylindrical attachment member 702 is removably attachable to one end 507a of a drum stick 507 of one of multiple sizes. The connector elements 704a and 704b are connected to and extend from a distal end 702a of the generally cylindrical attachment member 702. The connector elements 704a and 704b connect to the cymbals 401 via a connector piece 705 of the cymbals 401. The generally cylindrical attachment member 702 comprises inner surface grooves 703 defined at a lower end 702b of the generally cylindrical attachment member 702 to grip one end 507a of the drum stick 507.

FIG. 7C exemplarily illustrates an assembled view of the kit 100, showing the cymbals 401 connected to the drum stick 507 via the embodiment of the drum stick attachment system 701 shown in FIGS. 7A-7B. In this embodiment, the connector piece 705 is attached to and extends from a lower end 402a of the rod 402 that connects the cymbals 401 as exemplarily illustrated in FIGS. 7A-7B. This connector piece 705 of the cymbals 401 connects to the connector elements 704a and 704b to form a connection assembly 706. If the connector elements 704a and 704b are male connectors as exemplarily illustrated in FIGS. 7A-7B, a female connector piece 705 is used for connecting the cymbals 401 to the generally cylindrical attachment member 702 of the drum stick attachment system 701 as exemplarily illustrated in FIG. 7A. The connector piece 705 of the cymbals 401 is, for example, a stud spring tab cap that engageably connects to the connector elements 704a and 704b attached to the distal end 702a of the generally cylindrical attachment member 702 of the drum stick attachment system 701. In another example, if the connector element is a female connector (not shown), a male connector piece (not shown) is used for connecting the cymbals 401 to the generally cylindrical attachment member 702. The cymbals 401 are engageably connected to the connector elements 704a and 704b via the connector piece 705 and attached to the drum stick 507 through the generally cylindrical attachment member 702 of the drum stick attachment system 701 to generate sounds while using the drum stick 507. The generally cylindrical attachment member 702 with the connector elements 704a and 704b attaches to the drum stick 507 and allows different accessories to interchange and attach to the generally cylindrical attachment member 702 on the drum stick 507 via the connector elements 704a and 704b.

Figure 7D:
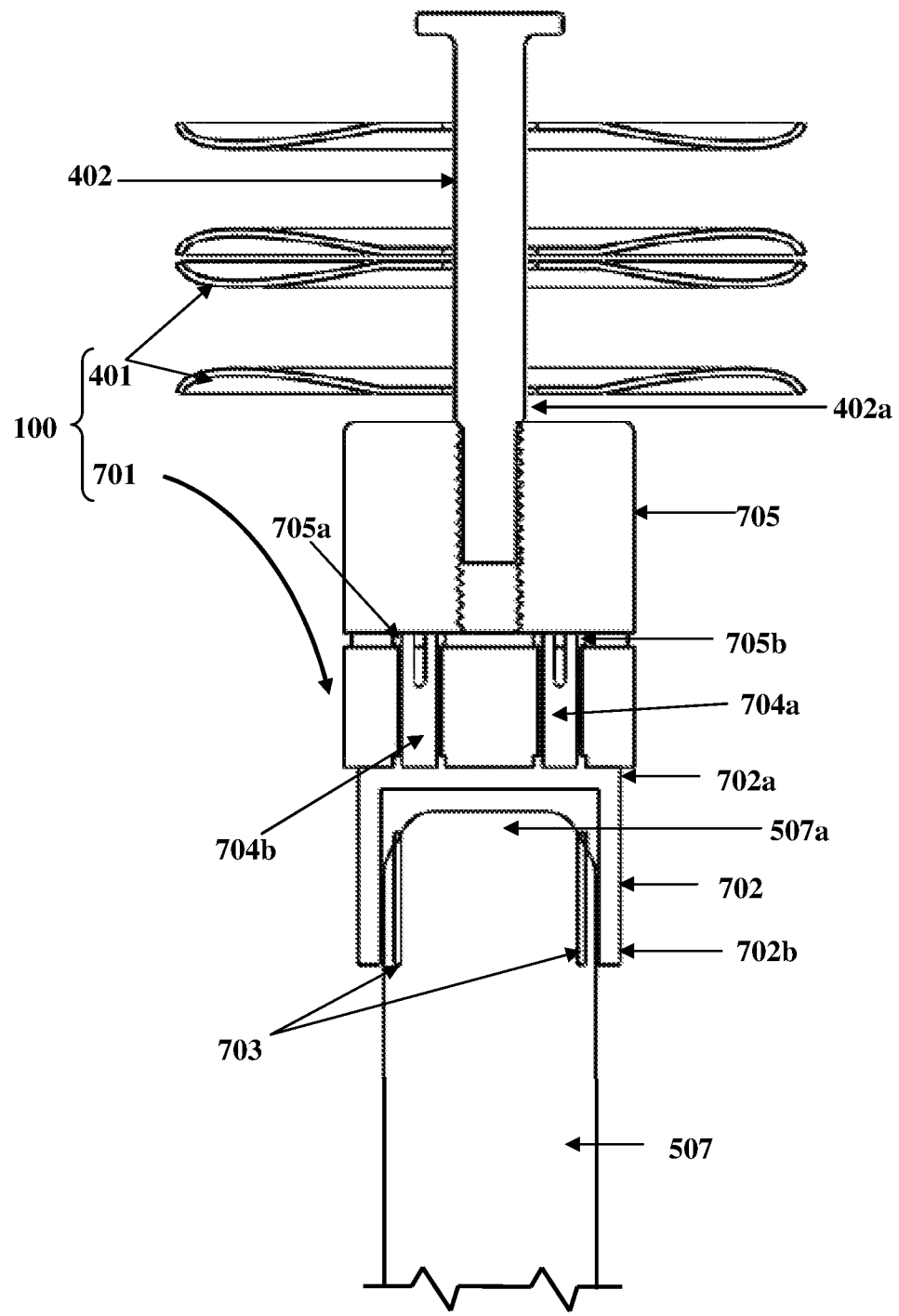
FIG. 7D exemplarily illustrates a cross-sectional view showing a connection of the interchangeable accessory to the drum stick via the embodiment of the drum stick attachment system shown in FIGS. 7A-7B.

FIG. 7D exemplarily illustrates a cross-sectional view showing a connection of the interchangeable accessory, for example, the cymbals 401 to the drum stick 507 via the embodiment of the drum stick attachment system 701 shown in FIGS. 7A-7B. The connector piece 705, for example, a spring tab cap is positioned on the lower end 402a of the rod 402 that connects the cymbals 401. The connector piece 705 is attached to the distal end 702a of the generally cylindrical attachment member 702 of the drum stick attachment system 701 through the connector elements 704a and 704b. The connector elements 704a and 704b extend from the distal end 702a of the generally cylindrical attachment member 702. The connector piece 705 of the cymbals 401 comprises openings 705a and 705b for receiving the connector elements 704a and 704b respectively, and attaching the connector piece 705 with the cymbals 401 to the generally cylindrical attachment member 702 of the drum stick attachment system 701. The inner surface grooves 703 defined at the lower end 702b of the generally cylindrical attachment member 702 grip and engage the threading 507b on one end 507a of the drum stick 507 of a small size as exemplarily illustrated in FIGS. 7A-7B and FIG. 7D.

Figure 8A:
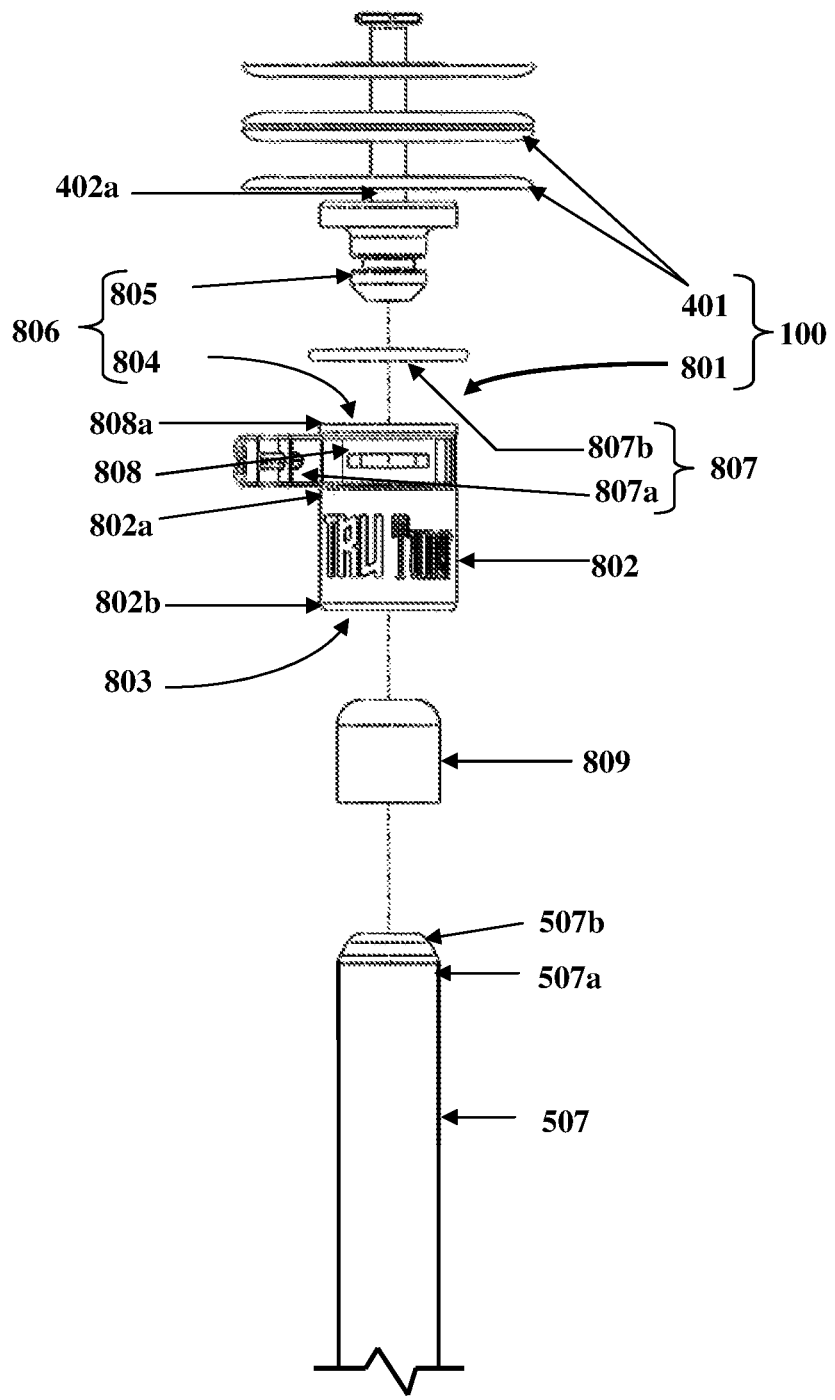
FIGS. 8A-8B exemplarily illustrate disassembled views of the kit comprising another embodiment of the attachment system for attaching an interchangeable accessory to the drum stick.
Figure 8B:
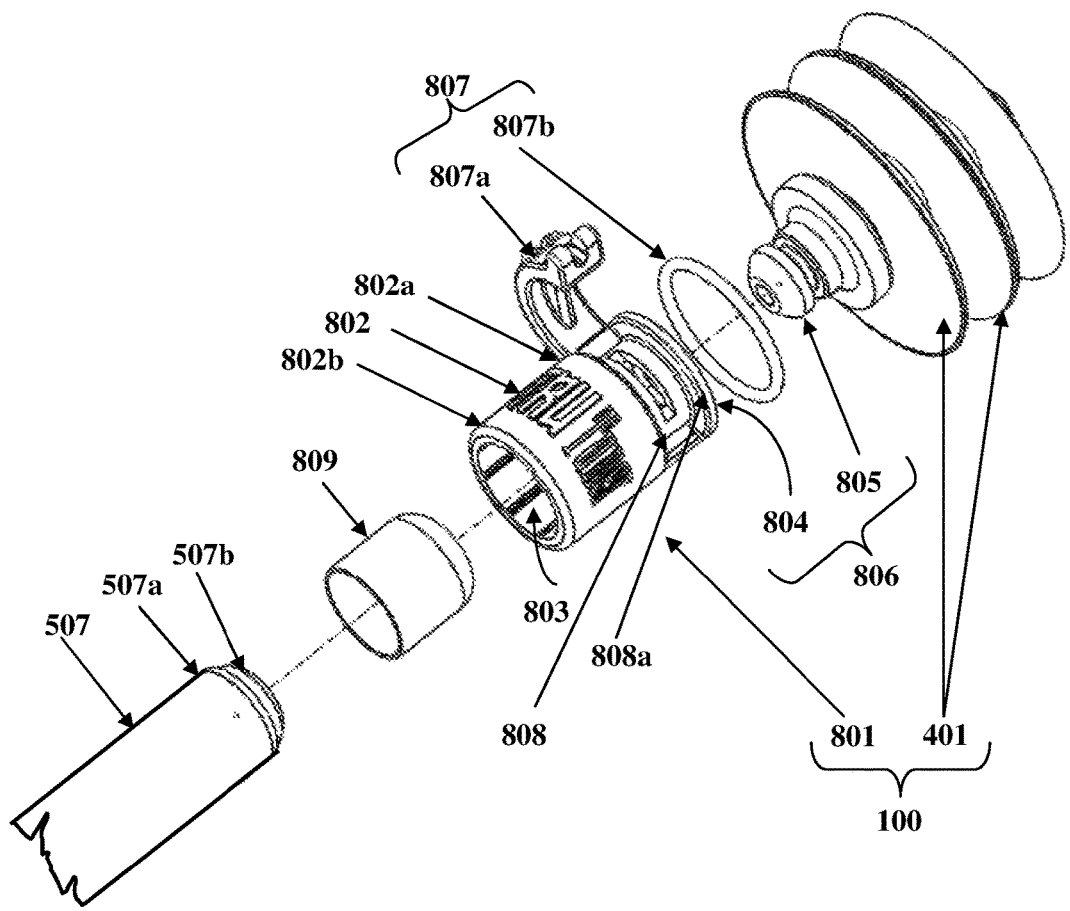
Figure 8C:
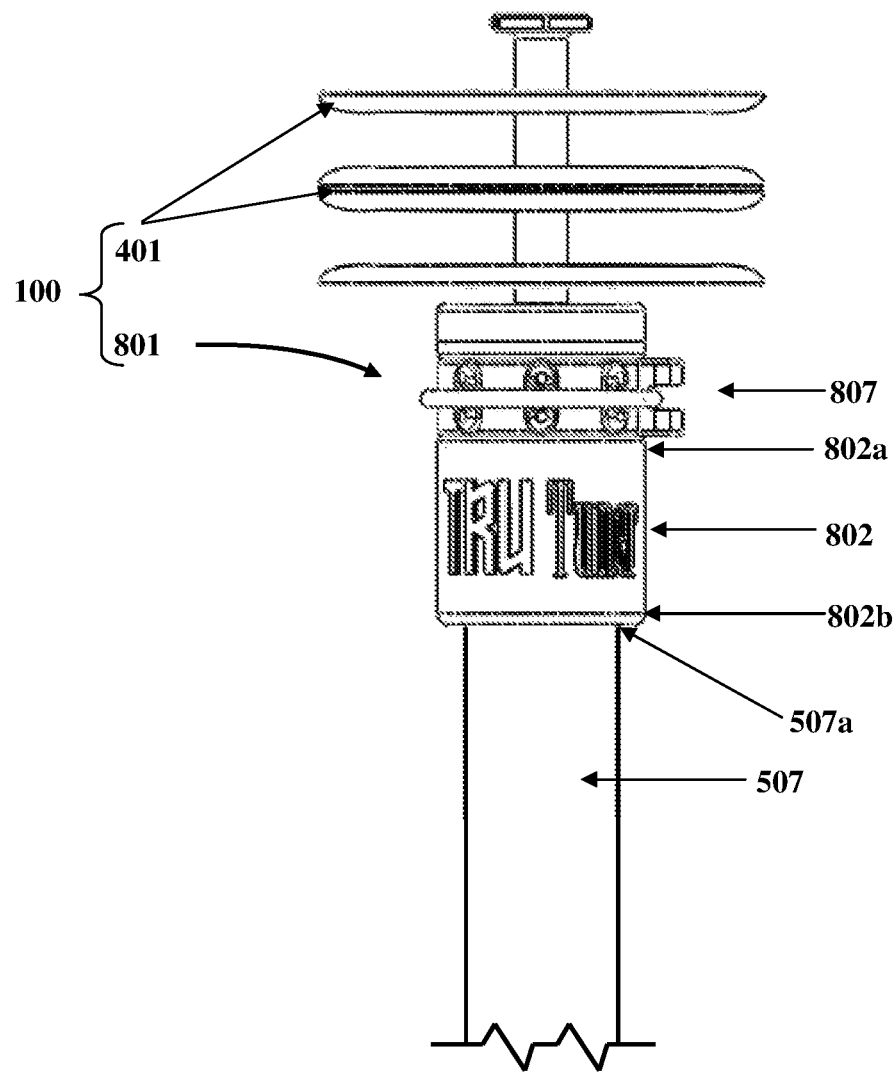
FIG. 8C exemplarily illustrates an assembled view of the kit, showing the interchangeable accessory connected to the drum stick via the embodiment of the attachment system shown in FIGS. 8A-8B.

FIGS. 8A-8C illustrates another embodiment of the attachment system 801 for attaching an interchangeable accessory, for example, cymbals 401 to a drum stick 507. FIGS. 8A-8B exemplarily illustrate disassembled views of the kit 100 comprising another embodiment of the attachment system 801 for attaching the cymbals 401 to the drum stick 507. In this embodiment, the attachment system 801 disclosed herein comprises an attachment member 802, an accessory housing 808 with a release assembly 807, and a connector element 804. The attachment member 802 is a generally cylindrical attachment member and is removably attachable to one end 507a of the drum stick 507 of one of multiple sizes. The attachment member 802 comprises inner surface grooves 803 defined at a lower end 802b of the attachment member 802 as exemplarily illustrated in FIG. 8B, to grip one end 507a of the drum stick 507. The accessory housing 808 accommodates a connector piece 805 of the cymbals 401. The release assembly 807 is positioned at an upper end 802a of the attachment member 802, proximal to the upper end 808a of the accessory housing 808. The connector element 804, for example, a female connector such as a socket is defined at the upper end 808a of the accessory housing 808. The release assembly 807 comprises a quick release latch 807a and a stretchable compression ring 807b for tightly securing or releasing the connector piece 805, for example, a male connector of the cymbals 401 to the attachment system 801. The connector element 804 connects to the cymbals 401 via the connector piece 805. In this embodiment, the kit 100 further comprises an insert member 809 operably connected to one end 507a of the drum stick 507 for frictionally engaging the attachment member 802 of the attachment system 801 to one end 507a of the drum stick 507. The insert member 809 is positioned on one end 507a of the drum stick 507 to firmly secure the attachment member 802 on the drum stick 507 as disclosed in the detailed description of FIGS. 21A-21B.

The cymbals 401 are connected to the attachment member 802 of the attachment system 801 through the connector element 804. In this embodiment, a connector piece 805 is attached to and extends from a lower end 402a of a rod 402 that connects the cymbals 401 as exemplarily illustrated in FIG. 8A. This connector piece 805 of the cymbals 401 connects to the connector element 804 of the attachment system 801 to form a connection assembly 806. If the connector element 804 is a female connector, a male connector piece 805 is used for connecting the cymbals 401 to the attachment system 801 as exemplarily illustrated in FIGS. 8A-8C. The male connector piece 805 of the cymbals 401, for example, a stud engageably connects to the female connector element 804, for example, a socket defined on the upper end 808a of the accessory housing 808. FIG. 8C exemplarily illustrates an assembled view of the kit 100, showing the cymbals 401 connected to the drum stick 507 via the embodiment of the attachment system 801 shown in FIGS. 8A-8B. The cymbals 401 are snapped on to the connector element 804 of the attachment system 801 via the connector piece 805 and attached to the drum stick 507 through the attachment member 802 of the attachment system 801 to generate sounds while using the drum stick 507. In another example, if the connector element is a male connector (not shown), a female connector piece (not shown) is used for connecting the cymbals 401 to the attachment system 801. After the cymbals 401 are connected to the attachment system 801, the quick release latch 807a is closed and the stretchable compression ring 807b is wrapped around the quick release latch 807a on the accessory housing 808 to firmly secure the quick release latch 807a to the accessory housing 808. The release assembly 807 constituted by the quick release latch 807a and the stretchable compression ring 807b locks the cymbals 401 in place as exemplarily illustrated in FIG. 8C. To detach the connector piece 805, that is, the male connector of the cymbals 401, the quick release latch 807a is lifted and the connector piece 805 is pulled out of the connector element 804, that is, the female connector of the attachment system 801. The attachment member 802 with the connector element 804 attaches to the drum stick 507 and allows different accessories to interchange and attach to the attachment member 802 on the drum stick 507 via the connector element 804 defined on the accessory housing 808.

Figure 9A:
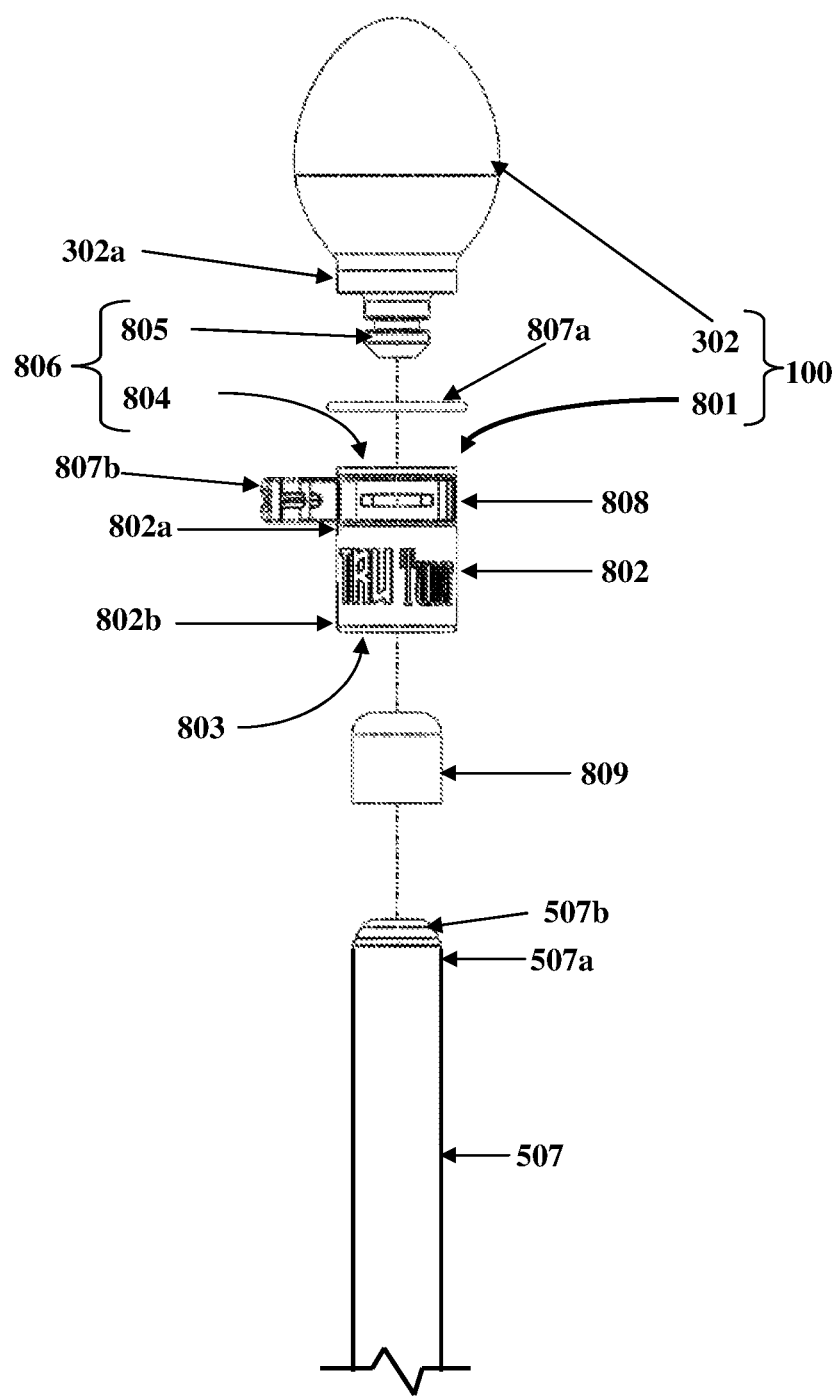
FIGS. 9A-9B exemplarily illustrate disassembled views of the kit comprising the embodiment of the attachment system for attaching another interchangeable accessory to the drum stick.
Figure 9B:
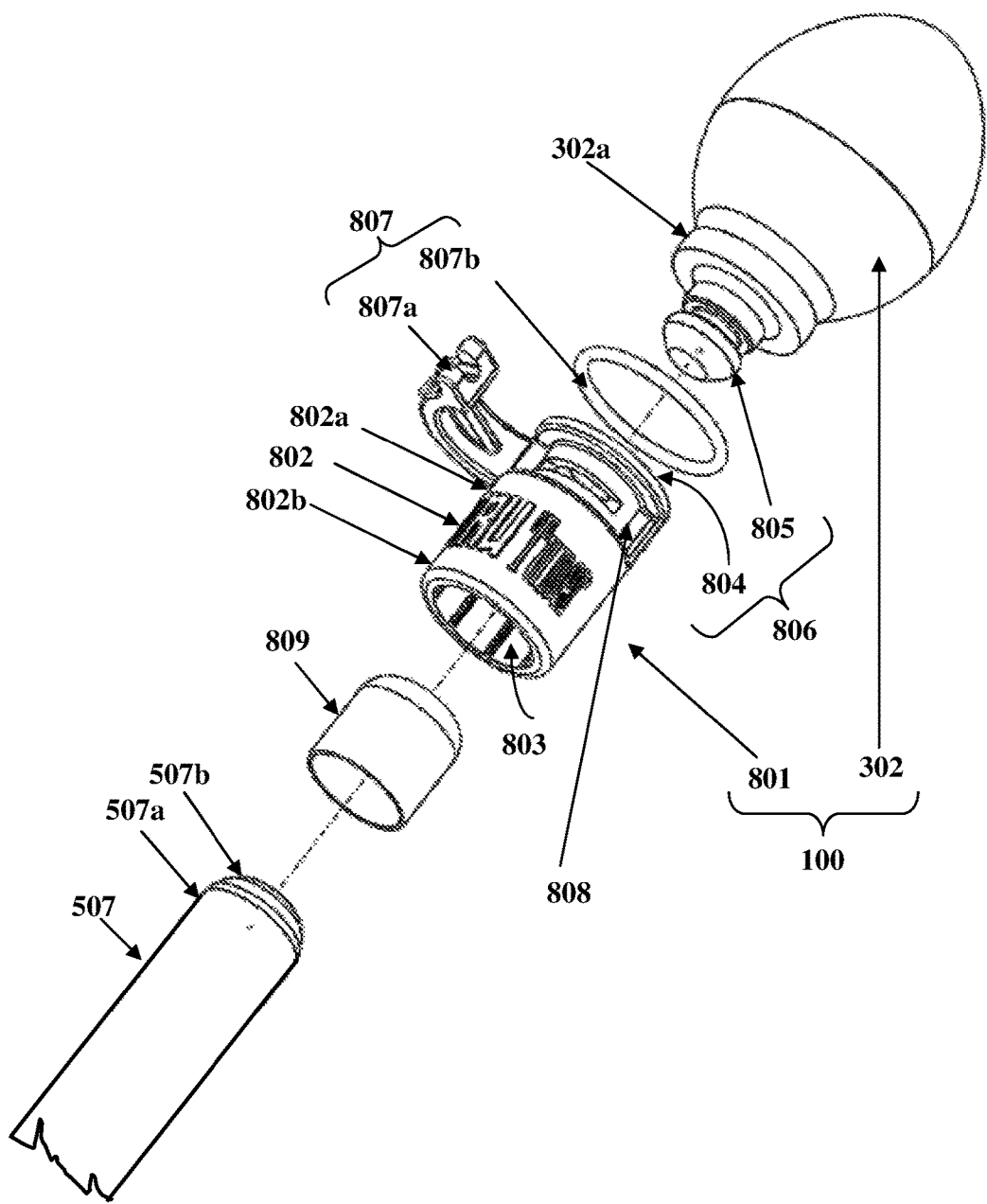
Figure 9C:
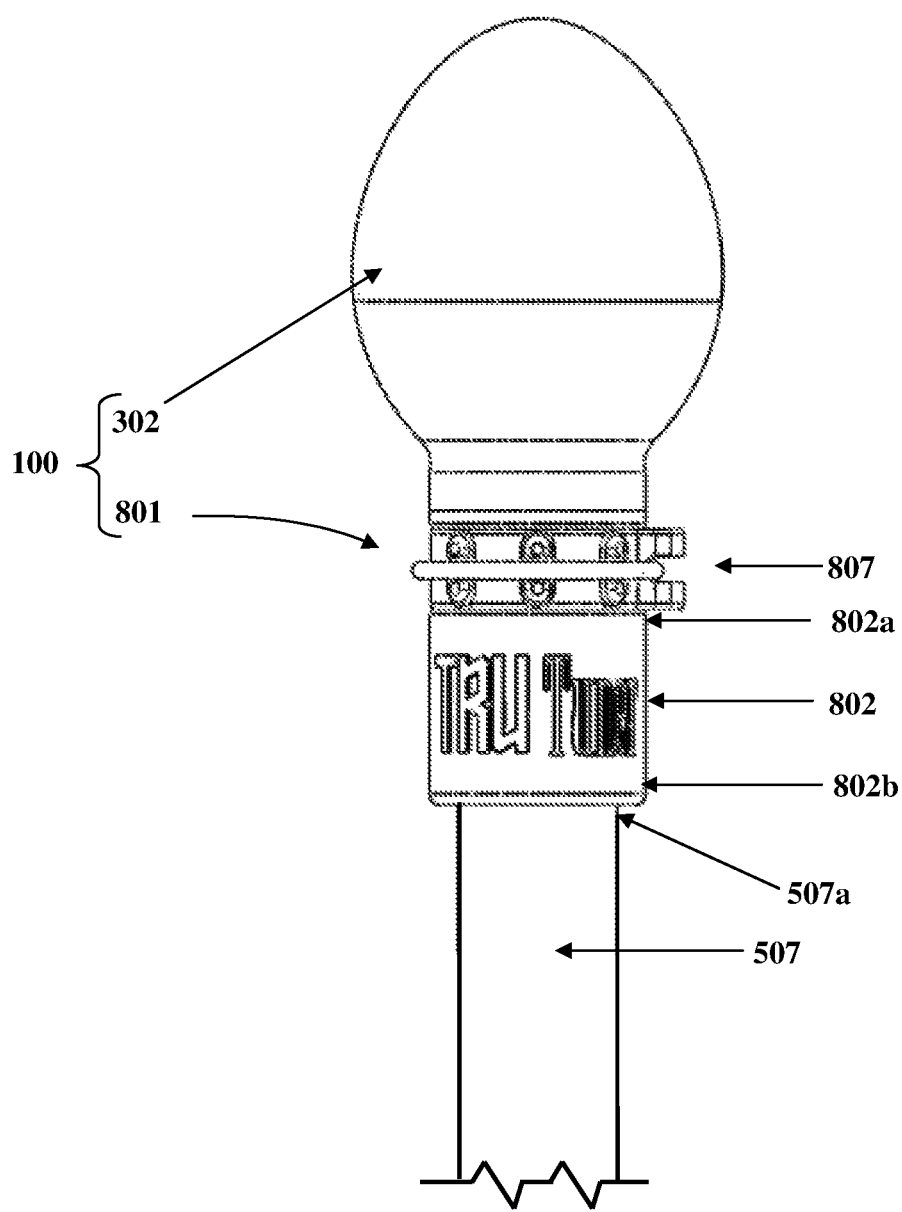
FIG. 9C exemplarily illustrates an assembled view of the kit, showing another interchangeable accessory connected to the drum stick via the embodiment of the attachment system shown in FIGS. 9A-9B.

FIGS. 9A-9C exemplarily illustrate the embodiment of the drum stick attachment system 801 for attaching another interchangeable accessory, for example, an egg shaker 302 to a drum stick 507. FIGS. 9A-9B exemplarily illustrate disassembled views of the kit 100 comprising the embodiment of the attachment system 801 for attaching the egg shaker 302 to the drum stick 507, where the stretchable compression ring 807b of the release assembly 807 is removed from the attachment system 801 and the quick release latch 807a of the release assembly 807 is in an open position. The egg shaker 302 is connected to the attachment member 802 of the attachment system 801 via the connector element 804. The egg shaker 302 comprises a connector piece 805, for example, a stud that engageably connects to the connector element 804, for example, a socket defined on the upper end 808a of the accessory housing 808 of the attachment system 801. FIG. 9C exemplarily illustrates an assembled view of the kit 100, showing the egg shaker 302 connected to the drum stick 507 via the embodiment of the attachment system 801 shown in FIGS. 9A-9B. The lower end 802b of the attachment member 802 is connected to one end 507a of the drum stick 507. In this embodiment, the attachment system 801 further comprises an insert member 809 operably connected to one end 507a of the drum stick 507 for frictionally engaging the attachment member 802 of the attachment system 801 to the drum stick 507. The connector piece 805 of the egg shaker 302 is snapped into the connector element 804 of the attachment system 801 to attach the egg shaker 302 to the drum stick 507 via the attachment system 801 to generate a sound while using the drum stick 507. The release assembly 807 tightly secures the connector piece 805 of the egg shaker 302 to the drum stick 507 in a closed position and releases the connector piece 805 of the egg shaker 302 in an open position.

Figure 10A:
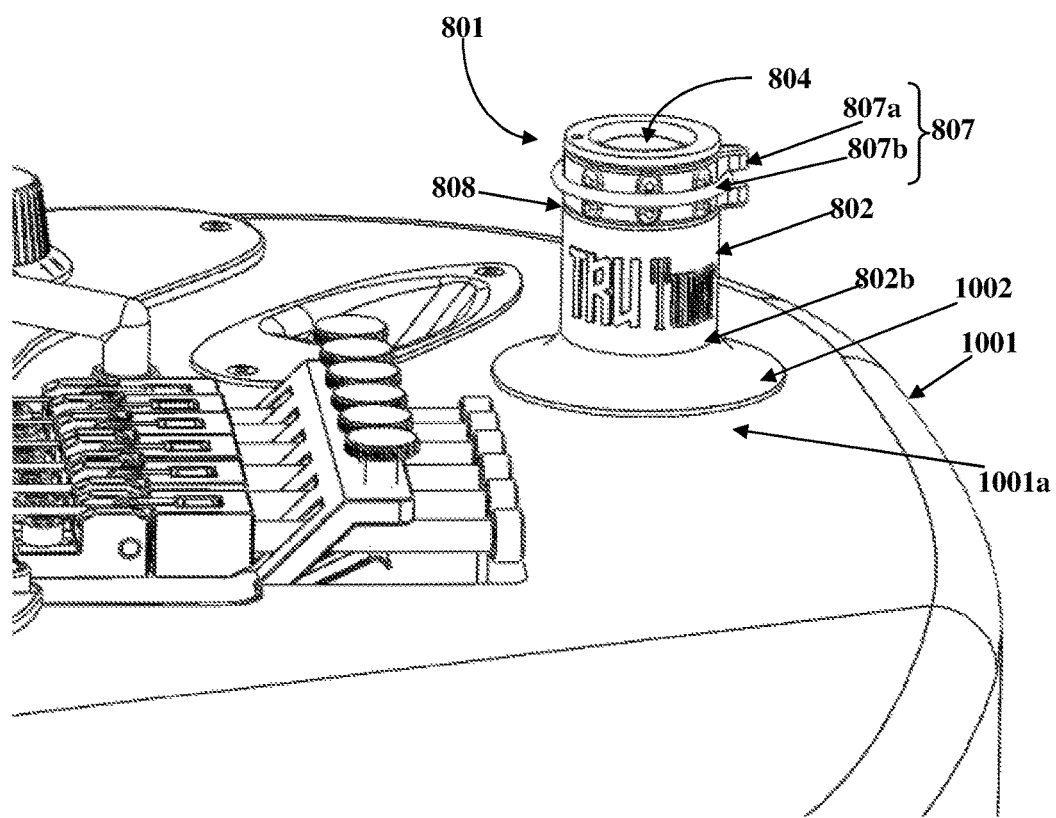
FIGS. 10A-10B exemplarily illustrate another embodiment of the attachment system for attaching an interchangeable accessory to a guitar.
Figure 10B:
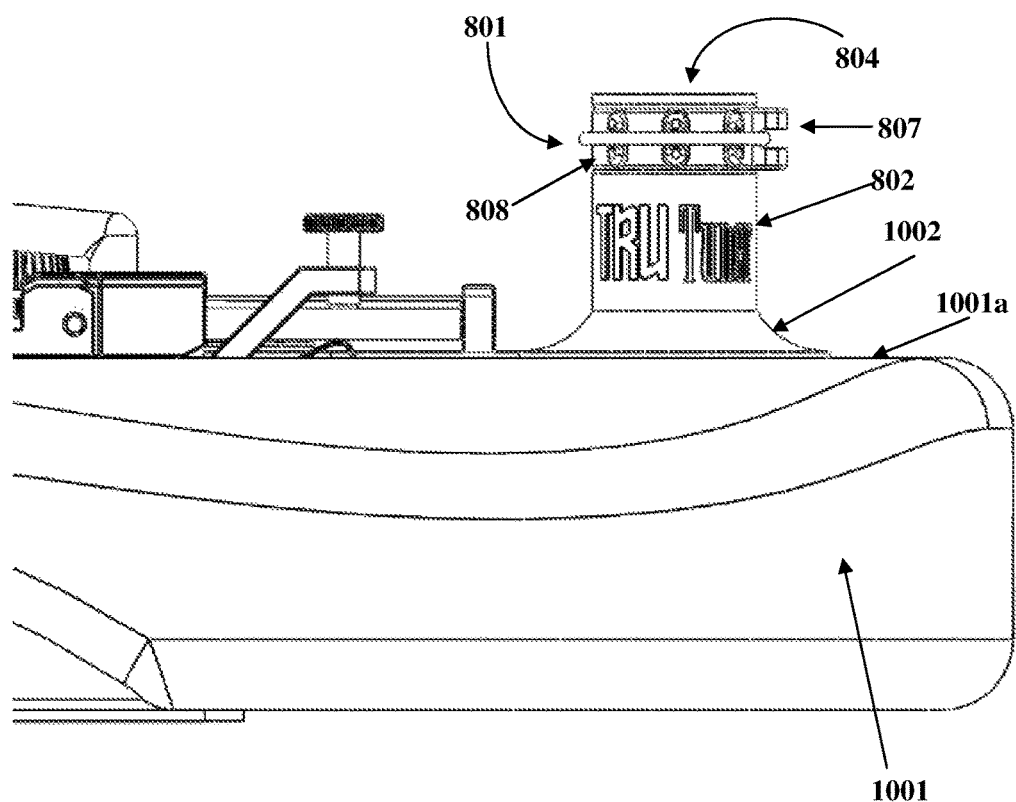

FIGS. 10A-10B exemplarily illustrates another embodiment of the attachment system 801 for attaching an interchangeable accessory, for example, an egg shaker 302 exemplarily illustrated in FIG. 11, cymbals 401 exemplarily illustrated in FIGS. 12A-12B, etc., to a guitar 1001. The attachment system 801 disclosed herein comprises the generally cylindrical attachment member 802, the accessory housing 808 with the release assembly 807, and the connector element 804 as disclosed in the detailed description of FIGS. 8A-8C. The release assembly 807 comprises the quick release latch 807a and the stretchable compression ring 807b as disclosed in the detailed description of FIGS.

8A-8C. In this embodiment, the attachment system 801 is removably attachable to a surface 1001a of the guitar 1001 using a suction cup 1002. That is, the suction cup 1002 attaches the attachment system 801 to the guitar 1001 as exemplarily illustrated in FIGS. 10A-10B. The suction cup 1002 is positioned at the lower end 802b of the attachment member 802 of the attachment system 801. The suction cup 1002 uses negative air pressure to create a partial vacuum and adheres the attachment system 801 to a nonporous surface, for example, the surface 1001a of the guitar 1001. In an embodiment, the attachment system 801 is removably attachable to the surface 1001a of the guitar 1001 using an adhesive member. The connector element 804 defined on the accessory housing 808 is, for example, a female connector such as a socket for connecting to an opposing connector, for example, a male connector of one or more interchangeable accessories, for example, the egg shaker 302, the cymbals 401, etc.

FIG. 11 exemplarily illustrates an assembled view of the kit 100, showing an interchangeable accessory, for example, the egg shaker 302 connected to the guitar 1001 via the embodiment of the attachment system 801 shown in FIGS. 10A-10B. The generally cylindrical attachment member 802 of the attachment system 801 is attached to the surface 1001a of the guitar 1001 using the suction cup 1002. The egg shaker 302 is snapped onto the connector element 804, for example, a female connector (not shown in FIG. 11) defined on the accessory housing 808 of the attachment system 801 via the connector piece 805 of the egg shaker 302 exemplarily illustrated in FIGS. 9A-9B, to generate sounds while using the guitar 1001. When a musician plays the guitar 1001 with the egg shaker 302 attached thereon, the movement of the guitar 1001 causes the loose objects inside the egg shaker 302 to shake and create percussive sounds as the loose objects collide with each other and with an inside surface of the egg shaker 302. The resulting sound is a combination of the sound made by the guitar 1001 and sound of the egg shaker 302.

FIGS. 12A-12B exemplarily illustrates assembled views of the kit 100, showing another interchangeable accessory, for example, the cymbals 401 connected to the guitar 1001 via the embodiment of the attachment system 801 shown in FIGS. 10A-10B. The generally cylindrical attachment member 802 of the attachment system 801 is attached to the surface 1001a of the guitar 1001 using the suction cup 1002. The cymbals 401 are snapped onto the connector element 804, for example, a female connector (not shown in FIGS. 12A-12B) defined on the accessory housing 808 of the attachment system 801 via the connector piece 805 of the cymbals 401 exemplarily illustrated in FIGS. 8A-8B, to generate sounds while using the guitar 1001. When a musician plays the guitar 1001 with the cymbals 401 attached thereon, the movement of the guitar 1001 causes the cymbals 401 to collide with each other to create percussive sounds. The resulting sound is a combination of the sound made by the guitar 1001 and the percussive sounds of the cymbals 401.

Figure 13:
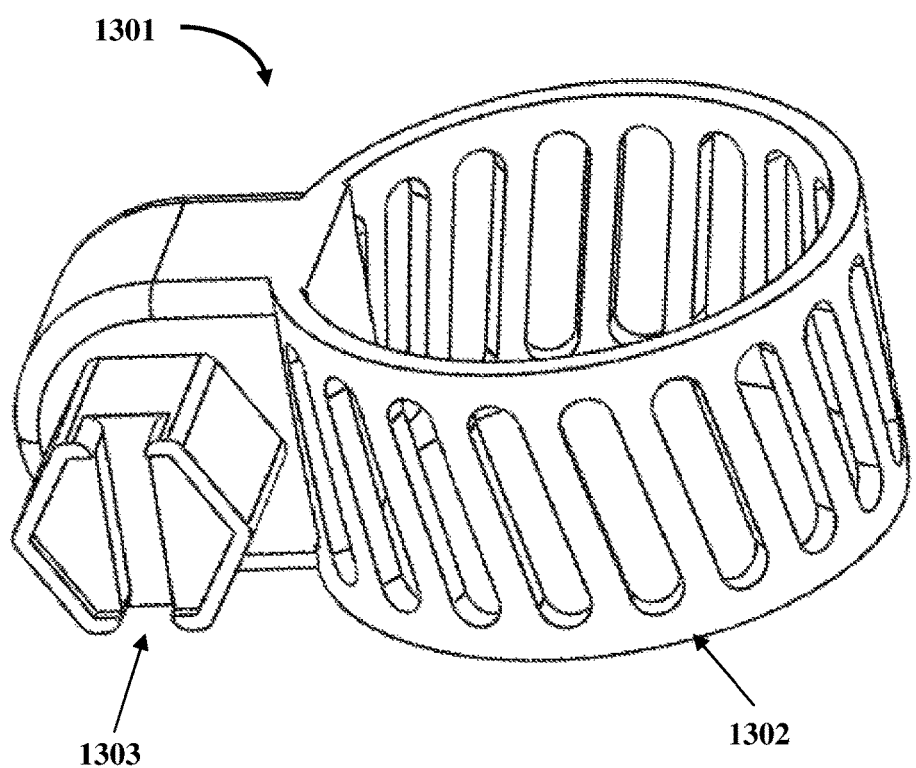
FIG. 13 exemplarily illustrates an embodiment showing a clamp member for attaching an attachment system to a drum stick.
Figure 14A:
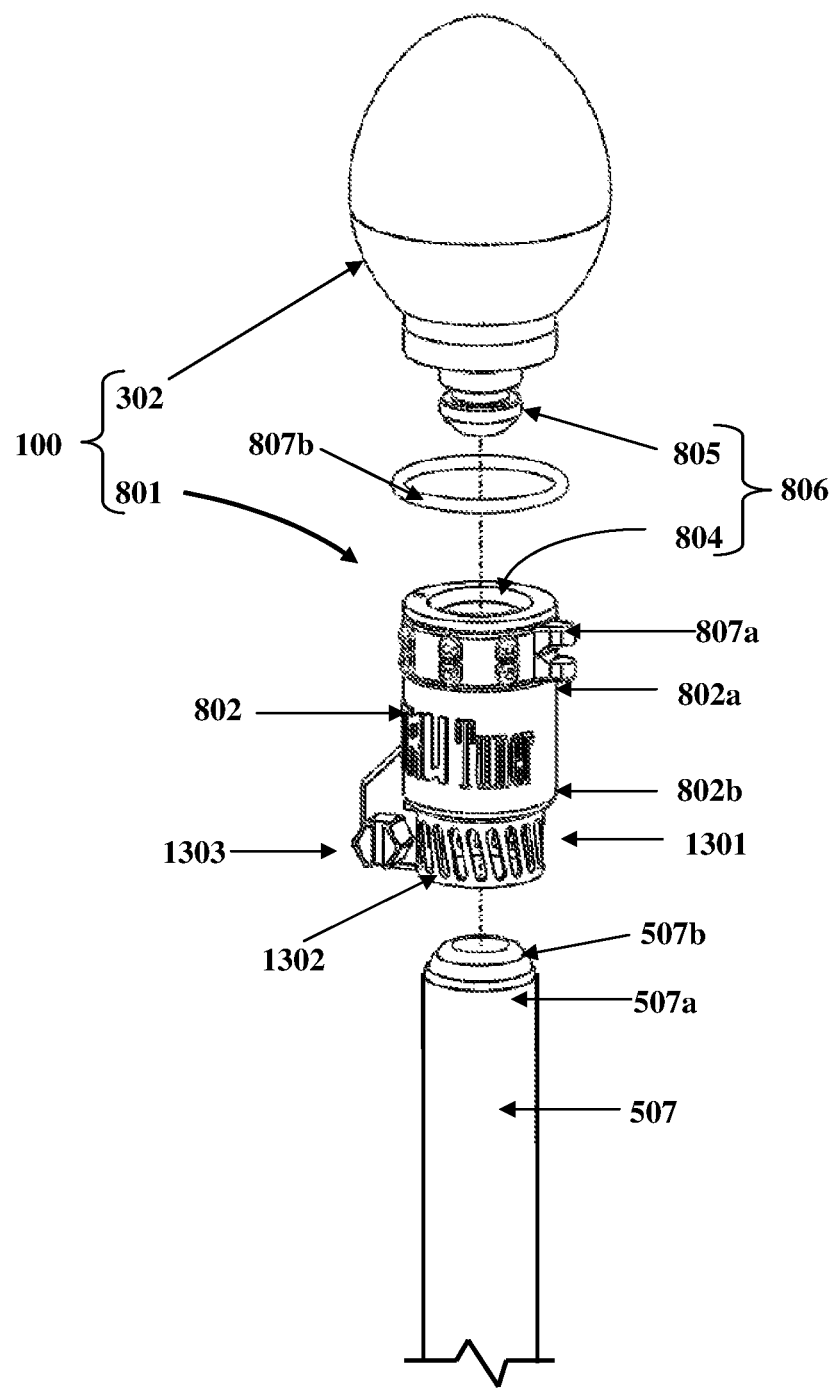
FIG. 14A exemplarily illustrates a disassembled view of the kit comprising an embodiment of the attachment system and the clamp member shown in FIG. 13, for attaching an interchangeable accessory to the drum stick.
Figure 14B:
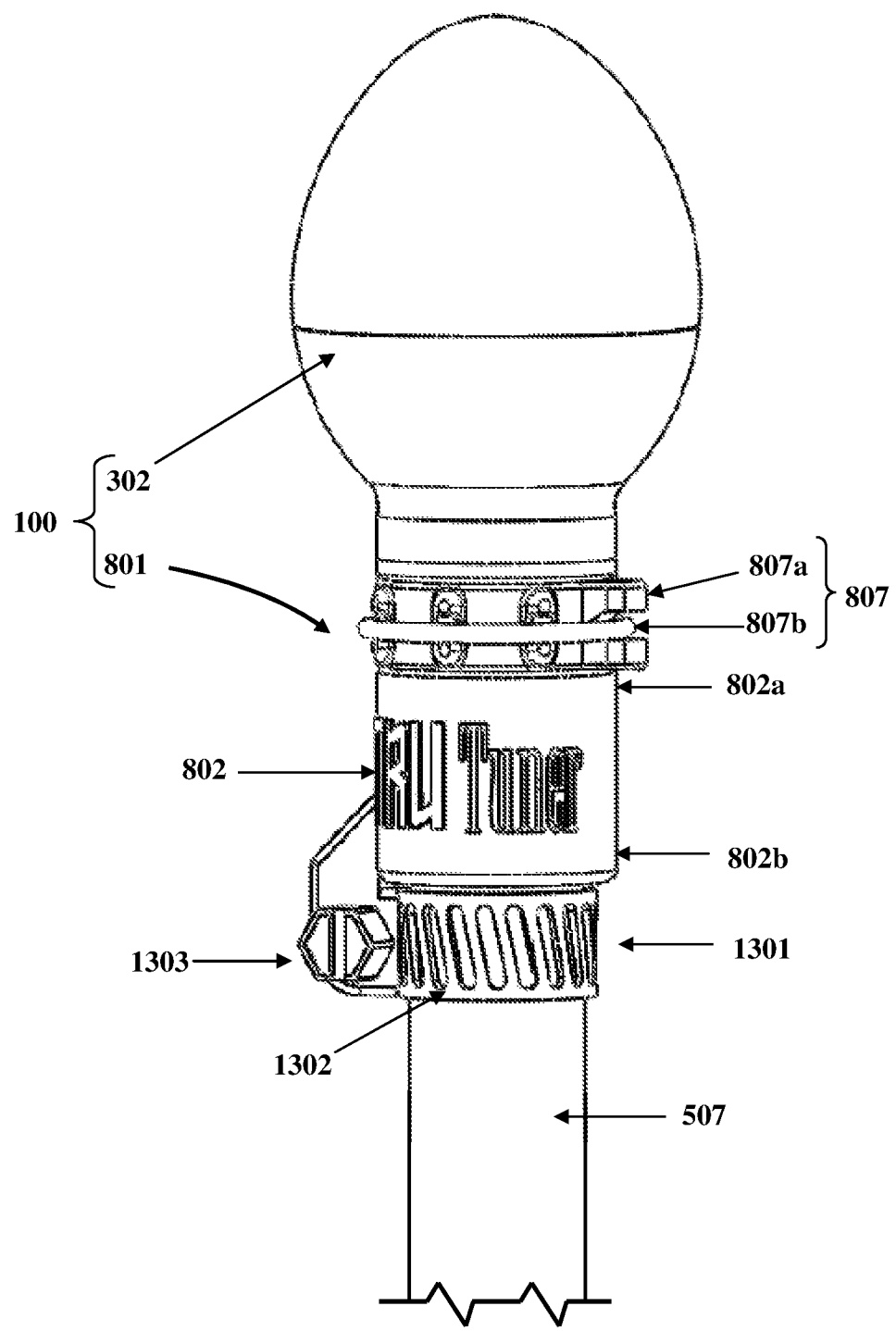
FIG. 14B exemplarily illustrates an assembled view of the kit, showing the embodiment of the attachment system shown in FIG. 14A, attached to the drum stick via the clamp member shown in FIG. 13, and the interchangeable accessory connected to the drum stick via the embodiment of the attachment system.

FIG. 13 exemplarily illustrates an embodiment showing a clamp member 1301 for attaching the attachment system 801 to a drum stick 507 exemplarily illustrated in FIGS. 14A-14B. The clamp member 1301 comprises a cylindrical housing 1302 and a fastening assembly 1303. The fastening assembly 1303 comprises a nut (not shown) and a screw (not shown) that are operated to firmly secure the attachment system 801 around the drum stick 507.

FIG. 14A exemplarily illustrates a disassembled view of the kit 100 comprising an embodiment of the drum stick attachment system 801 and the clamp member 1301 shown in FIG. 13, for attaching an interchangeable accessory, for example, an egg shaker 302 to the drum stick 507. The clamp member 1301 is positioned at and connected to the lower end 802b of the attachment member 802 of the attachment system 801 for connecting the attachment member 802 to one end 507a of the drum stick 507. The cylindrical housing 1302 of the clamp member 1301 along with the attachment system 801 is locked at a required rotational and axial position on the drum stick 507 using the fastening assembly 1303. The clamp member 1301 allows attachment of the egg shaker 302 to the drum stick 507 via the attachment system 801.

FIG. 14B exemplarily illustrates an assembled view of the kit 100, showing the embodiment of the attachment system 801 shown in FIG. 14A, attached to the drum stick 507 via the clamp member 1301 shown in FIG. 13, and the interchangeable accessory, for example, the egg shaker 302 connected to the drum stick 507 via the embodiment of the attachment system 801. The clamp member 1301 is connected to the lower end 802b of the attachment member 802 of the attachment system 801 for connecting the attachment system 801 to one end 507a of the drum stick 507. The position of the attachment system 801 on the drum stick 507 is adjusted using the fastening assembly 1303 of the clamp member 1301. The egg shaker 302 is connected to the attachment system 801 as disclosed in the detailed description of FIGS. 9A-9C.

Figure 15A:
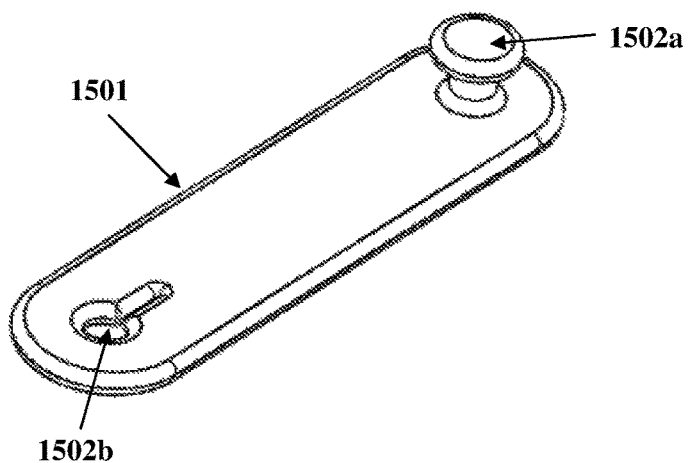
FIGS. 15A-15B exemplarily illustrate embodiments for attaching an attachment system to a drum stick with a strap member and an adjustable strap respectively.
Figure 15B:
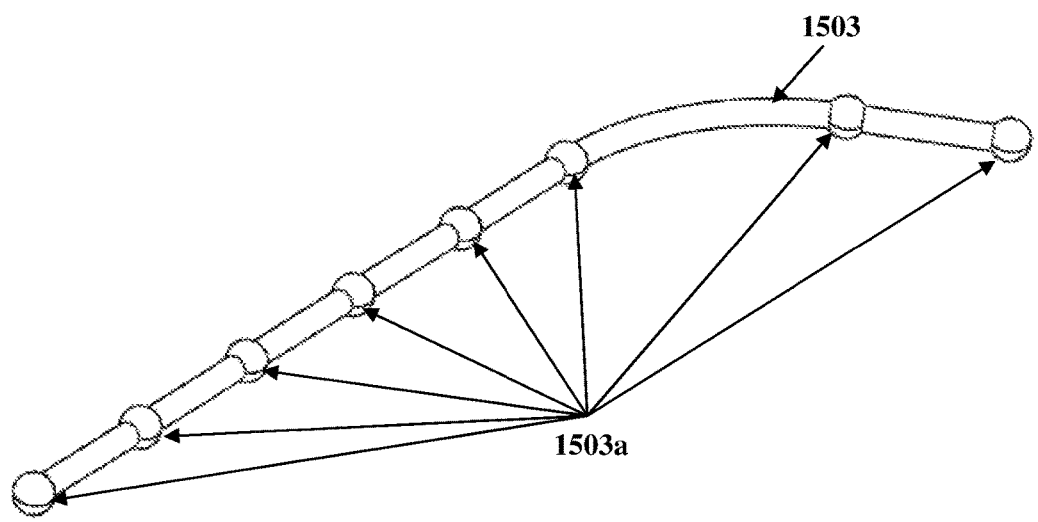

FIGS. 15A-15B exemplarily illustrate embodiments for attaching an attachment system 801 to a drum stick 507 with a strap member 1501 and an adjustable strap 1503 respectively. The strap member 1501 comprises an adjustment hole 1502b and a stud 1502a for fastening the attachment system 801 to one end 507a of the drum stick 507. The strap member 1501 is made of a flexible material, for example, a rubber material. In an embodiment exemplarily illustrated in FIG. 15B, an adjustable strap 1503 of a predetermined length is provided. The adjustable strap 1503 comprises multiple notches 1503a positioned along the length of the adjustable strap 1503 as exemplarily illustrated in FIG. 15B. The adjustable strap 1503 is wrapped around one end 507a of the drum stick 507 of variable sizes to fit the attachment system 801 firmly on the drum stick 507. In another embodiment, the adjustable strap 1503 is used for securing the attachment system 801 to other instruments, for example, posts or stands of variable diameters and is used in conjunction with the strap member 1501 to fit the attachment system 801 firmly on the other instruments.

Figure 16A:
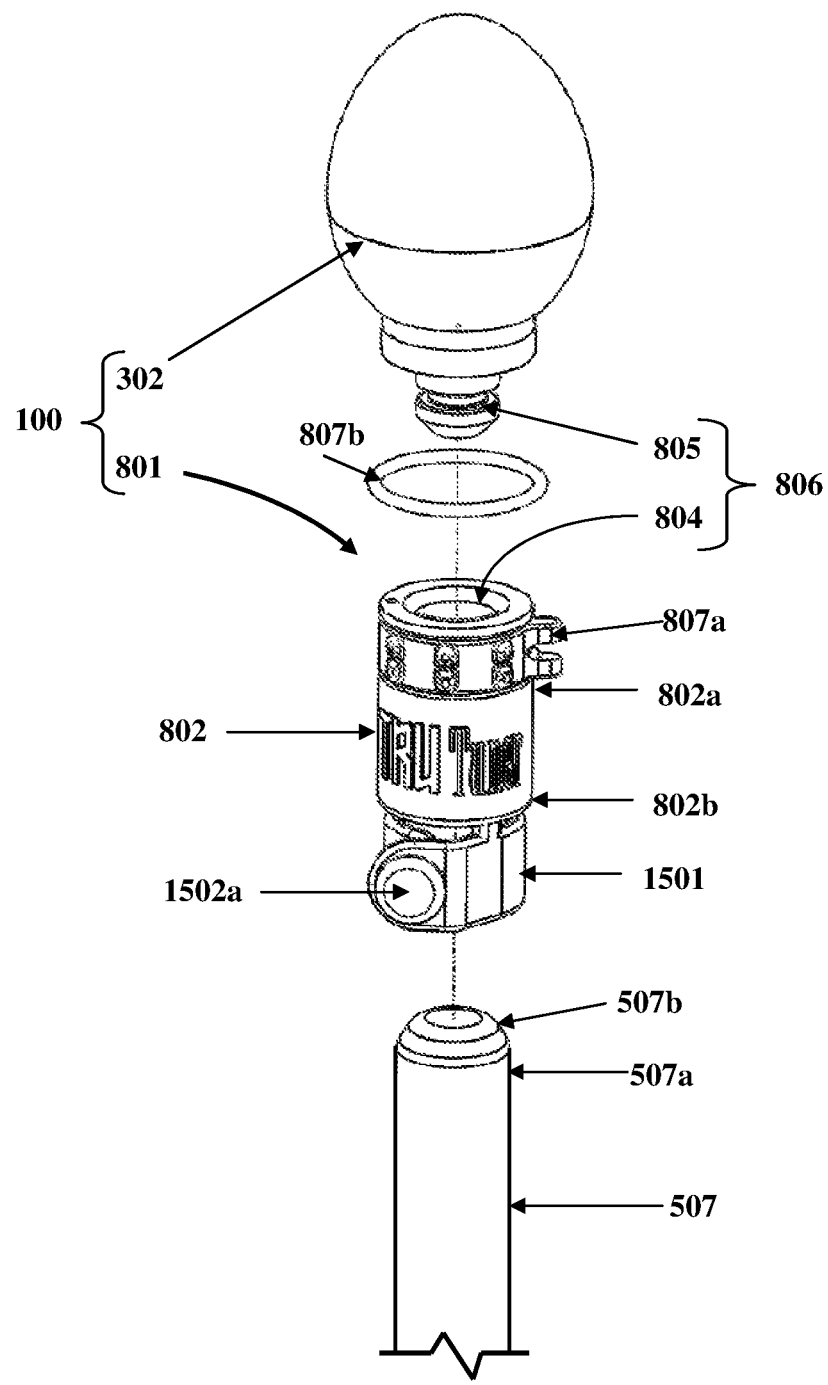
FIG. 16A exemplarily illustrates a disassembled view of the kit comprising an embodiment of the attachment system and the strap member shown in FIG. 15A, for attaching an interchangeable accessory to the drum stick.

FIG. 16A exemplarily illustrates a disassembled view of the kit 100 comprising an embodiment of the attachment system 801 and the strap member 1501 shown in FIG. 15A, for attaching an interchangeable accessory, for example, an egg shaker 302 to the drum stick 507. The strap member 1501 is connected to the lower end 802b of the attachment member 802 of the attachment system 801 for connecting the attachment system 801 to one end 507a of the drum stick 507. The strap member 1501 is wrapped around the drum stick 507 at a predetermined position on the drum stick 507. The strap member 1501 is firmly secured on the drum stick 507 by engageably connecting the stud 1502a to the adjustment hole 1502b of the strap member 1501.

Figure 16B:
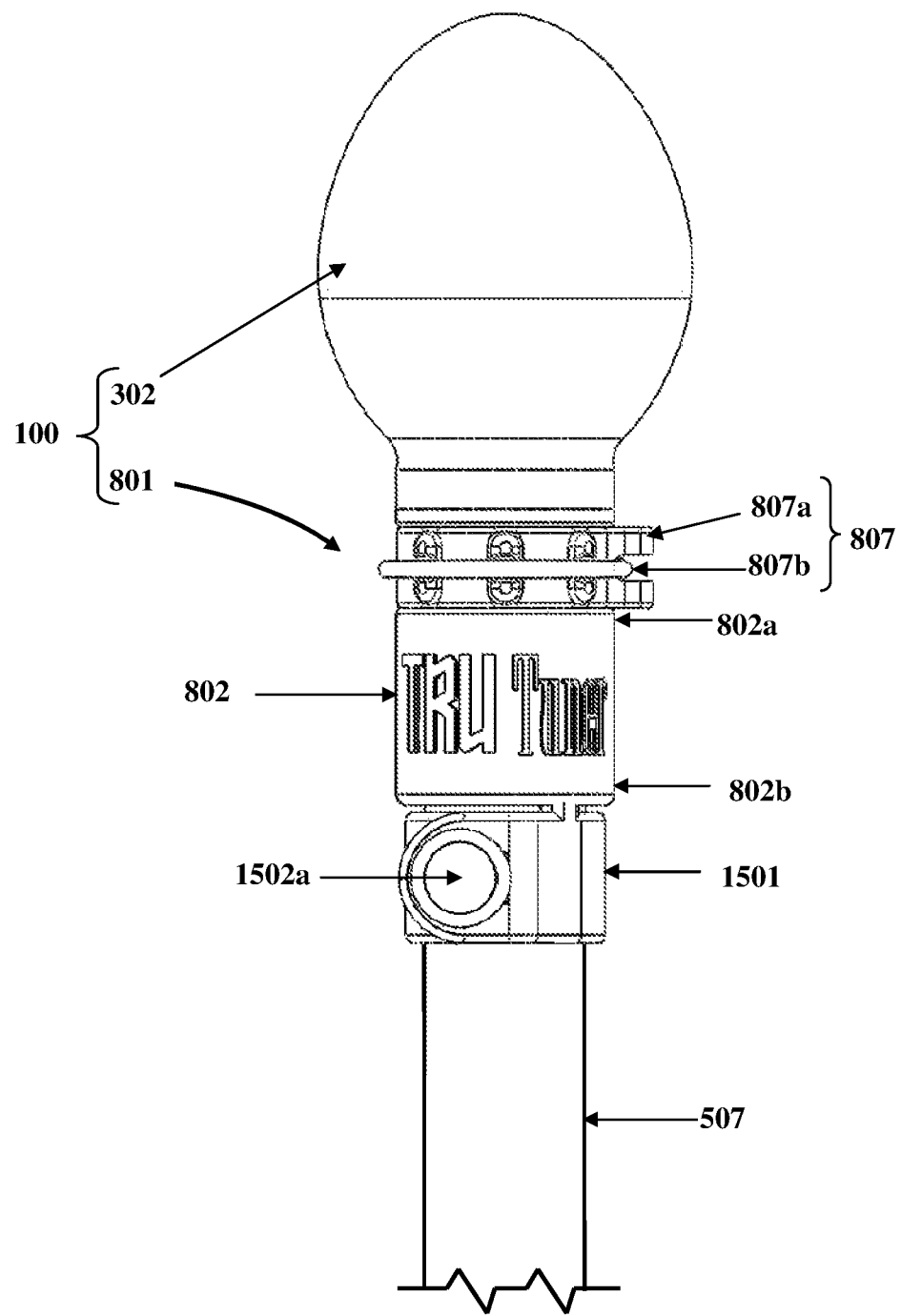
FIG. 16B exemplarily illustrates an assembled view of the kit, showing the embodiment of the attachment system shown in FIG. 16A, attached to the drum stick via the strap member shown in FIG. 15A, and the interchangeable accessory connected to the drum stick via the embodiment of the attachment system.
Figure 26A:
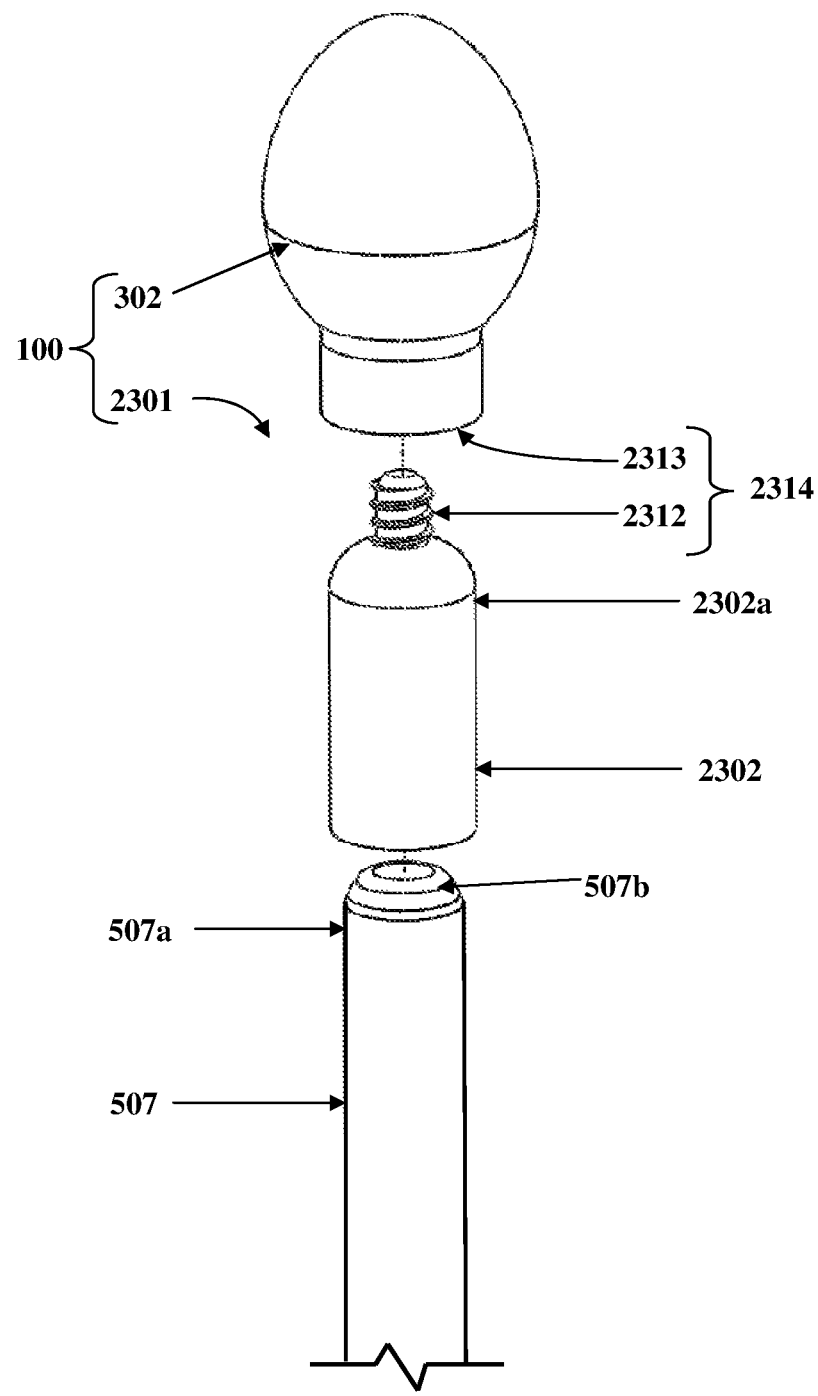
FIG. 26A exemplarily illustrates a disassembled view of the kit comprising another embodiment of the drum stick attachment system for attaching an interchangeable accessory to a drum stick.

FIG. 16B exemplarily illustrates an assembled view of the kit 100, showing the embodiment of the attachment system 801 shown in FIG. 26A, attached to the drum stick 507 via the strap member 1501 shown in FIG. 15A, and the interchangeable accessory, for example, the egg shaker 302 connected to the drum stick 507 via the embodiment of the attachment system 801. The position of the attachment system 801 on the drum stick 507 is adjusted using the stud 1502*a* and the adjustment hole 1502*b* of the strap member 1501. The egg shaker 302 is connected to the attachment system 801 as disclosed in the detailed description of FIGS. 9A-9C.

Figure 17:
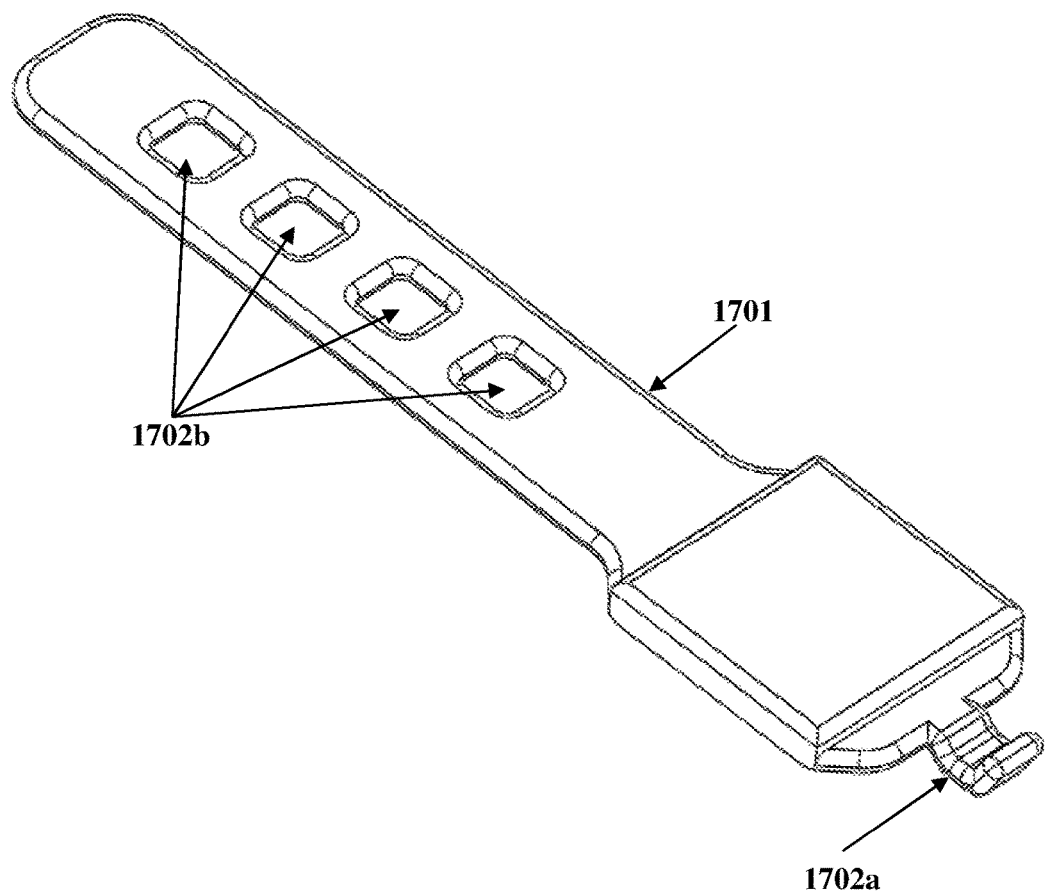
FIG. 17 exemplarily illustrates an embodiment showing a strap member for attaching an attachment system to a drum stick.

FIG. 17 exemplarily illustrates an embodiment showing a strap member 1701 for attaching an attachment system 801 to a drum stick 507. In this embodiment, the strap member 1701 comprises a buckle 1702*a* and multiple adjustment holes 1702*b* for adjusting and firmly securing the attachment system 801 around the drum stick 507.

Figure 18A:
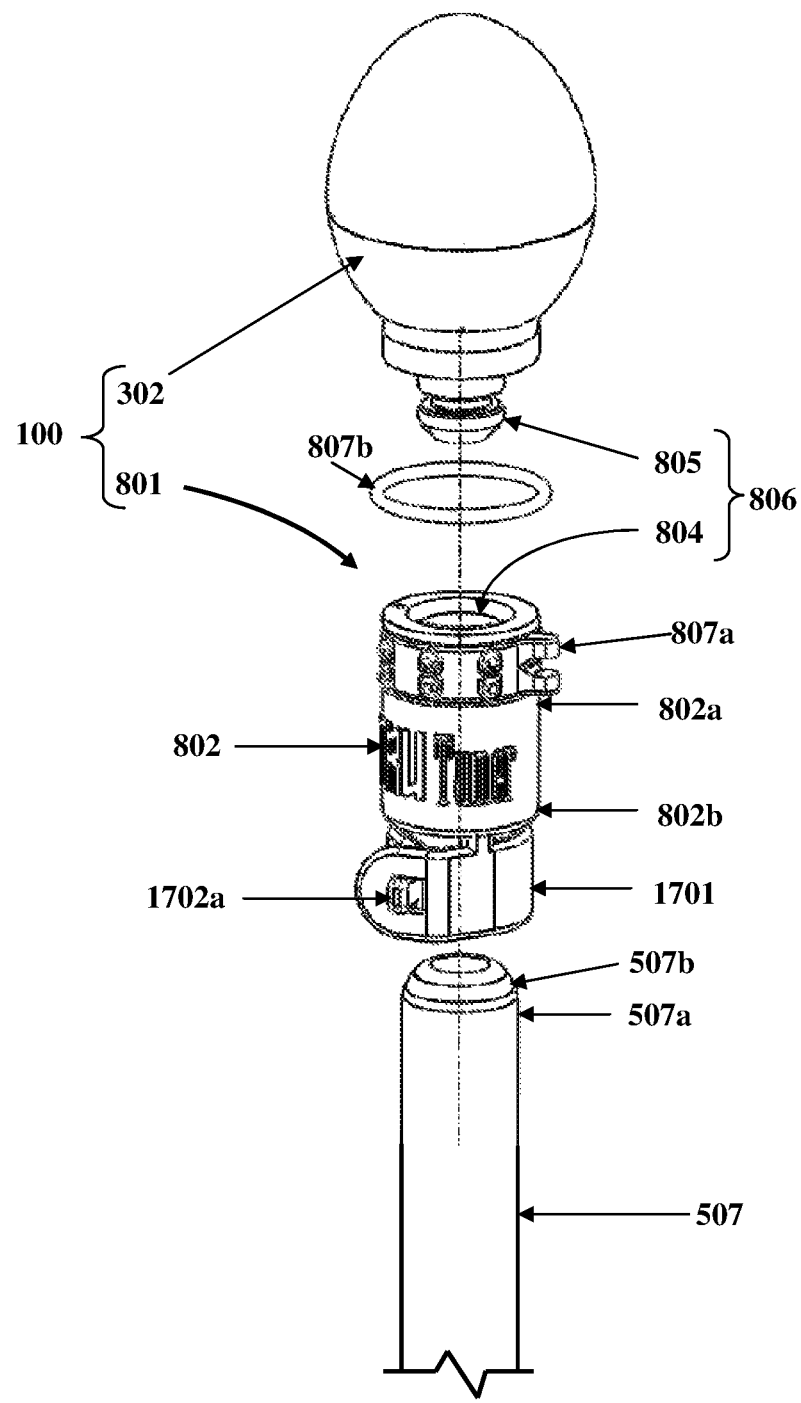
FIG. 18A exemplarily illustrates a disassembled view of the kit comprising an embodiment of the attachment system and the strap member shown in FIG. 17, for attaching an interchangeable accessory to the drum stick.

FIG. 18A exemplarily illustrates a disassembled view of the kit 100 comprising an embodiment of the attachment system 801 and the strap member 1701 shown in FIG. 17, for attaching an interchangeable accessory, for example, an egg shaker 302 to the drum stick 507. The strap member 1701 is positioned at and connected to the lower end 802*b* of the attachment member 802 of the attachment system 801 for connecting the attachment member 802 to one end 507*a* of the drum stick 507. The strap member 1701 is wrapped around the drum stick 507 at a predetermined position on the drum stick 507. The adjustment holes 1702*b* and the buckle 1702*a* of the strap member 1701 allow the strap member 1701 to conform to the drum stick 507 of variable sizes to fit properly on the drum stick 507. The strap member 1701 allows attachment of the egg shaker 302 to the drum stick 507 via the attachment system 801.

Figure 18B:
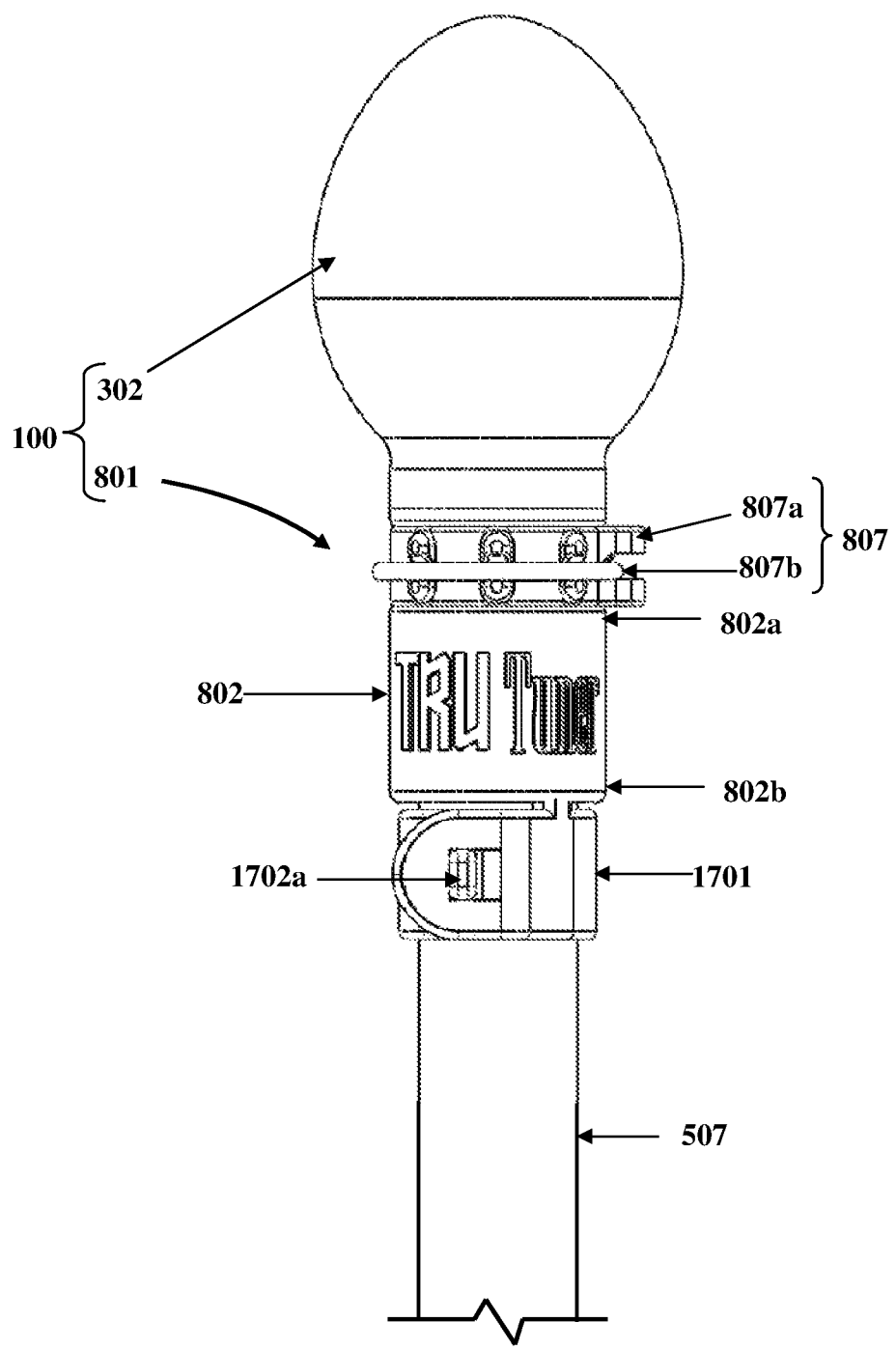
FIG. 18B exemplarily illustrates an assembled view of the kit, showing the embodiment of the attachment system shown in FIG. 18A, attached to the drum stick via the strap member shown in FIG. 17, and the interchangeable accessory connected to the drum stick via the embodiment of the attachment system.

FIG. 18B exemplarily illustrates an assembled view of the kit 100, showing the embodiment of the attachment system 801 shown in FIG. 18A, attached to the drum stick 507 via the strap member 1701 shown in FIG. 17, and the interchangeable accessory, for example, an egg shaker 302 connected to the drum stick 507 via the embodiment of the attachment system 801. The position of the attachment system 801 on the drum stick 507 is adjusted using the buckle 1702*a* and one of the adjustment holes 1702*b* of the strap member 1701. The egg shaker 302 is connected to the attachment system 801 as disclosed in the detailed description of FIGS. 9A-9C.

Figure 19:
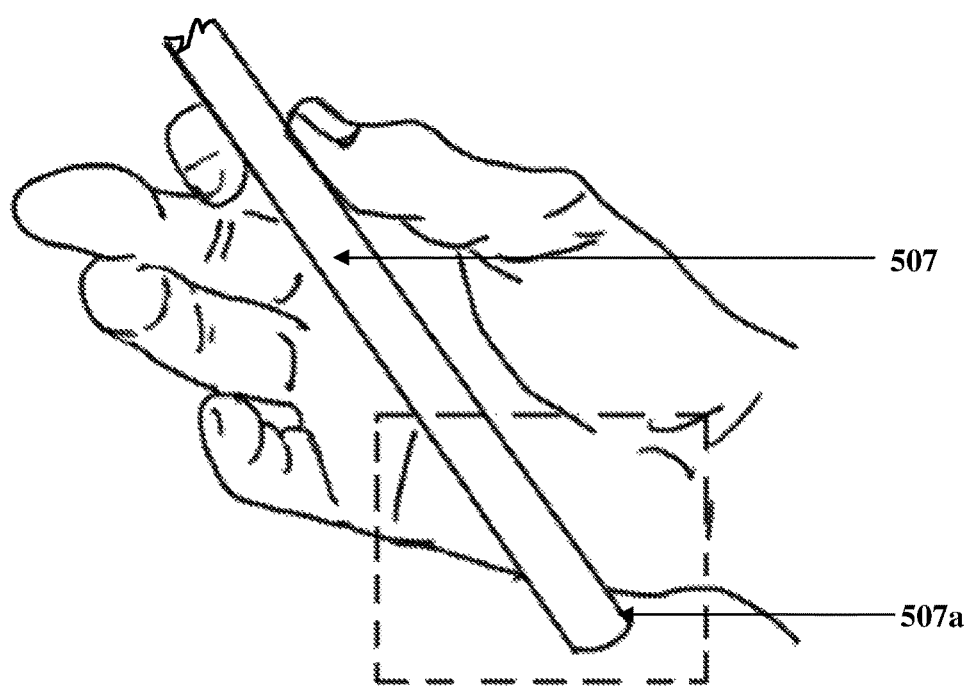
FIG. 19 exemplarily illustrates a perspective view of a drum stick, showing a portion of the drum stick in dashed lines for attaching an attachment member of an attachment system.
Figure 20A:
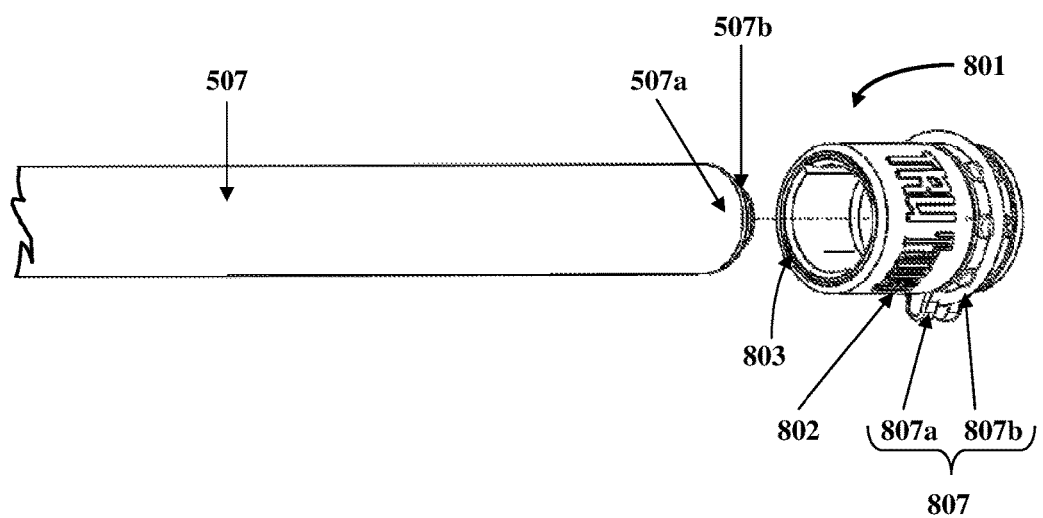
FIG. 20A exemplarily illustrates a disassembled view showing an embodiment for attaching an attachment system to a drum stick.

FIG. 19 exemplarily illustrates a perspective view of a drum stick 507, showing a portion of the drum stick 507 in dashed lines for attaching an attachment member 802 of the attachment system 801 exemplarily illustrated in FIG. 20A. The attachment system 801 is attached to one end 507*a* of the drum stick 507, at a location indicated by the dashed lines in FIG. 19.

FIG. 20A exemplarily illustrates a disassembled view showing an embodiment for attaching the attachment system 801 to the drum stick 507. The attachment member 802 of the attachment system 801 can be attached to a drum stick 507 of any size, for example, 2 BN, 5 A, 7 A, etc. The attachment member 802 conforms to one end 507*a* of the drum stick 507 of variable sizes to fit properly on the drum stick 507. The inner surface grooves 803 of the attachment member 802 engageably connect to the threading 507*b* positioned on one end 507*a* of the drum stick 507.

Figure 20B:
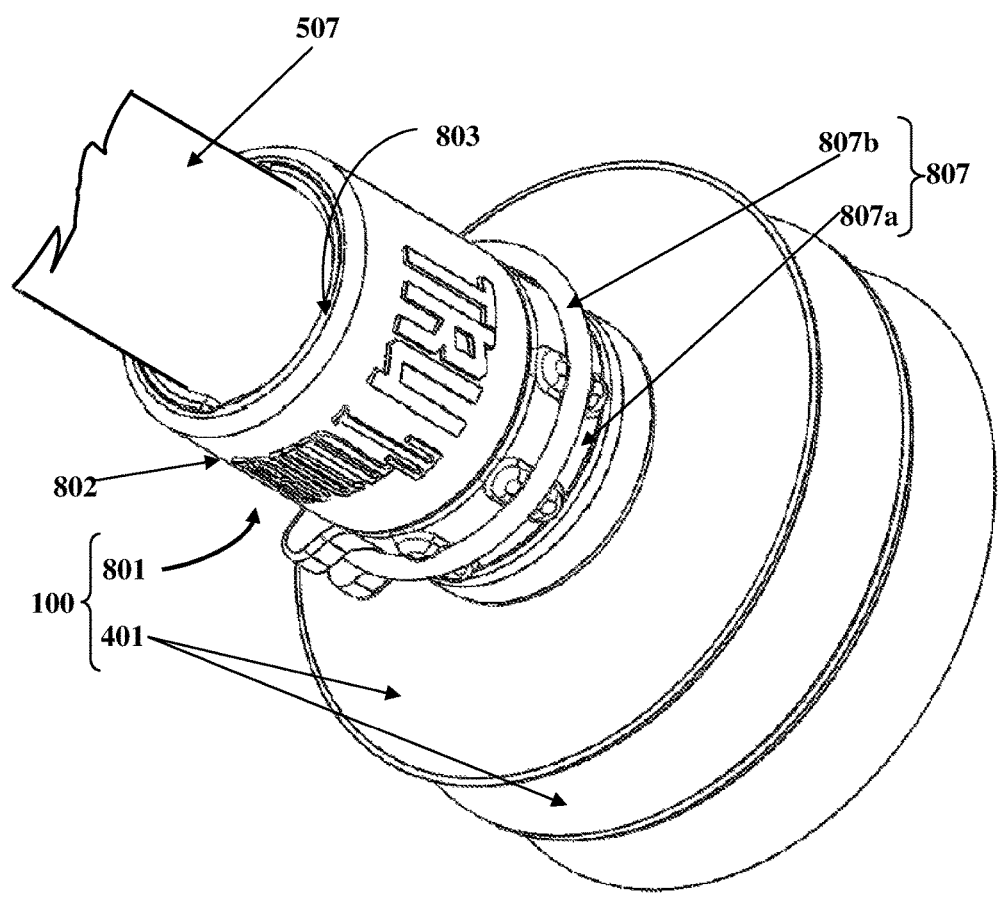
FIG. 20B exemplarily illustrates an assembled view of the kit, showing an interchangeable accessory connected to the drum stick via the embodiment of the attachment system shown in FIG. 20A.

FIG. 20B exemplarily illustrates an assembled view of the kit 100, showing an interchangeable accessory, for example, cymbals 401 connected to the drum stick 507 via the embodiment of the attachment system 801 shown in FIG. 20A. In this embodiment, the attachment member 802 with the inner surface grooves 803 is directly attached to the threading 507*b* positioned on the one end 507*a* of the drum stick 507 as exemplarily illustrated in FIG. 20B. The cymbals 401 are connected to the attachment system 801 as disclosed in the detailed description of FIGS. 8A-8C.

Figure 21A:
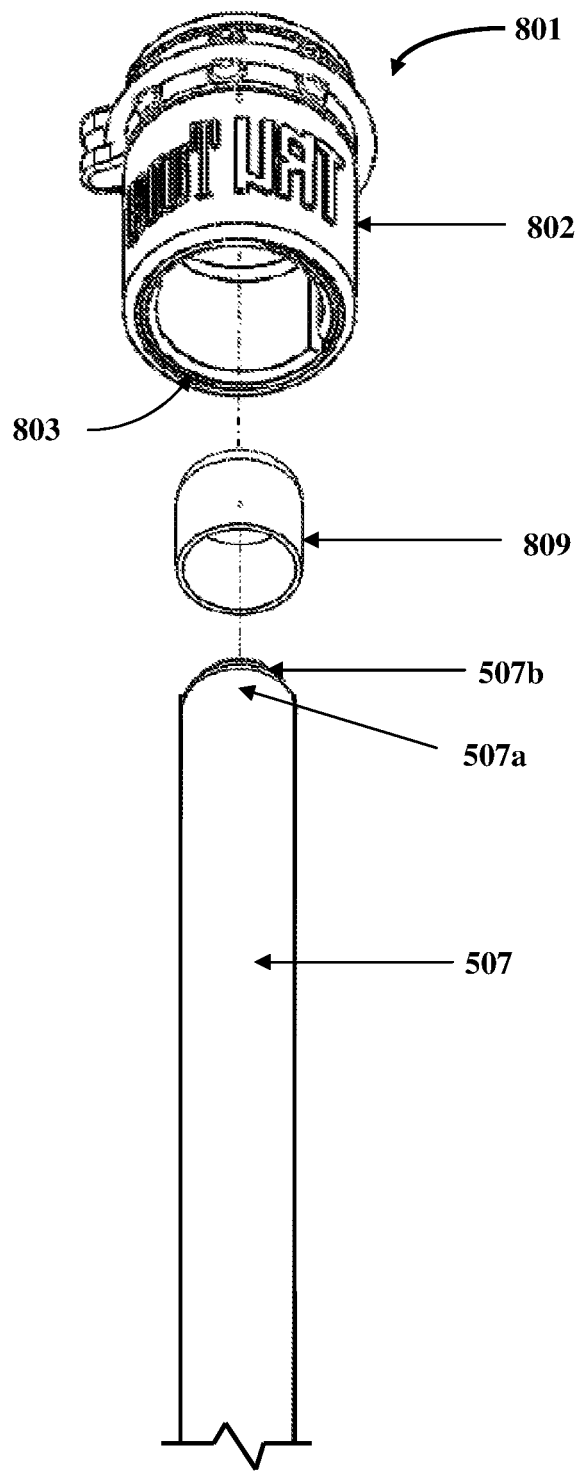
FIG. 21A exemplarily illustrates a disassembled view showing an insert member for attaching an embodiment of the attachment system to the drum stick.

FIG. 21A exemplarily illustrates a disassembled view showing an insert member 809 for attaching an embodiment of the attachment system 801 to the drum stick 507. The insert member 809 exemplarily illustrated in FIG. 21A, made of a gripping material, for example, rubber, vinyl, etc., is provided and removably positioned over the threading 507*b* which is located on one end 507*a* of the drum stick 507 of a small size prior to attaching the attachment member 802 of the attachment system 801 to the end 507*a* of the drum stick 507. The attachment member 802 is then positioned over the insert member 809 at the end 507*a* of the drum stick 507. The insert member 809 grips the attachment member 802 to the end 507*a* of the drum stick 507. For example, a rubber insert is removably positioned on the end 507*a* of the drum stick 507 of a small size prior to attaching the attachment member 802 of the attachment system 801 to the end 507*a* of the drum stick 507. The rubber insert grips the attachment system 801 to the end 507*a* of the drum stick 507 as exemplarily illustrated in FIG. 21B. In another example, an insert 809 made of vinyl is removably positioned on one end 507*a* of the drum stick 507 of a small size prior to attaching the attachment member 802 of the attachment system 801 to the end 507*a* of the drum stick 507. The insert made of vinyl grips the attachment system 801 to the end 507*a* of the drum stick 507. In another embodiment, an insert 809 made of tape is wrapped around the end 507*a* of the drum stick 507 of any diameter, for example, 2 BN, 5 A, 7 A, etc., to grip the attachment system 801 to the end 507*a* of the drum stick 507.

Figure 21B:
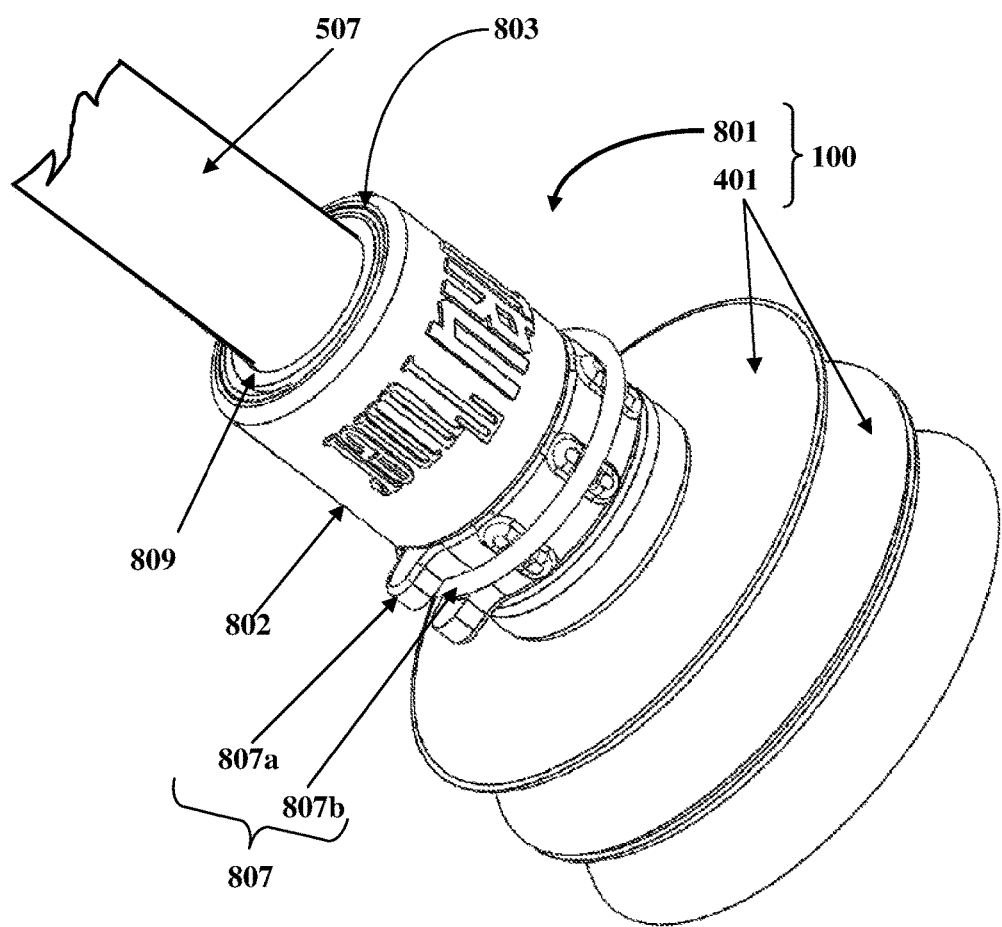
FIG. 21B exemplarily illustrates an assembled view of the kit, showing an interchangeable accessory connected to the drum stick via the embodiment of the attachment system shown in FIG. 21A.

FIG. 21B exemplarily illustrates an assembled view of the kit 100, showing an interchangeable accessory, for example, cymbals 401 connected to the drum stick 507 via the embodiment of the attachment system 801 shown in FIG. 21A. In this embodiment, the attachment member 802 is indirectly attached to the end 507*a* of the drum stick 507 via the insert member 809 as exemplarily illustrated in FIG. 21B. The cymbals 401 are connected to the attachment system 801 as disclosed in the detailed description of FIGS. 8A-8C.

Figure 22A:
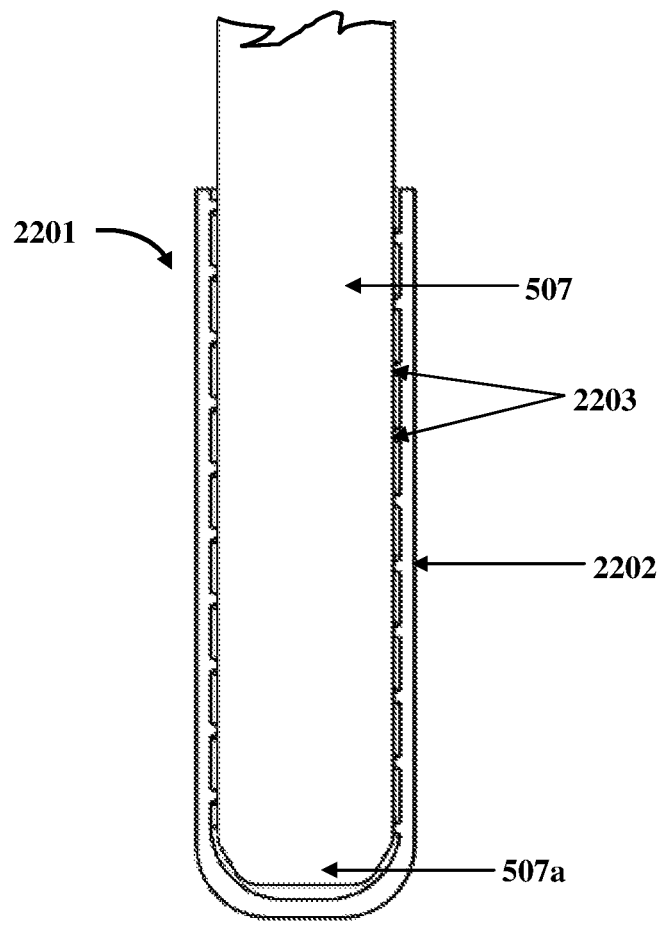
FIGS. 22A-22B exemplarily illustrate elevation views showing embodiments of the attachment system attached to one end of a drum stick.
Figure 22B:
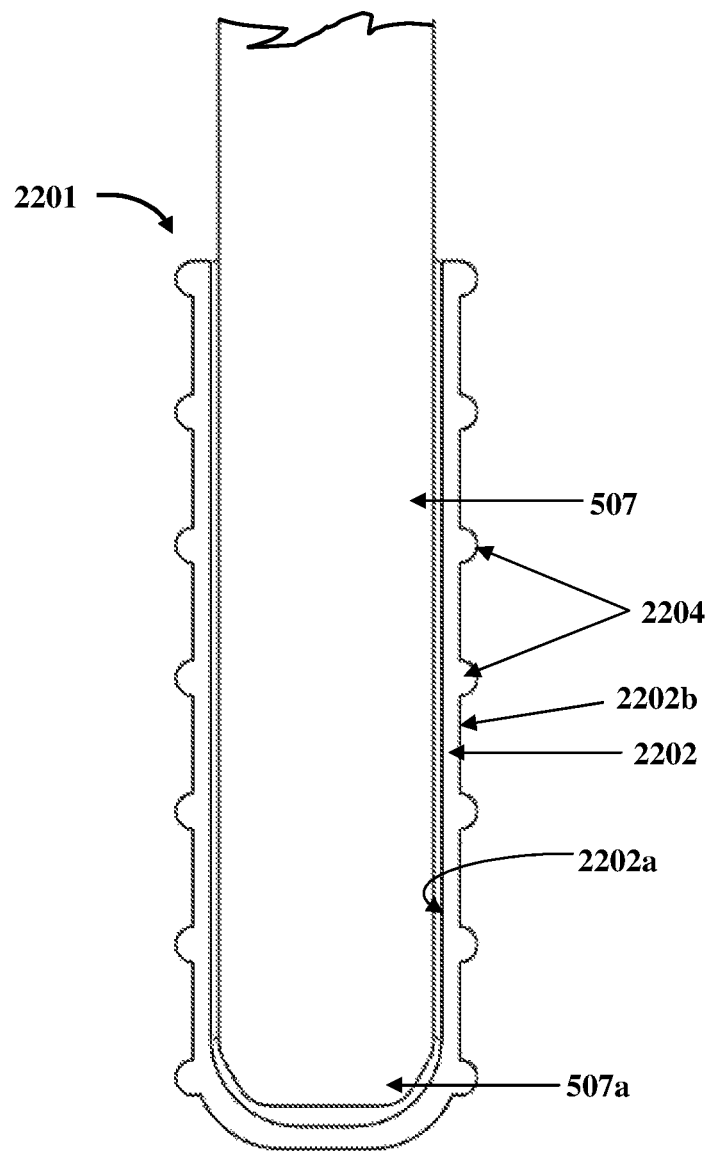

FIGS. 22A-22B exemplarily illustrate elevation views showing embodiments of the attachment system 2201 attached to one end 507*a* of a drum stick 507. The attachment system 2201 comprises an attachment member 2202 and a connector element (not shown in FIGS. 22A-22B). In this embodiment, the attachment member 2202 is configured as a cap member of a predetermined length. The attachment member 2202 can be fixed to the drum stick 507 and removed from the drum stick 507. The attachment member 2202 can be fixed to the drum stick 507 in multiple ways and conforms to fit drum sticks 507 of multiple sizes. The attachment member 2202 is universal to allow its attachment to different types of drum sticks 507 of multiple different sizes. In an embodiment, the attachment member 2202 is made in different sizes as disclosed in the detailed description of FIGS. 23A-26C, to specifically fit drum sticks 507 of one specific size or different sizes. In an embodiment, the attachment member 2202 is threadably engaged with the drum stick 507 as exemplarily illustrated in FIG. 22A. In another embodiment, the attachment member 2202 fastens to the drum stick 507 by friction as exemplarily illustrated in FIG. 22B. The attachment member 2202 accommodates drum sticks 507 of different sizes either by tapered threading or by using insert members 809 exemplarily illustrated in FIGS. 21A-21B positioned onto the drum stick 507. In an embodiment, the attachment member 2202 configured, for example, as an elongate cap expands or retracts to fit drum sticks 507 of different diameter sizes. FIG. 22A exemplarily illustrates a screw on type of attachment member 2202. The attachment member 2202 is operably connected to one end 507*a* of the drum stick 507 for enveloping the end 507*a* of the drum stick 507. In an embodiment, the attachment member 2202 comprises internal threads 2203 to directly screw on to threads configured on the drum stick 507. In another embodiment, the inner surface 2202*a* of the attachment member 2202 is made of, for example, a rubber grip material to grip and fasten to the drum stick 507. FIG. 22B exemplarily illustrates a rubber grip type of attachment member 2202. In another embodiment, the outer surface 2202*b* of the attachment member 2202 comprises threads 2204 for threadably engaging with another attachment system, for example, 801 exemplarily illustrated in FIGS. 8A-8C.

Figure 23A:
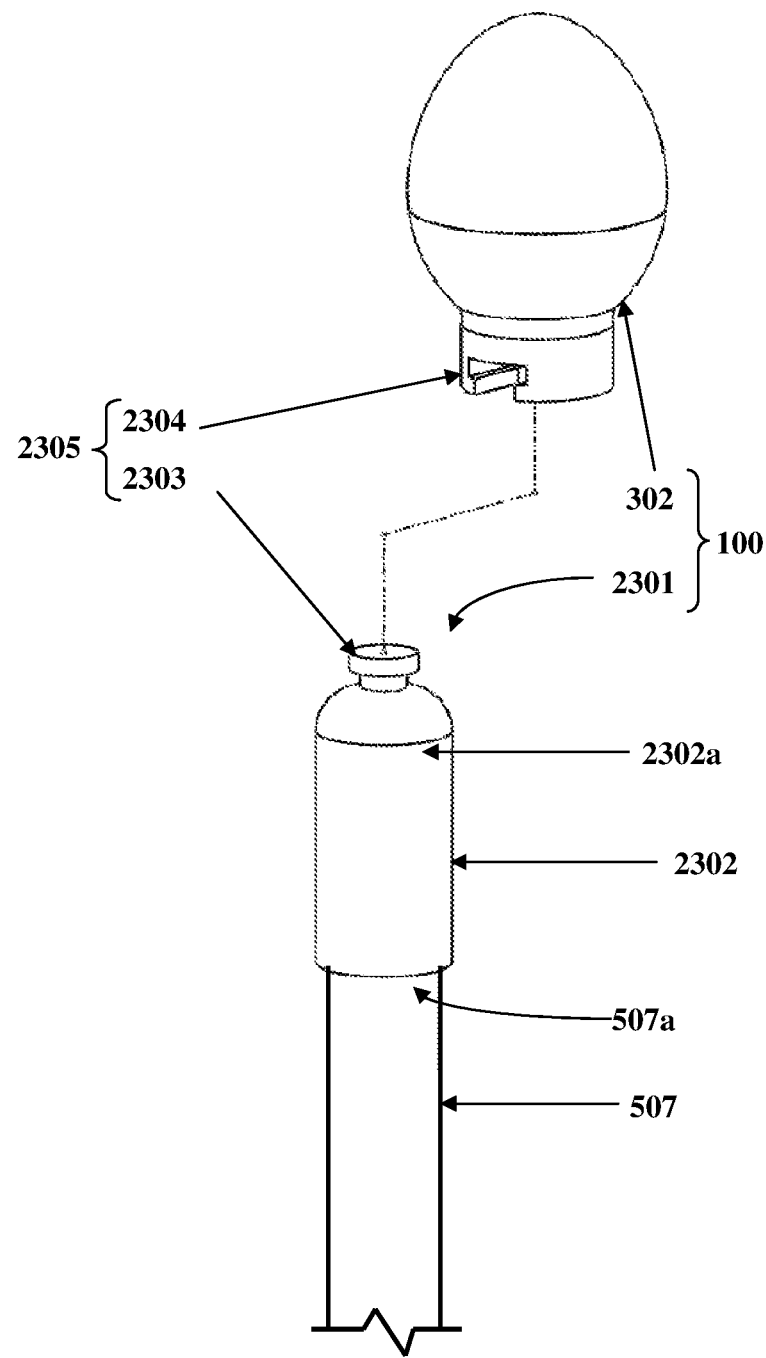
FIG. 23A exemplarily illustrates a disassembled view of the kit comprising an embodiment of the drum stick attachment system for attaching an interchangeable accessory to a drum stick.
Figure 23B:
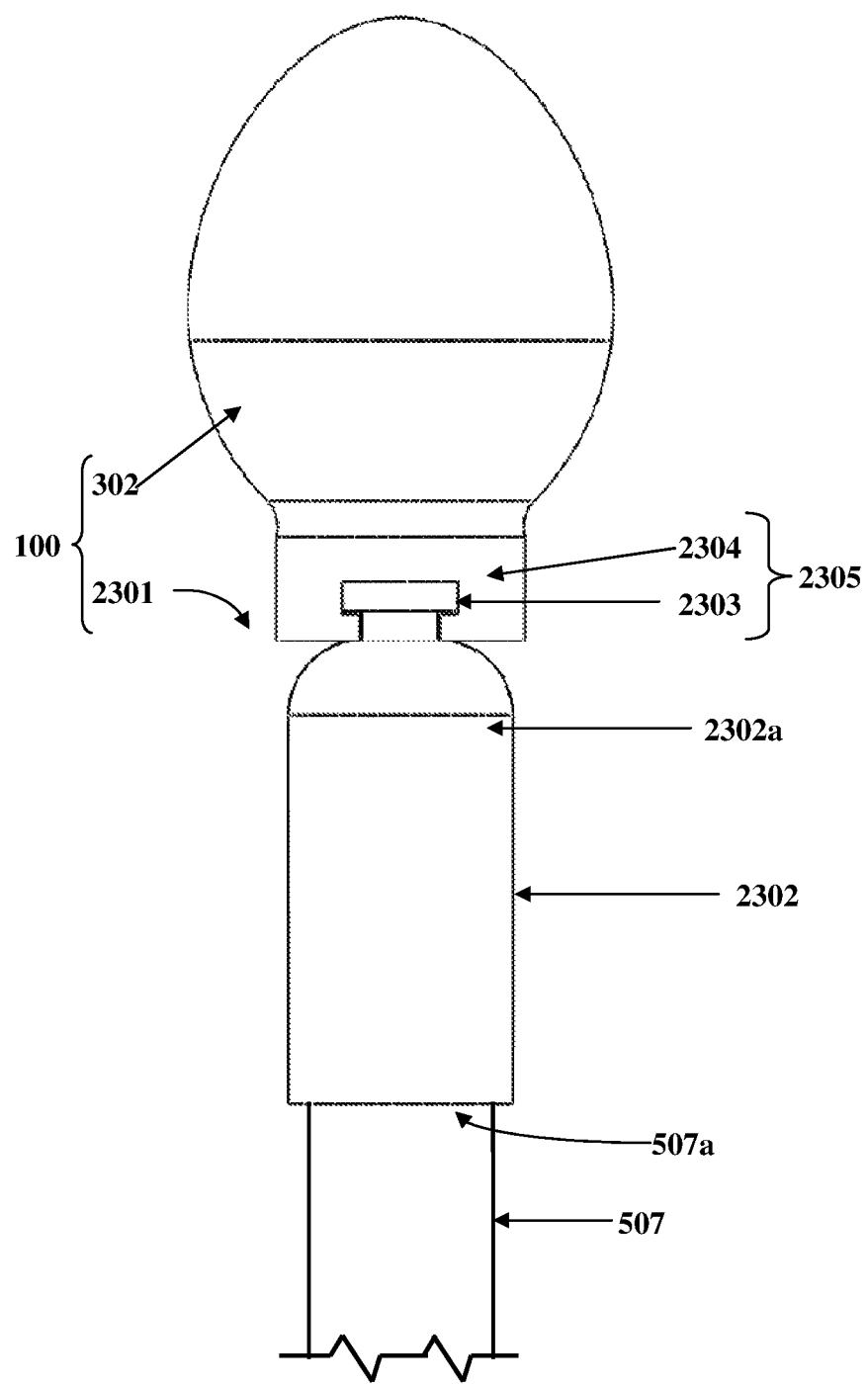
FIG. 23B exemplarily illustrates an assembled view of the kit, showing an interchangeable accessory connected to the drum stick via the embodiment of the drum stick attachment system shown in FIG. 23A.
Figure 23C:
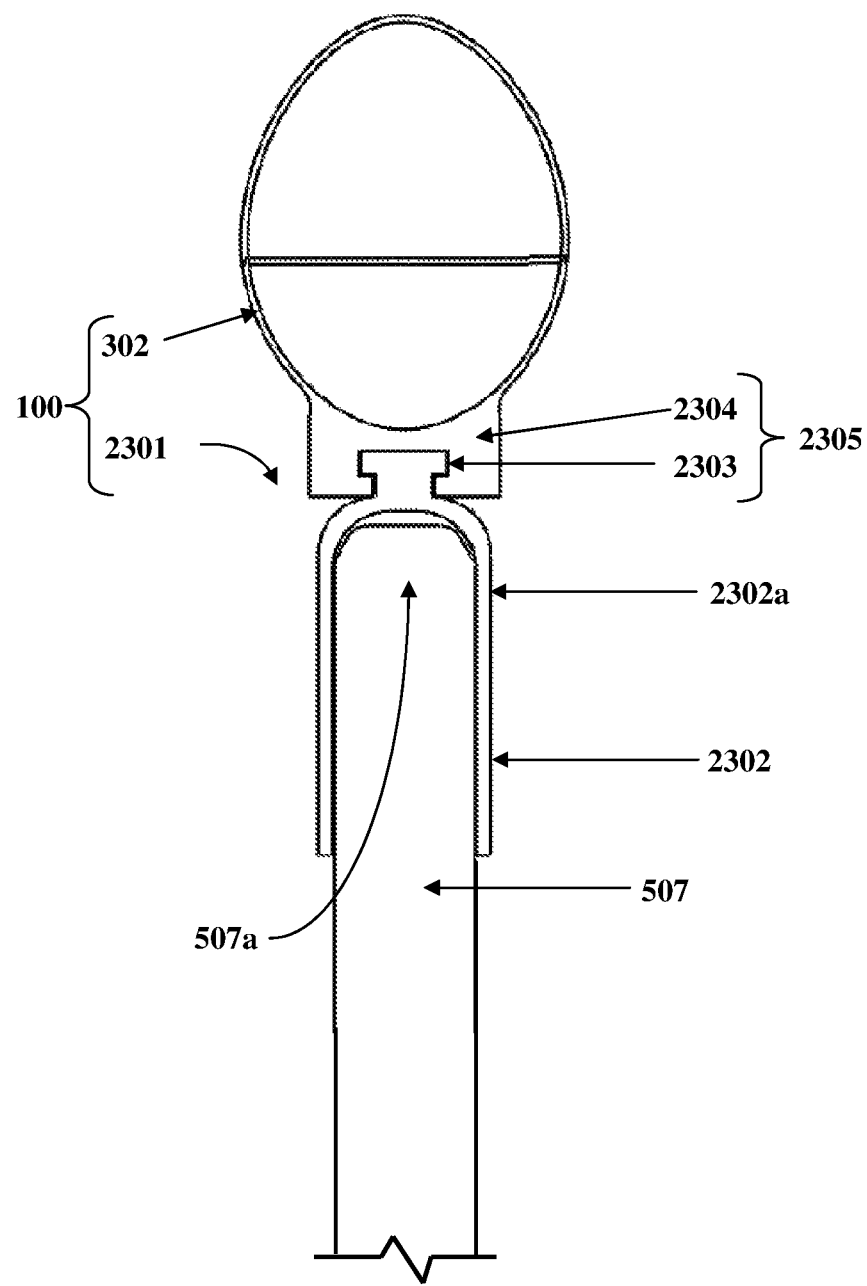
FIG. 23C exemplarily illustrates a cross-sectional view of the kit, showing the interchangeable accessory connected to the drum stick via the embodiment of the drum stick attachment system shown in FIG. 23A.

FIGS. 23A-23C exemplarily illustrate an embodiment of a connector element 2303 operably attached to an upper end 2302*a* of the attachment member 2302 of the drum stick attachment system 2301 on the drum stick 507. Different interchangeable accessories, for example, drum accessories, fashion accessories, utility accessories, sound makers, etc., can be attached to the drum stick 507 via the attachment member 2302 through the connector element 2303 of the drum stick attachment system 2301. An interchangeable accessory, for example, an egg shaker 302 can be connected to the drum stick attachment system 2301 on the drum stick 507, for example, via different connection assemblies, for example, a threading mechanism, a quick lock, a quarter turn, a T-lock, a ball and socket joint, a magnetic connection, or any other type of connection. FIG. 23A exemplarily illustrates a disassembled view of the kit 100 comprising an embodiment of the drum stick attachment system 2301 for attaching the egg shaker 302 to the drum stick 507. The drum stick attachment system 2301 comprising the attachment member 2302 and the connector element 2303 is capped onto one end 507*a* of the drum stick 507. As exemplarily illustrated in FIG. 23A, a T-lock type of connection assembly 2305 is formed by a T-shaped male connector element 2303 extending from the upper end 2302*a* of the attachment member 2302 of the drum stick attachment system 2301 and a connector piece 2304 comprising a T-shaped female connector that is connected to the egg shaker 302. FIG. 23B exemplarily illustrates an assembled view of the kit 100, showing the egg shaker 302 connected to the drum stick 507 via the embodiment of the drum stick attachment system 2301 shown in FIG. 23A. The T-shaped male connector element 2303 at the upper end 2302*a* of the attachment member 2302 of the drum stick attachment system 2301 engages with the T-shaped female connector of the connector piece 2304 to connect the egg shaker 302 to the drum stick 507. FIG. 23C exemplarily illustrates a cross-sectional view of the kit 100, showing the egg shaker 302 connected to the drum stick 507 via the embodiment of the drum stick attachment system 2301 shown in FIG. 23A.

Figure 24A:
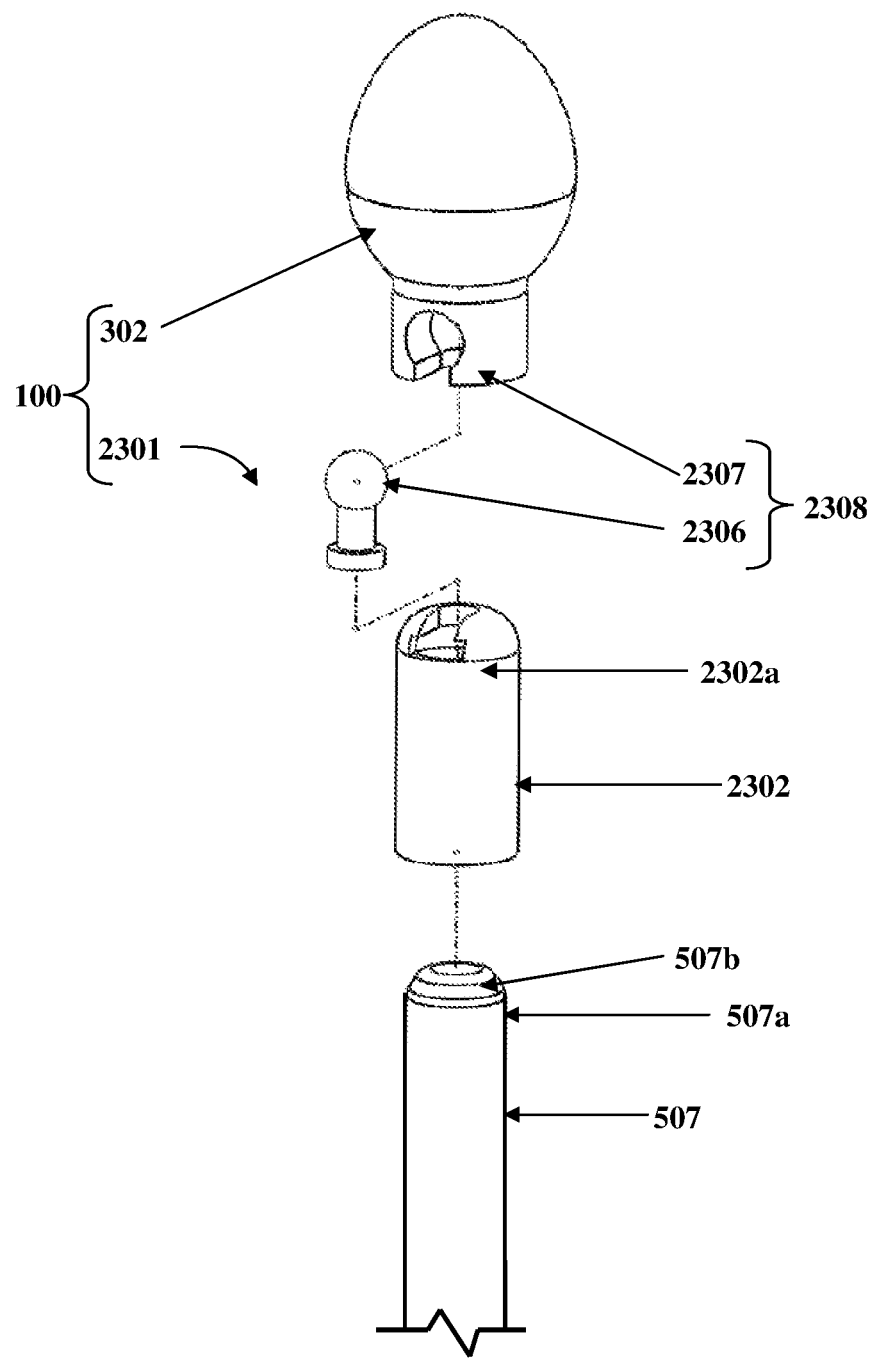
FIG. 24A exemplarily illustrates a disassembled view of the kit comprising another embodiment of the drum stick attachment system for attaching an interchangeable accessory to a drum stick.
Figure 24B:
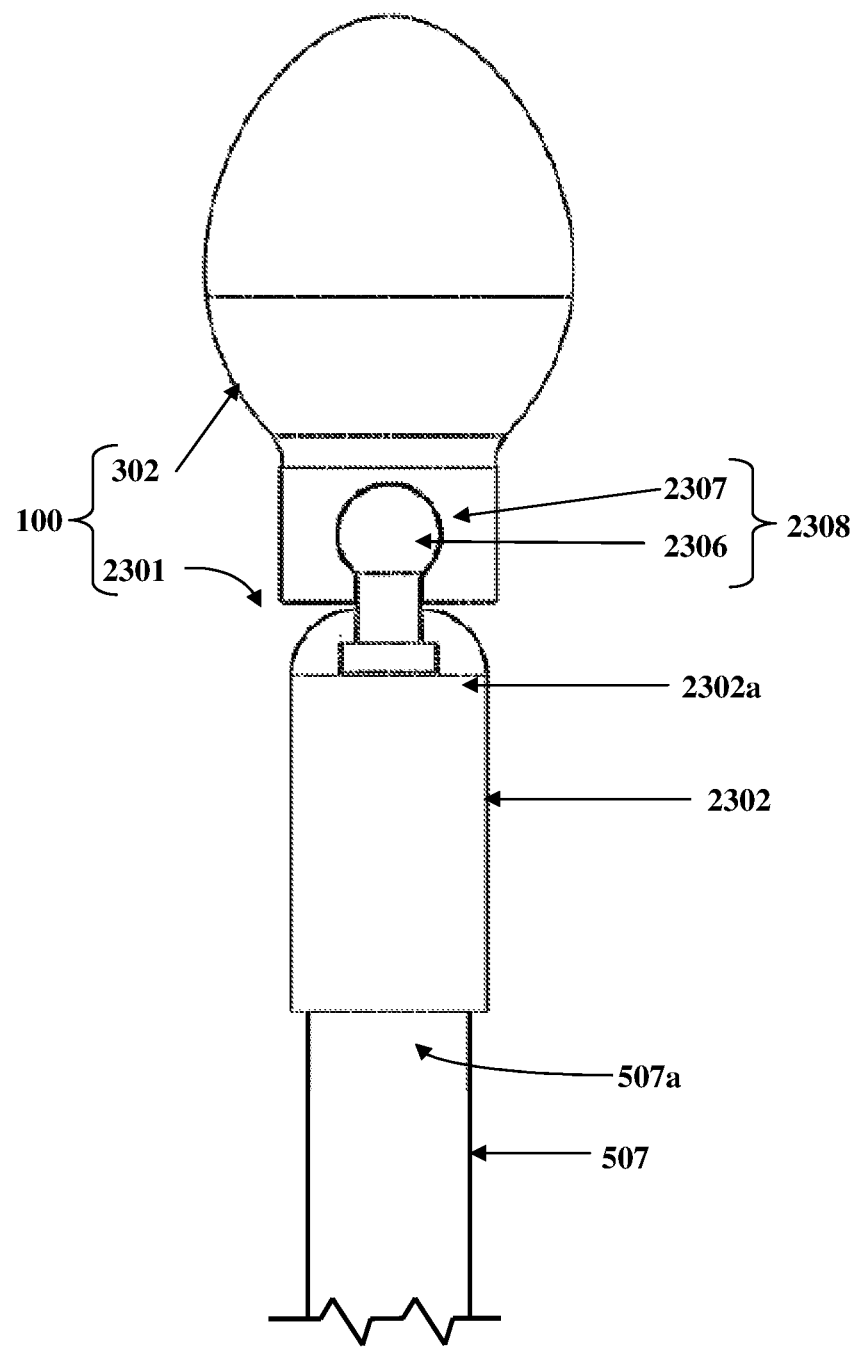
FIG. 24B exemplarily illustrates an assembled view of the kit, showing an interchangeable accessory connected to the drum stick via the embodiment of the drum stick attachment system shown in FIG. 24A.
Figure 24C:
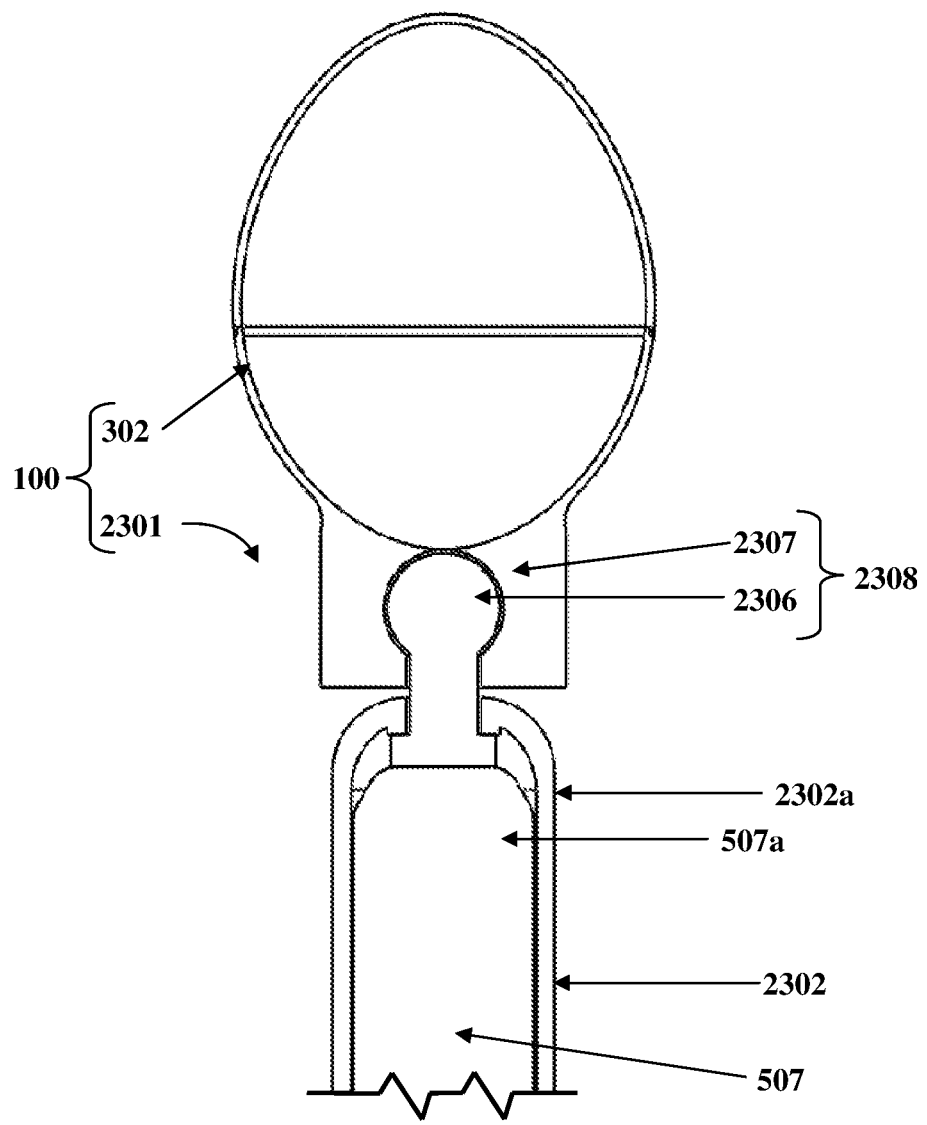
FIG. 24C exemplarily illustrates a cross-sectional view of the kit, showing the interchangeable accessory connected to the drum stick via the embodiment of the drum stick attachment system shown in FIG. 24A.

FIGS. 24A-24C exemplarily illustrate an embodiment of a connector element 2306 operably attached to an upper end 2302*a* of the attachment member 2302 of the drum stick attachment system 2301 on the drum stick 507. FIG. 24A exemplarily illustrates a disassembled view of the kit 100 comprising the drum stick attachment system 2301 for attaching an interchangeable accessory, for example, an egg shaker 302 to the drum stick 507. The drum stick attachment system 2301 comprises the attachment member 2302 and the connector element 2306. In this embodiment, a ball and socket type of connection assembly 2308 is formed by the connector element 2306 that extends from the upper end 2302*a* of the attachment member 2302 of the drum stick attachment system 2301 and a connector piece 2307 connected to the egg shaker 302. The connector element 2306 of the drum stick attachment system 2301 defines a ball portion of the connection assembly 2308, and the connector piece 2307 of the egg shaker 302 comprises a socket portion of the connection assembly 2308. FIG. 24B exemplarily illustrates an assembled view of the kit 100, showing the egg shaker 302 connected to the drum stick 507 via the embodiment of the drum stick attachment system 2301 shown in FIG. 24A. The connector element 2306, that is, the ball portion at the upper end 2302*a* of the attachment member 2302 of the drum stick attachment system 2301 engages with the socket portion 2307 defined in the connector piece 2307 of the egg shaker 302 to connect the egg shaker 302 to the drum stick 507. FIG. 24C exemplarily illustrates a cross-sectional view of the kit 100, showing the egg shaker 302 connected to the drum stick 507 via the embodiment of the drum stick attachment system 2301 shown in FIG. 24A.

Figure 25A:
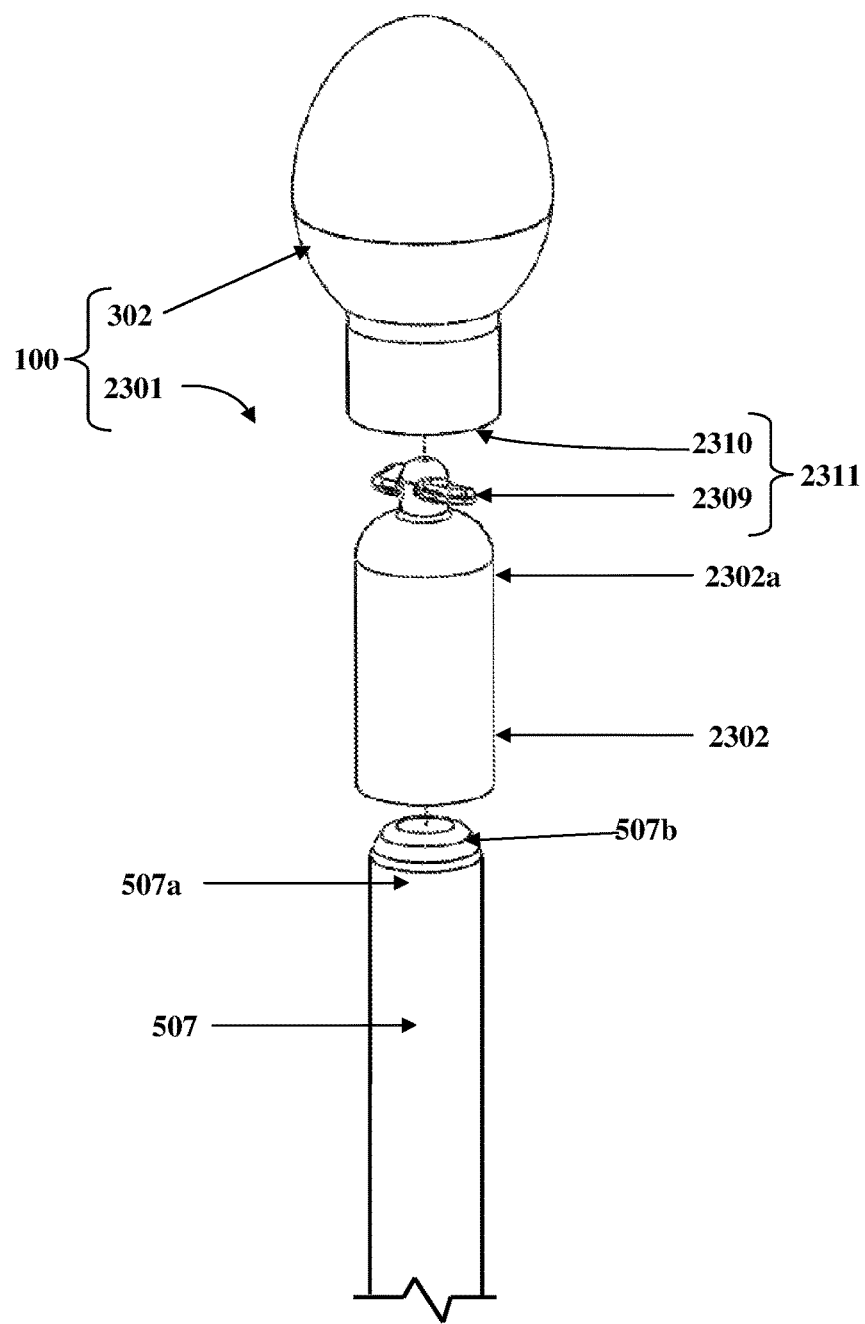
FIG. 25A exemplarily illustrates a disassembled view of the kit comprising another embodiment of the drum stick attachment system for attaching an interchangeable accessory to a drum stick.
Figure 25B:
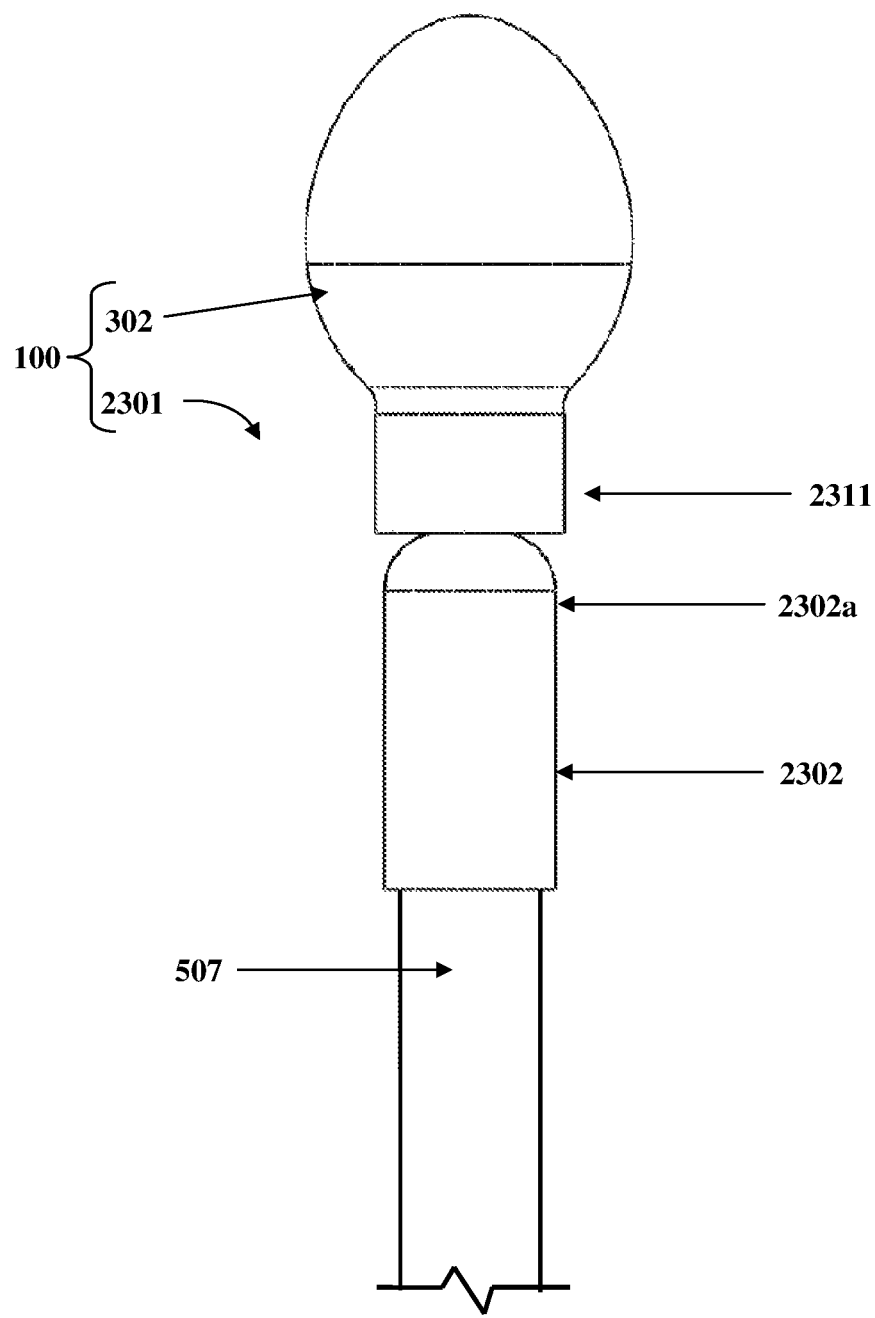
FIG. 25B exemplarily illustrates an assembled view of the kit, showing an interchangeable accessory connected to the drum stick via the embodiment of the drum stick attachment system shown in FIG. 25A.
Figure 25C:
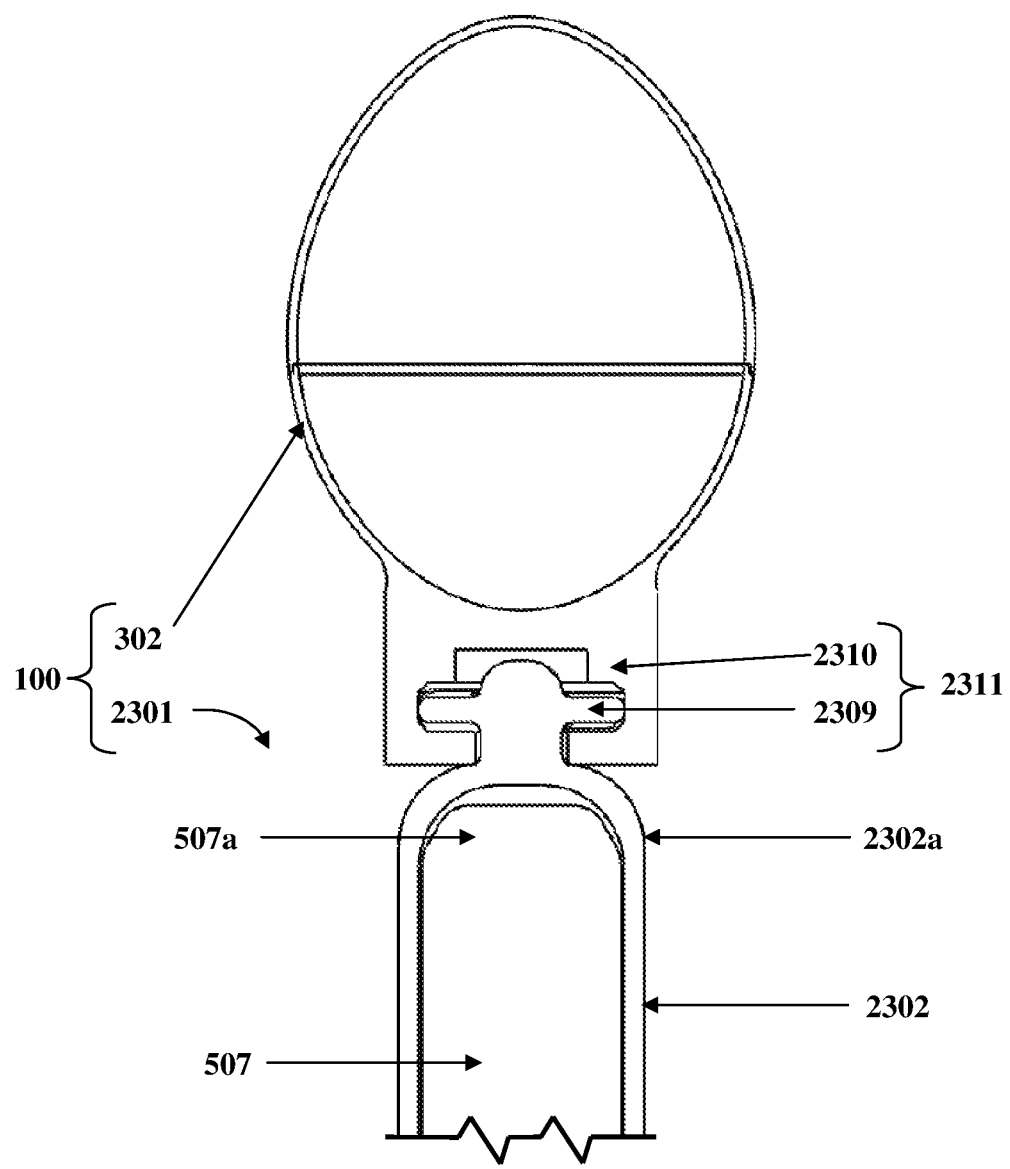
FIG. 25C exemplarily illustrates a cross-sectional view of the kit, showing the interchangeable accessory connected to the drum stick via the embodiment of the drum stick attachment system shown in FIG. 25A.

FIGS. 25A-25C exemplarily illustrate an embodiment of a connector element 2309 operably attached to an upper end 2302*a* of the attachment member 2302 of the drum stick attachment system 2301 on a drum stick 507. FIG. 25A exemplarily illustrates a disassembled view of the kit 100 comprising the drum stick attachment system 2301 for attaching an interchangeable accessory, for example, an egg shaker 302 to the drum stick 507. The drum stick attachment system 2301 comprises the attachment member 2302 and the connector element 2309. As exemplarily illustrated in FIG. 25A, a ¼ turn fastener type of connection assembly 2311 is formed by the connector element 2309 extending from the upper end 2302*a* of the attachment member 2302 of the drum stick attachment system 2301 and a connector piece 2310 connected to the egg shaker 302. The connector element 2309 of the drum stick attachment system 2301 is, for example, a stud portion of the ¼ turn fastener type of connection assembly 2311, and the connector piece 2310 comprises a receptacle portion of the ¼ turn fastener type of connection assembly 2311. FIG. 25B exemplarily illustrates an assembled view of the kit 100, showing the egg shaker 302 connected to the drum stick 507 via the embodiment of the drum stick attachment system 2301 shown in FIG. 25A. The connector element 2309, that is, the stud portion at the upper end 2302*a* of the attachment member 2302 of the drum stick attachment system 2301 engages with the receptacle portion defined in the connector piece 2310 of the egg shaker 302 to connect the egg shaker 302 to the drum stick 507. FIG. 25C exemplarily illustrates a cross-sectional view of the kit 100, showing the egg shaker 302 connected to the drum stick 507 via the embodiment of the drum stick attachment system 2301 shown in FIG. 25A.

Figure 26B:
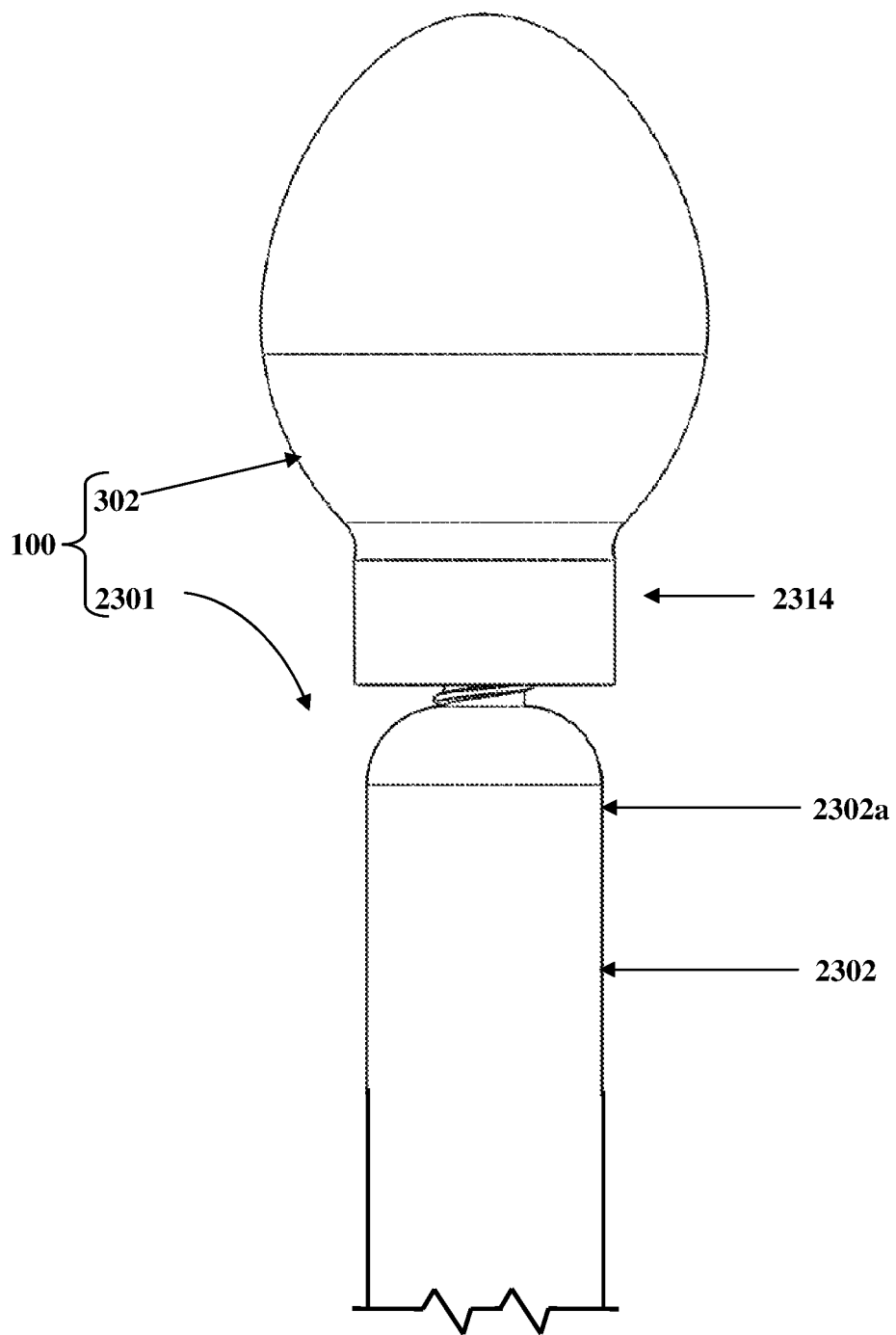
FIG. 26B exemplarily illustrates an assembled view of the kit, showing an interchangeable accessory connected to the drum stick via the embodiment of the drum stick attachment system shown in FIG. 26A.
Figure 26C:
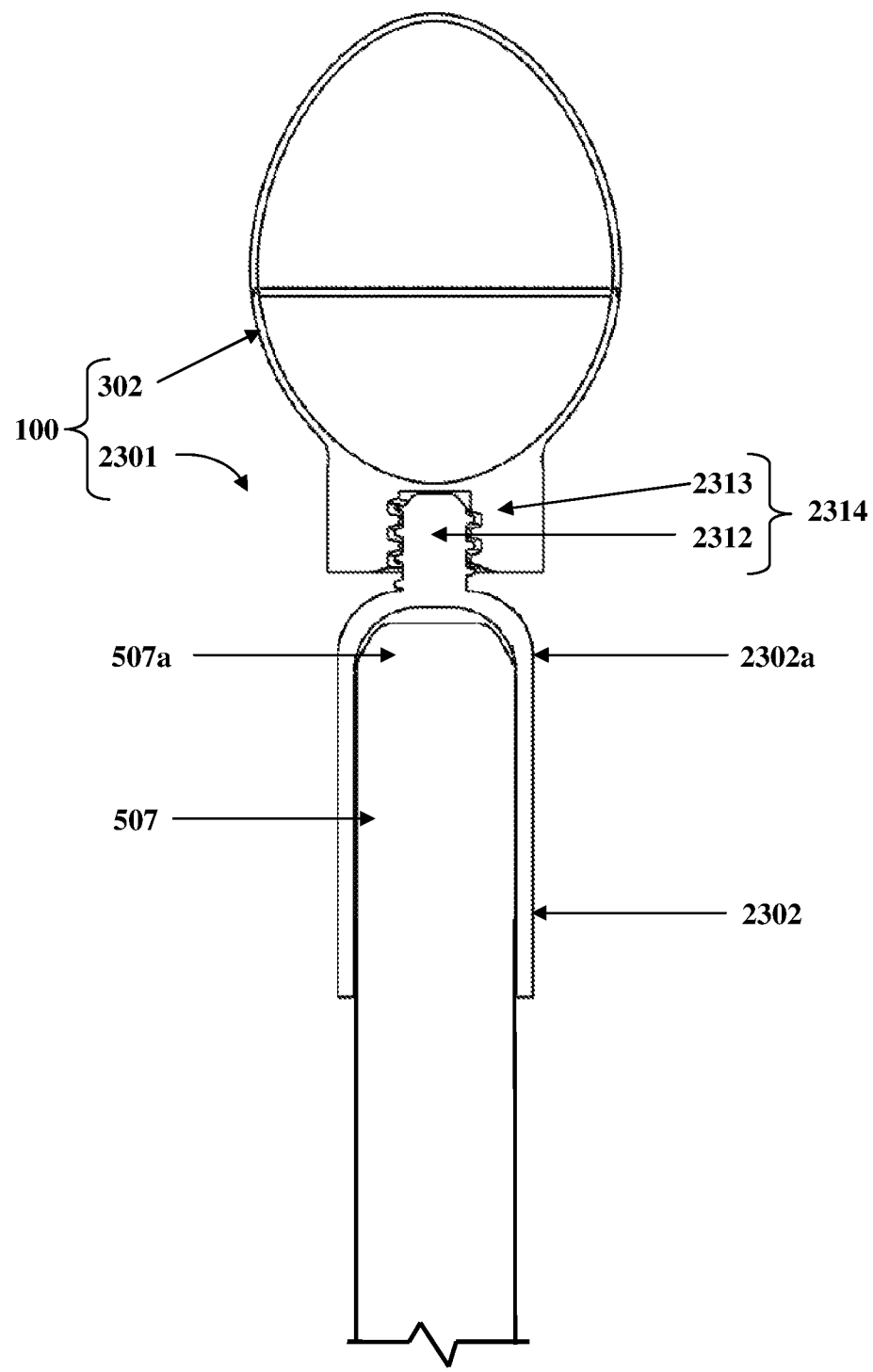
FIG. 26C exemplarily illustrates a cross-sectional view of the kit, showing the interchangeable accessory connected to the drum stick via the embodiment of the drum stick attachment system shown in FIG. 26A.

FIGS. 26A-26C exemplarily illustrate an embodiment of a connector element 2312 operably attached to an upper end 2302*a* of the attachment member 2302 of the drum stick attachment system 2301 on a drum stick 507. FIG. 26A exemplarily illustrates a disassembled view of the kit 100 comprising the drum stick attachment system 2301 for attaching an interchangeable accessory, for example, an egg shaker 302 to the drum stick 507. The drum stick attachment system 2301 comprises the attachment member 2302 and the connector element 2312. As exemplarily illustrated in FIG. 26A, a ¼ threaded connection assembly 2314 is formed by the connector element 2312 extending from the upper end 2302*a* of the attachment member 2302 of the drum stick attachment system 2301 and a connector piece 2313 connected to the egg shaker 302. The connector element 2312 of the drum stick attachment system 2301 is, for example, a threaded portion of the ¼ threaded connection assembly 2314, and the connector piece 2313 comprises a complementary threaded portion of the ¼ threaded connection assembly 2314. FIG. 26B exemplarily illustrates an assembled view of the kit 100, showing the egg shaker 302 connected to the drum stick 507 via the embodiment of the drum stick attachment system 2301 shown in FIG. 26A. The connector element 2312, for example, the threaded portion at the upper end 2302a of the attachment member 2302 of the drum stick attachment system 2301 engages with the complementary threaded portion defined in the connector piece 2313 of the egg shaker 302 to connect the egg shaker 302 to the drum stick 507. FIG. 26C exemplarily illustrates a cross-sectional view of the kit 100, showing the egg shaker 302 connected to the drum stick 507 via the embodiment of the drum stick attachment system 2301 shown in FIG. 26A.

Figure 27:
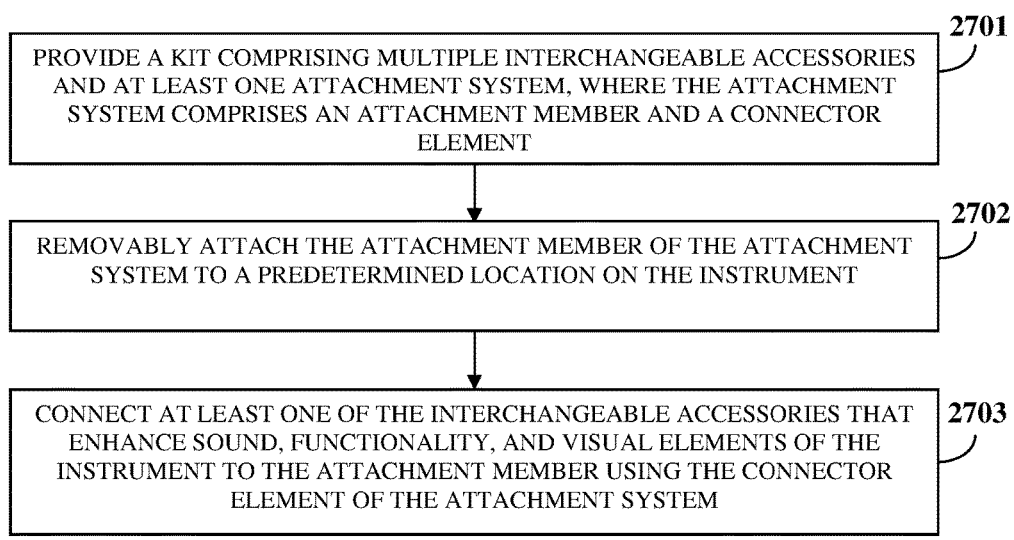
FIG. 27 illustrates a method for attaching one or more of multiple interchangeable accessories to an instrument to enhance sound, functionality, and visual elements of the instrument.

FIG. 27 illustrates a method for attaching one or more interchangeable accessories, for example, an egg shaker 302 exemplarily illustrated in FIG. 3A, cymbals 401 exemplarily illustrated in FIG. 4A, etc., to an instrument, to enhance sound, functionality, and visual elements of the instrument. A kit 100 exemplarily illustrated in FIGS. 3A-3E, FIGS. 4A-4E, FIGS. 5A-5C, FIGS. 6A-6C, FIGS. 7A-7D, FIGS. 8A-8C, FIGS. 9A-9C, FIG. 11, FIG. 12A, FIGS. 14A-14B, FIGS. 16A-16B, FIGS. 18A-18B, FIG. 20B, FIG. 21B, FIGS. 23A-23C, FIGS. 24A-24C, FIGS. 25A-25C, and FIGS. 26A-26C comprising the interchangeable accessories, for example, an egg shaker 302, cymbals 401, etc., and at least one attachment system, for example, 101, or 201, or 501, or 701, or 801, or 2201, or 2301 exemplarily illustrated in FIG. 1A, FIG. 2A, FIG. 5A, FIG. 7A, FIG. 8A, FIG. 22A and FIG. 23A is provided 2701. The attachment system, for example, 101, or 201, or 501, or 701, or 801, or 2201, or 2301 comprises an attachment member and a connector element. The attachment member is, for example, a clamp assembly with an accessory housing and a release assembly, or a generally cylindrical attachment member, or a cap member. The attachment member of at least one attachment system, for example, 101, or 201, or 501, or 701, or 801, or 2201, or 2301 is removably attached 2702 to a predetermined location on the instrument. The instrument is, for example, a drum stick 507 exemplarily illustrated in FIG. 5A, or a drum head (not shown), or a post 208 of a bass drum pedal 301 exemplarily illustrated in FIG. 3A, or a cajón (not shown), or a post of a hihat (not shown), or a piece of drum kit hardware (not shown), or a microphone (not shown), or a guitar 1001 exemplarily illustrated in FIG. 12B, or a stand (not shown), or a piece of musical hardware (not shown), etc. At least one of the interchangeable accessories comprising, for example, sound makers such as jingle bells, tambourine jingles, egg shakers, cymbals, guitar pick holders, etc., fashion accessories, utility accessories, instrument accessories, etc., that enhance sound, functionality, and visual elements of the instrument are connected 2703 to the attachment member using the connector element of the attachment system, for example, 101, or 201, or 501, or 701, or 801, or 2201, or 2301.

The method disclosed herein allows a user to quickly add or subtract sound or other textures added by the interchangeable accessories, for example, an egg shaker 302 exemplarily illustrated in FIG. 3A, cymbals 401 exemplarily illustrated in FIG. 4A, etc., to any of the areas around the instrument. The interchangeable accessories connected to the instrument via any of the attachment systems 101, 201, 501, 701, 801, 2201, and 2301 exemplarily illustrated in FIG. 1A, FIG. 2A, FIG. 5A, FIG. 7A, FIG. 8A, FIG. 22A, and FIG. 23A, instantly transform sound, functionality, and visual elements or looks of the instrument, without affecting playability of the instrument. The interchangeable accessories can be connected to and disconnected from the instrument via any of the attachment systems 101, 201, 501, 701, 801, 2201, and 2301. The interchangeable accessories, for example, the egg shaker 302, the cymbals 401, etc., are interchangeable with different attachment systems, for example, 101, 201, 501, 701, 801, 2201, 2301, etc., instantly. In the method disclosed herein, attachment systems with common female connectors and accessories with common male connectors and vice versa can be used on any instrument to enhance the sound, functionality, and visual elements of the instrument. The attachment systems 101, 201, 501, 701, 801, 2201, and 2301 are designed to be lightweight and sleek to enhance the physical affect of the attachment on any of these instruments. In the kit 100 disclosed herein, the accessories are interchangeable from one attachment system to another instantly, providing many uses and sound options to create a canvas for users, for example, artists to create new sounds and separate their individual sound effortlessly in multiple areas when creating music and art. The kit 100 disclosed herein allows users to quickly interchange accessories with common male connectors on the attachment systems 101, 201, 501, 701, 801, 2201, and 2301 with common female connectors from one attachment system to another by quick release in a matter of seconds.

The foregoing examples have been provided merely for the purpose of explanation and are in no way to be construed as limiting of the kit 100 and the method disclosed herein. While the kit 100 and the method have been described with reference to various embodiments, it is understood that the words, which have been used herein, are words of description and illustration, rather than words of limitation. Furthermore, although the kit 100 and the method have been described herein with reference to particular means, materials, and embodiments, the kit 100 and the method are not intended to be limited to the particulars disclosed herein; rather, the kit 100 and the method extend to all functionally equivalent structures, methods and uses, such as are within the scope of the appended claims. Those skilled in the art, having the benefit of the teachings of this specification, may effect numerous modifications thereto and changes may be made without departing from the scope and spirit of the kit 100 and the method disclosed herein in their aspects.

I claim:

1. A kit for enhancing sound, functionality, and visual elements of an instrument, said kit comprising:
   one or more interchangeable accessories for attachment to said instrument; and
   an attachment system removably attachable at a predetermined location on said instrument for connecting said one or more interchangeable accessories, wherein said attachment system comprises:
   a clamp assembly comprising:
      a receptacle positioned at a lower end of said clamp assembly for receiving said instrument; and
      a fastening assembly positioned in a generally perpendicular direction with respect to said receptacle for fastening said receptacle around said instrument;
   an accessory housing positioned on an upper end of said clamp assembly for accommodating said at least one of said interchangeable accessories, wherein said accessory housing comprises a connector element defined at an upper end of said accessory housing for connecting said at least one attachment system to said at least one of said interchangeable accessories, and wherein said connector element is one of a female connector and a male connector for engageably connecting said at least one attachment system to an opposing connector of said at least one of said interchangeable accessories; and
a release assembly positioned proximal to said upper end of said accessory housing for securing said at least one of said interchangeable accessories in said accessory housing in a closed position and for releasing said at least one of said interchangeable accessories from said accessory housing in an open position.

2. The kit of claim 1, wherein said one or more interchangeable accessories comprise sound makers, fashion accessories, utility accessories, and instrument accessories.

3. A kit for enhancing sound, functionality, and visual elements of an instrument, said kit comprising:
one or more interchangeable accessories for attachment to said instrument; and
an attachment system removably attachable at a predetermined location on said instrument for connecting said one or more interchangeable accessories, wherein said attachment system comprises:
a generally cylindrical attachment member removably connectable to one end of said instrument; and
a connector element defined at an upper end of said generally cylindrical attachment member for connecting said generally cylindrical attachment member to said at least one of said interchangeable accessories, wherein said connector element is one of a female connector and a male connector for engageably connecting said generally cylindrical attachment member to an opposing connector of said at least one of said interchangeable accessories.

4. The kit of claim 3, further comprising an insert member operably connected to said one end of said instrument for frictionally engaging said generally cylindrical attachment member of said at least one attachment system to said one end of said instrument.

5. The kit of claim 3, further comprising a clamp member connected to a lower end of said generally cylindrical attachment member of said at least one attachment system for connecting said generally cylindrical attachment member to said one end of said instrument.

6. The kit of claim 3, further comprising a strap member connected to a lower end of said generally cylindrical attachment member of said at least one attachment system for connecting said generally cylindrical attachment member to said one end of said instrument, wherein said strap member comprises one or more adjustment holes and a buckle for fastening said generally cylindrical attachment member to said one end of said instrument.

7. The kit of claim 3, wherein said interchangeable accessories comprise sound makers, fashion accessories, utility accessories, and drum accessories.

8. A kit for enhancing sound, functionality, and visual elements of an instrument, said kit comprising:
one or more interchangeable accessories for attachment to said instrument; and
an attachment system removably attachable at a predetermined location on said instrument for connecting said one or more interchangeable accessories, wherein said instrument is one of a drum stick, a drum head, a post of a bass drum pedal, a cajón, a post of a hihat, a piece of drum kit hardware, a microphone, a guitar, a stand, and a piece of musical hardware, wherein said attachment system for said drum stick comprises:
an attachment member removably attachable to one end of said drum stick of one of a plurality of sizes; and
a connector element operably connected to a distal end of said attachment member for connecting said attachment member to at least one of said interchangeable accessories, wherein said attachment member comprises:
a clamp assembly comprising:
a receptacle positioned at a lower end of said clamp assembly for receiving said drum stick; and
a fastening assembly positioned in a generally perpendicular direction with respect to said receptacle for fastening said receptacle around said drum stick;
an accessory housing positioned on an upper end of said clamp assembly for accommodating said at least one of said interchangeable accessories, wherein said accessory housing comprises said connector element defined at an upper end of said accessory housing for connecting said attachment member to said at least one of said interchangeable accessories, and wherein said connector element is one of a female connector and a male connector for engageably connecting said attachment member to an opposing connector of said at least one of said interchangeable accessories; and
a release assembly positioned proximal to said upper end of said accessory housing for securing said at least one of said interchangeable accessories in said accessory housing in a closed position and for releasing said at least one of said interchangeable accessories from said attachment member in an open position.

9. The kit of claim 8, wherein said interchangeable accessories comprise sound makers, fashion accessories, utility accessories, and drum accessories.

10. A kit for enhancing sound, functionality, and visual elements of an instrument, said kit comprising:
one or more interchangeable accessories for attachment to said instrument; and
an attachment system removably attachable at a predetermined location on said instrument for connecting said one or more interchangeable accessories, wherein said instrument is one of a drum stick, a drum head, a post of a bass drum pedal, a cajón, a post of a hihat, a piece of drum kit hardware, a microphone, a guitar, a stand, and a piece of musical hardware, wherein said attachment system for said drum stick comprises:
an attachment member removably attachable to one end of said drum stick of one of a plurality of sizes; and
a connector element operably connected to a distal end of said attachment member for connecting said attachment member to at least one of said interchangeable accessories, wherein said attachment member is a generally cylindrical attachment member removably connectable to one end of said drum stick, and wherein said connector element is defined at an upper end of said generally cylindrical attachment member for connecting said generally cylindrical attachment member to said at least one of said interchangeable accessories, and wherein said connector element is one of a female connector and a male connector for engageably connecting said generally cylindrical attachment member to an opposing connector of said at least one of said interchangeable accessories.

11. The kit of claim 10, wherein said attachment system for said drum stick further comprises an insert member operably connected to said one end of said drum stick for frictionally engaging said generally cylindrical attachment member to said one end of said drum stick.

12. The kit of claim 10, wherein said attachment system for said drum stick further comprises a clamp member connected to a lower end of said generally cylindrical attachment member for connecting said generally cylindrical attachment member to said one end of said drum stick.

13. The kit of claim 10, wherein said attachment system for said drum stick further comprising a strap member connected to a lower end of said generally cylindrical attachment member for connecting said generally cylindrical attachment member to said one end of said drum stick, wherein said strap member comprises one or more adjustment holes and a buckle for fastening said generally cylindrical attachment member to said one end of said drum stick.

14. The kit of claim 10, wherein said interchangeable accessories comprise sound makers, fashion accessories, utility accessories, and drum accessories.

15. A kit for enhancing sound, functionality, and visual elements of an instrument, said kit comprising:
   one or more interchangeable accessories for attachment to said instrument; and
   an attachment system removably attachable at a predetermined location on said instrument for connecting said one or more interchangeable accessories, wherein said instrument is one of a drum stick, a drum head, a post of a bass drum pedal, a cajón, a post of a hihat, a piece of drum kit hardware, a microphone, a guitar, a stand, and a piece of musical hardware, wherein said attachment system for said drum stick comprises:
   an attachment member removably attachable to one end of said drum stick of one of a plurality of sizes; and
   a connector element operably connected to a distal end of said attachment member for connecting said attachment member to at least one of said interchangeable accessories, wherein said attachment member is a cap member of a predetermined length operably connected to one end of said drum stick for enveloping said one end of said drum stick, and wherein said connector element is positioned at one end of said cap member for connecting said cap member to said at least one of said interchangeable accessories, and wherein said connector element is one of a female connector and a male connector for engageably connecting said cap member to an opposing connector of said at least one of said interchangeable accessories.

16. The kit of claim 15, wherein said interchangeable accessories comprise sound makers, fashion accessories, utility accessories, and drum accessories.

* * * * *